US012586522B2

(12) United States Patent
    Yamazaki et al.

(10) Patent No.: US 12,586,522 B2
(45) Date of Patent: Mar. 24, 2026

(54) CORRECTION METHOD OF DISPLAY APPARATUS AND CORRECTION SYSTEM OF THE DISPLAY APPARATUS

(71) Applicant: Semiconductor Energy Laboratory Co., Ltd., Kanagawa-ken (JP)

(72) Inventors: Shunpei Yamazaki, Tokyo (JP);
    Tatsuya Onuki, Kanagawa (JP);
    Shunsuke Sato, Kanagawa (JP);
    Yoshiyuki Kurokawa, Kanagawa (JP);
    Yosuke Tsukamoto, Kanagawa (JP);
    Shigeru Onoya, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 18/580,291

(22) PCT Filed: Jun. 29, 2022

(86) PCT No.: PCT/IB2022/056030
    § 371 (c)(1),
    (2) Date: Jan. 18, 2024

(87) PCT Pub. No.: WO2023/002278
    PCT Pub. Date: Jan. 26, 2023

(65) Prior Publication Data
    US 2025/0087146 A1     Mar. 13, 2025

(30) Foreign Application Priority Data
    Jul. 20, 2021     (JP) ................................. 2021-119777

(51) Int. Cl.
    *G09G 3/3225*     (2016.01)
    *G09G 3/00*     (2006.01)
    (Continued)

(52) U.S. Cl.
    CPC ........... *G09G 3/3225* (2013.01); *G09G 3/006* (2013.01); *G09G 3/20* (2013.01); *G09G 3/36* (2013.01);
    (Continued)

(58) Field of Classification Search
    CPC ........... G09G 3/006; G09G 3/20; G09G 3/32; G09G 3/3225; G09G 3/36; G09G 5/00;
    (Continued)

(56) References Cited

U.S. PATENT DOCUMENTS 5,969,756 A * 10/1999 Buckley ................... H01J 9/42
                                                           348/E17.005
6,618,115 B1     9/2003 Hiroki
    (Continued)

FOREIGN PATENT DOCUMENTS

CN          105390119 A     3/2016
CN          110663077 A     1/2020
    (Continued)

OTHER PUBLICATIONS

International Search Report (Application No. PCT/IB2022/056030), dated Sep. 20, 2022.
    (Continued)

*Primary Examiner* — Cory A Almeida
(74) *Attorney, Agent, or Firm* — Husch Blackwell LLP

(57) ABSTRACT

A correction method of a display apparatus is provided. A method for evaluating display quality of a display apparatus is provided. The display apparatus includes a display panel, a correction circuit, and a memory. First, first imaging data including all pixels in the display apparatus is acquired in a state where an image with a first grayscale is displayed on the display apparatus. Then, second imaging data including all the pixels in the display apparatus is acquired in a state where an image with a second grayscale is displayed on the (Continued)

display apparatus. Next, correction data is generated based on the first imaging data and the second imaging data. After that, the correction data is output to the memory of the display apparatus. The correction circuit has a function of correcting image data based on the correction data stored in the memory to generate corrected image data and outputting the corrected image data to the display panel.

5 Claims, 26 Drawing Sheets

(51) Int. Cl.

| | |
|---|---|
| *G09G 3/20* | (2006.01) |
| *G09G 3/36* | (2006.01) |
| *G09G 5/00* | (2006.01) |
| *H04N 5/66* | (2006.01) |
| *H04N 17/04* | (2006.01) |

(52) U.S. Cl.
CPC .................. *G09G 5/00* (2013.01); *H04N 5/66* (2013.01); *H04N 17/04* (2013.01); *G09G 2300/0842* (2013.01); *G09G 2310/08* (2013.01); *G09G 2320/02* (2013.01); *G09G 2320/0271* (2013.01); *G09G 2320/0693* (2013.01); *G09G 2330/021* (2013.01)

(58) Field of Classification Search
CPC ....... G09G 2300/0842; G09G 2310/08; G09G 2320/02; G09G 2320/0271; G09G 2320/0693; G09G 2330/021; H04N 5/66; H04N 17/04
See application file for complete search history.

(56) References Cited

U.S. PATENT DOCUMENTS

| | | | |
|---|---|---|---|
| 7,053,976 | B2 | 5/2006 | Hiroki |
| 7,399,991 | B2 | 7/2008 | Seo et al. |
| 7,619,700 | B2 | 11/2009 | Hiroki |
| 7,663,149 | B2 | 2/2010 | Seo et al. |
| 11,017,701 | B2 | 5/2021 | Sawahata |
| 2004/0004692 | A1 | 1/2004 | Hiroki |
| 2005/0237318 | A1 | 10/2005 | Inoue et al. |
| 2011/0057967 | A1 | 3/2011 | Adachi et al. |
| 2012/0262556 | A1 | 10/2012 | Kuwahara et al. |
| 2020/0184883 | A1* | 6/2020 | Murase ................ G09G 3/3208 |

FOREIGN PATENT DOCUMENTS

| | | | | |
|---|---|---|---|---|
| JP | 2000-278721 | A | | 10/2000 |
| JP | 2001-222265 | A | | 8/2001 |
| JP | 2002-324673 | A | | 11/2002 |
| JP | 2005-316408 | A | | 11/2005 |
| JP | 2008008949 | A | * | 1/2008 |
| JP | 2008-067154 | A | | 3/2008 |
| JP | 2008-191238 | A | | 8/2008 |
| JP | 2009-271501 | A | | 11/2009 |
| JP | 2011-027907 | A | | 2/2011 |
| JP | 2016-050982 | A | | 4/2016 |
| JP | 2020-046469 | A | | 3/2020 |
| KR | 2016-0026680 | A | | 3/2016 |
| WO | WO-2012/056708 | | | 5/2012 |
| WO | WO-2018/220757 | | | 12/2018 |

OTHER PUBLICATIONS

Written Opinion (Application No. PCT/IB2022/056030), dated Sep. 20, 2022.

Masaoka.K, "Simulation of Line-Based MTF Measurements for Pixelated Displays", SID Digest '20 : SID International Symposium Digest of Technical Papers, Sep. 25, 2020, pp. 854-857.

\* cited by examiner

FIG. 4A
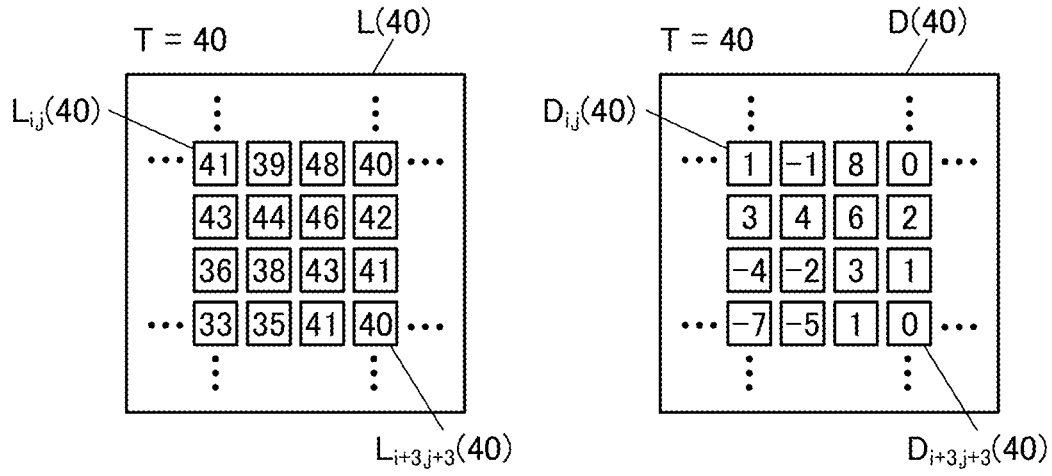
FIG. 4B
FIG. 4C
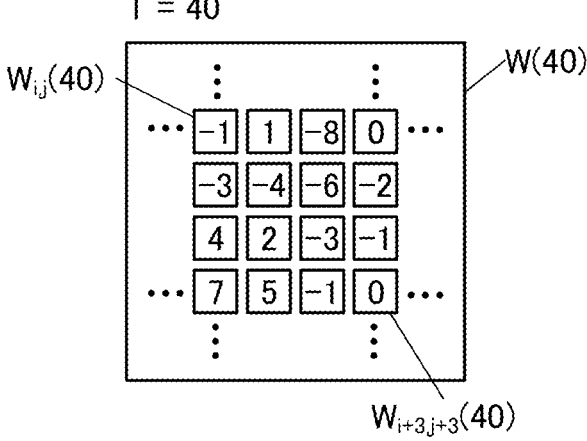
FIG. 4D
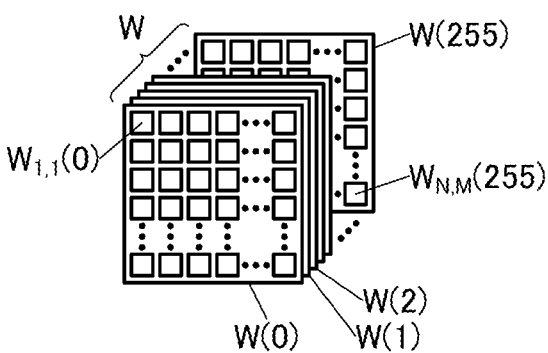

FIG. 5A
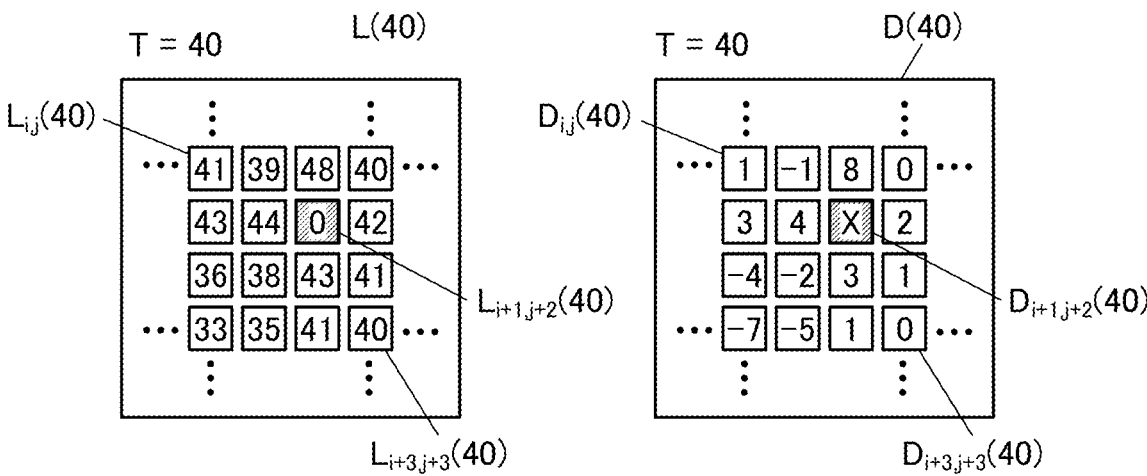
FIG. 5B
FIG. 5C
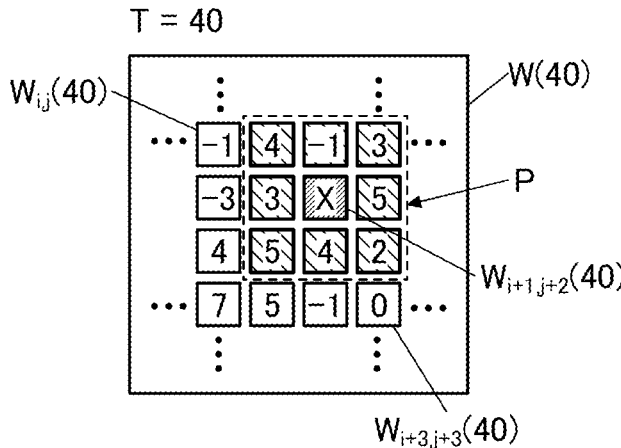

200A

200C

200D

200E

200F

FIG. 24A
6500
6505  6507
6501
6508
6502
6503
6504
6506
FIG. 24B
6502
6510  6513  6512  6511
6515  6516  6517  6518  6501
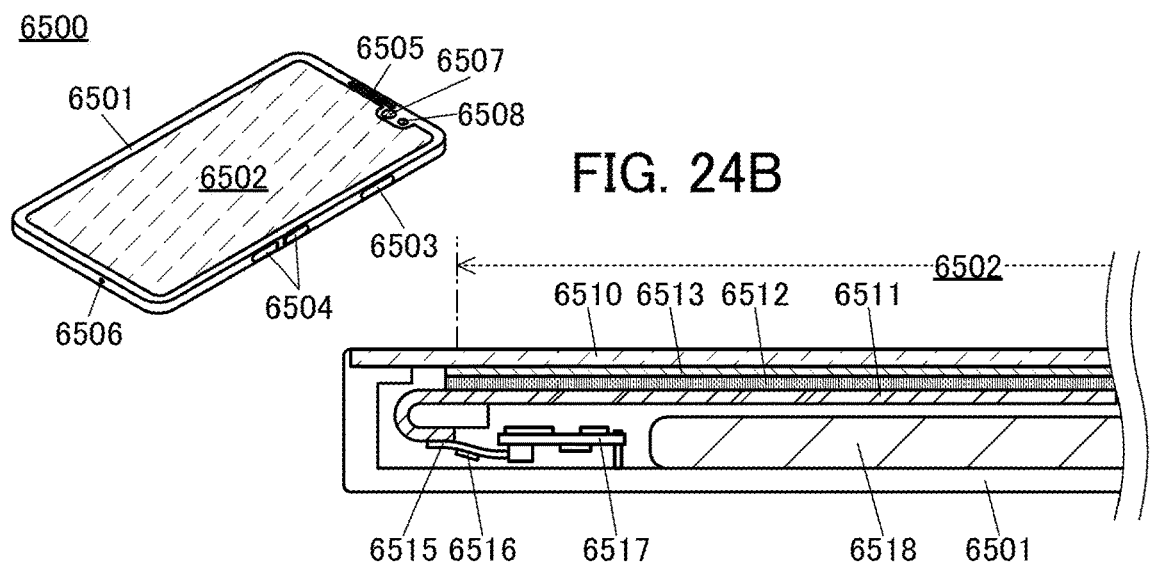
FIG. 24C
7100
7101
7000
7103
7111
FIG. 24D
7200
7211
7000
7212
7213
7214
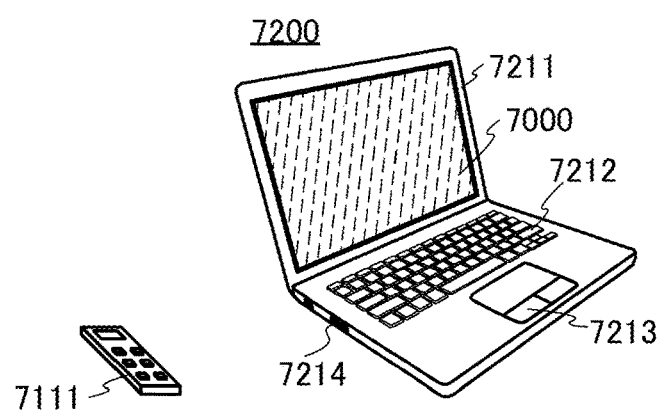
FIG. 24E
7300
7301
7303
7000
7311
FIG. 24F
7400
7401
7000
7411
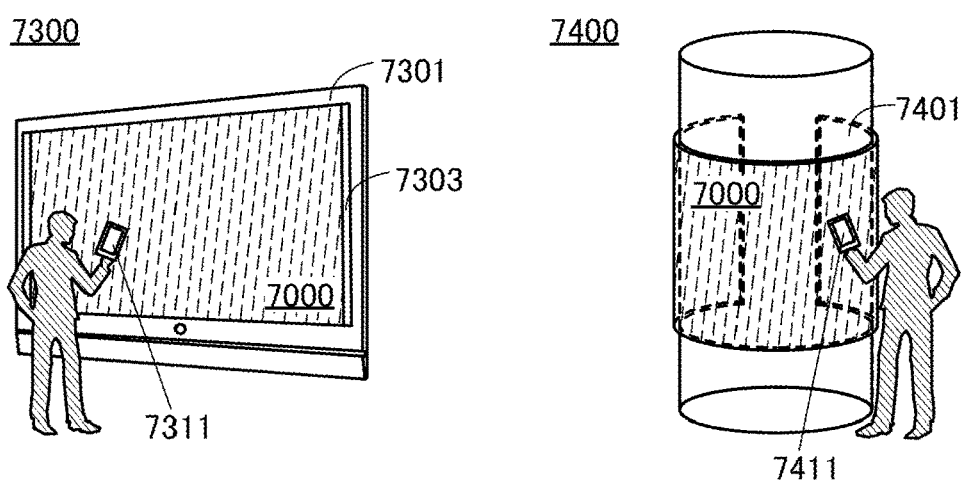

FIG. 25A
9101
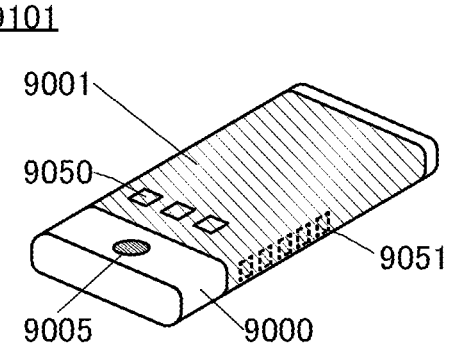
FIG. 25B
9102
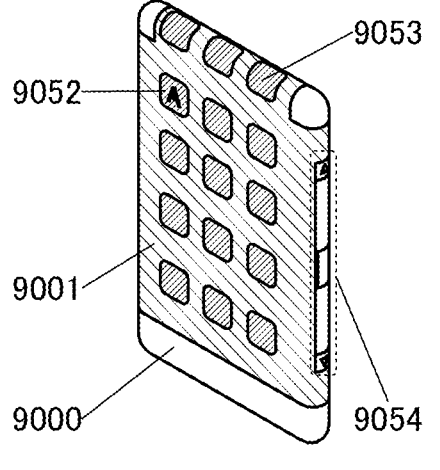
FIG. 25C
9103
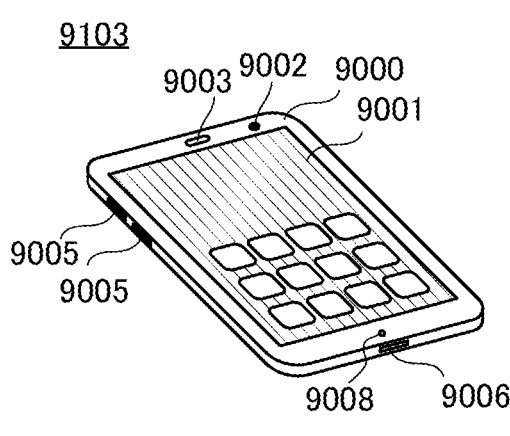
FIG. 25D
9200
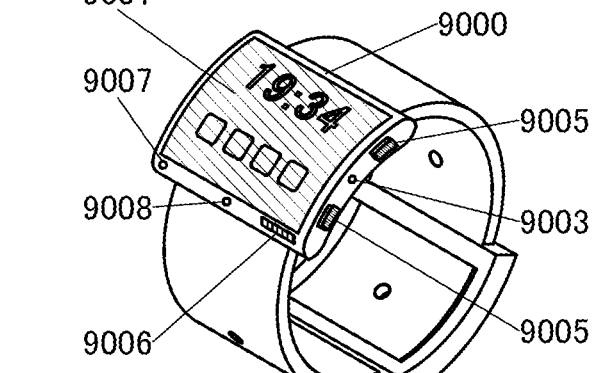
FIG. 25E
9201
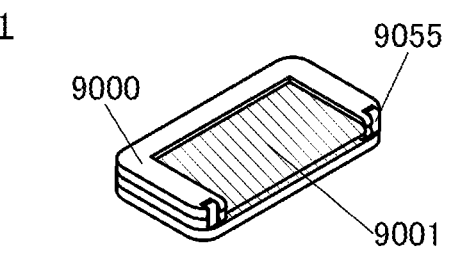
FIG. 25F
9201
FIG. 25G
9201

CORRECTION METHOD OF DISPLAY APPARATUS AND CORRECTION SYSTEM OF THE DISPLAY APPARATUS

This application is a 371 of international application PCT/IB2022/056030 filed on Jun. 29, 2022, which is incorporated herein by reference.

TECHNICAL FIELD

One embodiment of the present invention relates to a correction method of a display apparatus. One embodiment of the present invention relates to a correction system of a display apparatus.

Note that one embodiment of the present invention is not limited to the above technical field. Examples of the technical field of one embodiment of the present invention disclosed in this specification and the like include a semiconductor device, a display apparatus, a light-emitting apparatus, a power storage device, a memory device, an electronic device, a lighting device, an input device, an input/output device, a driving method thereof, and a manufacturing method thereof. A semiconductor device refers to any device that can function by utilizing semiconductor characteristics.

BACKGROUND ART

In recent years, higher-resolution or higher-definition display panels have been required. Examples of devices that require high-definition display panels include a smartphone, a tablet terminal, a laptop computer, and the like. In addition, higher definition has been required for a stationary display apparatus such as a television device or a monitor device with an increase in resolution. Furthermore, a device for virtual reality (VR) or augmented reality (AR) is given as an example of a device that is required to have the highest definition.

In addition, examples of a display apparatus that can be employed for a display panel include, typically, a liquid crystal display apparatus, a light-emitting apparatus including a light-emitting element such as an organic EL (Electro Luminescence) element or a light-emitting diode (LED), electronic paper performing display by an electrophoretic method or the like, and the like.

For example, the basic structure of an organic EL element is a structure in which a layer containing a light-emitting organic compound is sandwiched between a pair of electrodes. By applying voltage to this element, light emission can be obtained from the light-emitting organic compound. A display apparatus employing such an organic EL element does not need a backlight that is necessary for a liquid crystal display apparatus and the like; thus, a thin, lightweight, high-contrast, and low-power display apparatus can be achieved. Patent Document 1, for example, discloses an example of a display apparatus using an organic EL element.

In addition, an improvement in display quality has been required for display panels. Examples of causes for a decrease in display quality include variation in characteristics of pixel transistors, unevenness caused by variation in characteristics of display elements, and a defect such as a point defect or a line defect.

Furthermore, as a method for evaluating display quality of display panels, the use of MTF (Modulation Transfer Function) used for evaluation of camera performance has been proposed for evaluation of display panels (Non-Patent Document 1).

REFERENCE

Patent Document

[Patent Document 1] Japanese Published Patent Application No. 2002-324673

Non-Patent Document

[Non-Patent Document 1] K. Masaoka, "Simulation of Line-Based MTF Measurements for Pixelated Displays", SID 2020 DIGEST, pp. 854-857

SUMMARY OF THE INVENTION

Problems to Be Solved by the Invention

The number of pixels becomes larger as the resolution of a display apparatus becomes higher. Thus, there is a problem in that the display apparatus becomes susceptible to variation in characteristics of transistors included in pixels, variation in characteristics of display elements, or the like, which results in noticeable display unevenness.

An object of one embodiment of the present invention is to increase display quality of a display apparatus. Another object is to provide a correction method of a display apparatus. Another object is to provide a method for evaluating display quality of a display apparatus. Another object is to provide a method or a system that can perform correction and evaluation of a display apparatus through a series of processings. Another object is to provide a novel method for image correction or a novel system for image correction. An object of one embodiment of the present invention is to at least reduce at least one of problems of conventional art.

Note that the description of these objects does not preclude the presence of other objects. Note that in one embodiment of the present invention, there is no need to achieve all the objects. Note that other objects can be derived from the description of the specification, the drawings, the claims, and the like.

Means for Solving the Problems

One embodiment of the present invention is a correction method of a display apparatus. The display apparatus includes a display panel, a correction circuit, and a memory. First, first imaging data including all pixels in the display apparatus is acquired in a state where an image with a first grayscale is displayed on the display apparatus. Then, second imaging data including all the pixels in the display apparatus is acquired in a state where an image with a second grayscale is displayed on the display apparatus. Next, correction data is generated based on the first imaging data and the second imaging data. After that, the correction data is output to the memory of the display apparatus. The correction circuit has a function of correcting image data based on the correction data stored in the memory to generate corrected image data and outputting the corrected image data to the display panel.

Another embodiment of the present invention is a correction method of a display apparatus. The display apparatus includes a display panel, a correction circuit, and a memory. First, first imaging data including all pixels in the display apparatus is acquired in a state where an image with a first grayscale is displayed on the display apparatus. Then, second imaging data including all the pixels in the display apparatus is acquired in a state where an image with a second grayscale is displayed on the display apparatus. Next, correction data is generated based on the first imaging data and the second imaging data. After that, the correction data is output to the memory of the display apparatus. Then, third imaging data is acquired in a state where a test image is displayed on the display apparatus. Next, an MTF value is calculated based on the third imaging data. After that, a determination is made based on the MTF value. The correction circuit has a function of correcting image data based on the correction data stored in the memory to generate corrected image data and outputting the corrected image data to the display panel.

In addition, in any of the above, it is preferable that the display apparatus include N×M (each of N and M is a natural number) pixels and that the correction data have N×M correction values corresponding to the N×M pixels.

Furthermore, in any of the above, the correction data preferably has address information of the pixel having a point defect among the pixels included in the display panel.

Moreover, in any of the above, each of the first imaging data and the second imaging data is preferably acquired by scanning and imaging of the display panel. Alternatively, each of the first imaging data and the second imaging data is preferably acquired by imaging of the entire display panel.

Another embodiment of the present invention is a correction system of a display apparatus. The display apparatus includes a display panel, a correction circuit, and a memory. The correction system includes a correction data generation portion, a drive signal generation portion, a timing controller, and an imaging device. The drive signal generation portion has a function of generating image data and outputting the image data to the timing controller. The timing controller has a function of generating a control signal based on the image data, a function of outputting the image data to the display apparatus, and a function of outputting the control signal to the imaging device. The display apparatus has a function of displaying an image on the display panel based on the image data. The imaging device has a function of acquiring imaging data including all pixels in the display panel based on the control signal in a state where an image is displayed on the display panel and outputting the imaging data to the correction data generation portion. The correction data generation portion has a function of generating correction data based on the imaging data and outputting the correction data to the display apparatus. The memory of the display apparatus has a function of storing the correction data. The correction circuit has a function of correcting image data based on the correction data stored in the memory to generate corrected image data and outputting the corrected image data to the display panel.

In addition, in the above, the display apparatus preferably includes N×M (each of N and M is a natural number) pixels. In that case, the correction data generation portion preferably has a function of generating the correction data so that the correction data has N×M correction values corresponding to the N×M pixels.

In addition, in any of the above, the correction data generation portion preferably has a function of generating the correction data so that the correction data has address information of the pixel having a point defect among the pixels included in the display panel.

Furthermore, in any of the above, the imaging device preferably has a function of acquiring the imaging data by scanning and imaging of the display panel. Alternatively, the imaging device preferably has a function of acquiring the imaging data by imaging of the entire display panel. In that case, the imaging device has higher resolution than the display panel.

Effect of the Invention

According to one embodiment of the present invention, it is possible to increase display quality of a display apparatus. Alternatively, it is possible to provide a correction method of a display apparatus. Alternatively, it is possible to provide a method for evaluating display quality of a display apparatus. Alternatively, it is possible to provide a method or a system that can perform correction and evaluation of a display apparatus through a series of processings. Alternatively, it is possible to provide a novel method for image correction or a novel system for image correction. Alternatively, it is possible to at least reduce at least one of problems of conventional art.

Note that the description of these effects does not preclude the presence of other effects. Note that one embodiment of the present invention does not necessarily have all of these effects. Note that other effects can be derived from the description of the specification, the drawings, and the claims.

BRIEF DESCRIPTION OF THE DRAWINGS

FIG. 4A to FIG. 4D are diagrams each showing correction data.

FIG. 5A to FIG. 5C are diagrams each showing correction data.

FIG. 24A to FIG. 24F are diagrams illustrating structure examples of electronic devices.

FIG. 25A to FIG. 25G are diagrams illustrating structure examples of electronic devices.

MODE FOR CARRYING OUT THE INVENTION

Figure 1:
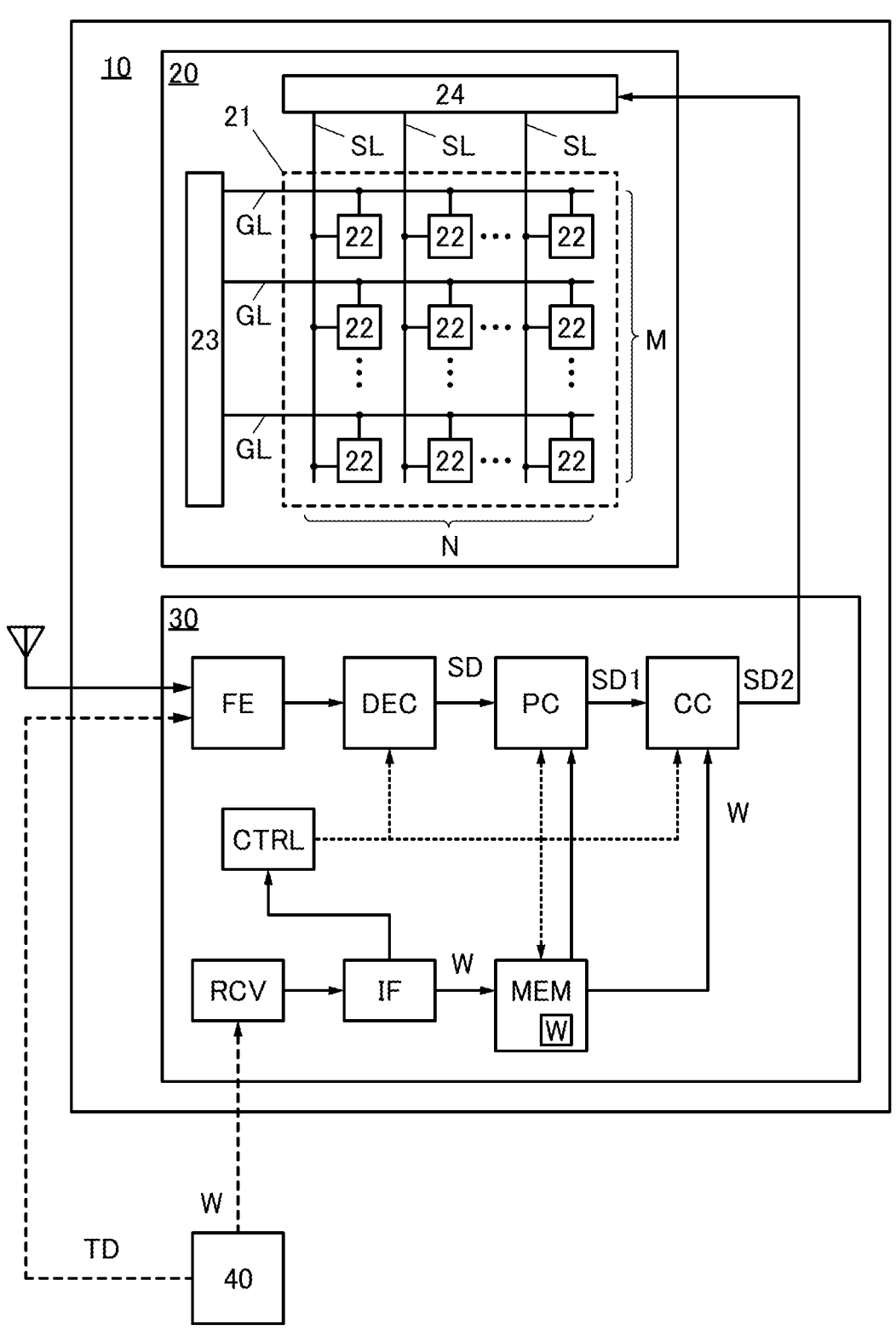
FIG. 1 is a diagram illustrating a structure example of a display apparatus.

Embodiments will be described below with reference to the drawings. Note that the embodiments can be implemented with many different modes, and it will be readily understood by those skilled in the art that modes and details thereof can be changed in various ways without departing from the spirit and scope thereof. Therefore, the present invention should not be construed as being limited to the description of embodiments below.

Note that in structures of the present invention described below, the same reference numerals are commonly used for the same portions or portions having similar functions in different drawings, and a repeated description thereof is omitted. Moreover, similar functions are denoted by the same hatch pattern and are not denoted by specific reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that ordinal numbers such as "first" and "second" in this specification are used in order to avoid confusion among components and do not limit the number of components.

Embodiment 1

In this embodiment, structure examples of a display apparatus, a system structure example, a correction method, and the like according to one embodiment of the present invention will be described.

Structure Example of Display Apparatus

FIG. 1 illustrates a structure example of a display apparatus 10. The display apparatus 10 includes a display panel 20 and a signal generation portion 30. The signal generation portion 30 has a function of generating a signal for displaying a predetermined video based on data received from the outside and outputting the signal to the display panel 20. The display panel 20 has a function of displaying an image on a display portion in accordance with a signal input from the signal generation portion 30.

Structure Example of Display Panel

The display panel 20 includes a pixel portion 21 including a plurality of pixels 22, a driver circuit 23, and a driver circuit 24.

The pixels 22 each include a display element and have a function of displaying a predetermined grayscale. Then, grayscales of the pixels 22 are controlled with signals output from the driver circuit 23 and the driver circuit 24, and a predetermined image is displayed on the pixel portion 21.

Examples of the display element provided in the pixel 22 include a liquid crystal element and a light-emitting element.

As the liquid crystal element, a transmissive liquid crystal element, a reflective liquid crystal element, a transflective liquid crystal element, or the like can be used. In addition, as the display element, a shutter type MEMS (Micro Electro Mechanical Systems) element, an optical interference type MEMS element, or a display element using a microcapsule method, an electrophoretic method, an electrowetting method, an Electronic Liquid Powder (registered trademark) method, or the like can be used, for example. Furthermore, examples of the light-emitting element include a self-luminous element such as an OLED (Organic Light Emitting Diode), an LED (Light Emitting Diode), a QLED (Quantum-dot Light Emitting Diode), and a semiconductor laser.

In FIG. 1, M×N pixels 22 are provided in the pixel portion 21. Note that the number of pixels 22 provided in the pixel portion 21 can be set freely. For example, in the case of displaying a 4K2K video on the display panel 20, 3840× 2160 or more pixels 22 or 4096×2160 or more pixels 22 are preferably provided in the pixel portion 21. Furthermore, in the case of displaying an 8K4K video, 7680×4320 or more pixels 22 are preferably provided in the pixel portion 21. Moreover, a larger number of pixels 22 can be provided in the pixel portion 21. The pixels 22 are connected to wirings SL and wirings GL. In addition, the wirings GL are connected to the driver circuit 23, and the wirings SL are connected to the driver circuit 24.

The driver circuit 23 has a function of supplying a signal for selecting the pixels 22 (hereinafter such a signal is also referred to as a selection signal) to the pixels 22. Specifically, the driver circuit 23 has a function of supplying a selection signal to the wiring GL, and the wiring GL has a function of transmitting the selection signal output from the driver circuit 23 to the pixels 22. The driver circuit 23 can be referred to as a scan line driver circuit, a gate driver circuit, a gate driver, or the like. The wiring GL can be also referred to as a selection signal line, a gate line, or the like.

The driver circuit 24 has a function of supplying a video signal to the pixels 22. Specifically, the driver circuit 24 has a function of supplying a video signal to the wiring SL, and the wiring SL has a function of transmitting the video signal output from the driver circuit 24 to the pixels 22. The driver circuit 24 can be also referred to as a signal line driver circuit, a source driver circuit, a source driver, or the like. The wiring SL can be also referred to as a video signal line, a source line, or the like. When the video signal is supplied to the pixels 22 to which the selection signal is supplied, the video signal is written to the pixels 22 and a predetermined grayscale is displayed.

Structure Example of Signal Generation Portion

The signal generation portion 30 has a function of generating a video signal based on data input from the outside. The signal generation portion 30 includes a front end portion FE, a decoder DEC, a processing circuit PC, a correction circuit CC, a receiving portion RCV, an interface IF, a memory portion MEM, a control circuit CTRL, and the like.

The front end portion FE has a function of receiving a signal input from the outside and performing signal processing as appropriate. For example, a broadcast signal coded and modulated by a predetermined method, or the like is input to the front end portion FE. The front end portion FE can have a function of demodulating a received video signal, performing analog-digital conversion, or the like. Furthermore, the front end portion FE may also have a function of correcting an error. Data that is received by the front end portion FE and subjected to signal processing is output to the decoder DEC.

The decoder DEC has a function of decoding a coded signal. In the case where image data contained in a broadcast signal input to the front end portion FE has been compressed, the image data is decompressed by the decoder DEC. For example, the decoder DEC can have a function of performing inverse quantization, inverse orthogonal transform such as inverse discrete cosine transform (IDCT) or inverse discrete sine transform (IDST), entropy decoding, intra-frame prediction, inter-frame prediction, or the like.

Note that as a coding standard in an 8K4K television broadcast, H.265/MPEG-H High Efficiency Video Coding (hereinafter referred to as HEVC) is employed. In the case where the image data included in the broadcast signal input to the front end portion FE is coded according to HEVC, decoding according to HEVC is performed by the decoder DEC.

Image data SD is generated by decoding processing by the decoder DEC and is output to the processing circuit PC.

Although FIG. 1 illustrates an example in which signals are input to the front end portion FE through an antenna, one embodiment of the present invention is not limited thereto. For example, the front end portion FE may function as an interface that receives not only broadcast signals but also a variety of image signals. The front end portion FE can also receive digital image signals that are generated by an arithmetic processing device such as a CPU (Central Processing Unit) or a GPU (Graphics Processing Unit). In this case, the image signals may be output to the processing circuit PC without going through the decoder DEC.

As illustrated in FIG. 1, the front end portion FE can also receive data TD that is video data used at the time of executing correction processing from a correction system 40.

The processing circuit PC has a function of performing image processing on the image data SD input from the decoder DEC, generating data SD1, and outputting the data SD1 to the correction circuit CC.

Examples of the image processing include noise removal processing, grayscale conversion processing, tone correction processing, and luminance correction processing. The tone correction processing and the luminance correction processing can be performed with the use of gamma correction or the like. Furthermore, the processing circuit PC may have a function of executing pixel interpolation processing accompanying resolution up-conversion, frame interpolation processing accompanying frame frequency up-conversion, or the like.

Examples of the noise removal processing include removal of a variety of noise such as mosquito noise that appears near the outlines of characters and the like, block noise that appears in high-speed moving images, random noise that causes flickers, and dot noise caused by resolution up-conversion.

The grayscale conversion processing is processing in which a grayscale displayed by the data SD1 is converted into a grayscale corresponding to output characteristics of the display panel 20. For example, in the case where the number of grayscales is increased, grayscale values corresponding to pixels are interpolated to image data with a small number of grayscales and assigned to the pixels, so that processing for smoothing a histogram can be performed. In addition, high-dynamic range (HDR) processing for increasing a dynamic range is also included in the grayscale conversion processing.

The tone correction processing is processing of correcting the tone of a video. In addition, the luminance correction processing is processing of correcting the brightness (luminance contrast) of a video. The luminance and tone of a video displayed on the display panel 20 are corrected to be optimal in accordance with the kind, luminance, color purity, or the like of lighting placed in a space in which the display panel 20 is provided, for example.

The pixel interpolation processing is processing of interpolating data that does not exist originally when resolution is up-converted. For example, as data of the colors of a pixel that is newly interpolated (e.g., grayscale values corresponding to the colors, red (R), green (G), and blue (B)), data is interpolated to be data of a color intermediate between the colors of pixels around the pixel with reference to data of the colors of the pixels around the pixel.

The frame interpolation processing is processing of generating an image for a frame that does not exist originally (an interpolation frame) in the case where the frame frequency of an image to be displayed is increased. For example, an image for an interpolation frame that is interposed between certain two images is generated from a difference between the two images. Alternatively, images for a plurality of interpolation frames can be generated between the two images. For example, by generating a plurality of interpolation frames when the frame frequency of image data is 60 Hz, the frame frequency of a video signal output to the display panel 20 can be increased twofold (120 Hz), fourfold (240 Hz), eightfold (480 Hz), or the like.

Note that it is also possible to perform the image processing by an image processing circuit that is provided separately from the processing circuit PC.

The correction circuit CC has a function of correcting the data SD1 input from the processing circuit PC based on correction data W and generating corrected data SD2. In addition, the data SD2 corrected by the correction circuit CC is output to the driver circuit 24 in the display panel 20. The display panel 20 can display an image on the pixel portion 21 based on the data SD2.

The receiving portion RCV has a function of receiving data, a control signal, or the like input from the outside. Examples of the receiving portion RCV include an external connection terminal such as a data input terminal or a video input terminal and a wireless communication module.

The correction data W or the like used in the correction circuit CC can be transmitted from the correction system 40 or the like provided outside the signal generation portion 30 and can be received by the receiving portion RCV.

The interface IF has a function of processing data or a control signal received by the receiving portion RCV as appropriate and outputting the data or control signal to the memory portion MEM or the control circuit CTRL.

The control circuit CTRL has a function of controlling the operations of the circuits included in the signal generation portion 30. For example, the control circuit CTRL has a function of supplying a control signal to the decoder DEC, the processing circuit PC, the correction circuit CC, the memory portion MEM, or the like. The control by the control circuit CTRL may be performed based on a control signal or the like received by the receiving portion RCV.

The memory portion MEM has a function of storing data. The memory portion MEM stores the correction data W. The memory portion MEM preferably includes a nonvolatile memory device so that the correction data W is held even when power supply to the display apparatus 10 is stopped.

The correction circuit CC reads the correction data W from the memory portion MEM based on control by the control circuit CTRL and corrects the data SD1 using the correction data W to generate the data SD2. The correction data W may be read only at the time of starting up the display apparatus 10. In that case, the correction circuit CC includes a memory in addition to a processor.

The display apparatus 10 can compose part of an electronic device provided with a display portion. For example, it is possible to employ the display apparatus 10 for electronic devices including display portions with a variety of sizes, such as an ultra-large device for digital signage or the like; a large device such as a television device or a monitor device; a medium-size device such as a tablet terminal or a notebook-type terminal; a small device such as a smartphone or a wristwatch-type terminal; and an ultra-small device for VR or AR.

Correction System

A correction system described below as an example has a function of generating the correction data W to be supplied to the display apparatus 10 described above as an example. The display apparatus 10 can display an image based on the data SD2 corrected using the correction data W supplied from the correction system.

In addition, the correction system has a function of determining whether display quality of display after correction in the display apparatus 10 is a fail or a pass. In the case where the display quality does not exceed a specified level despite the correction, the correction system can determine that the display apparatus 10 is a defective item.

Figure 2:
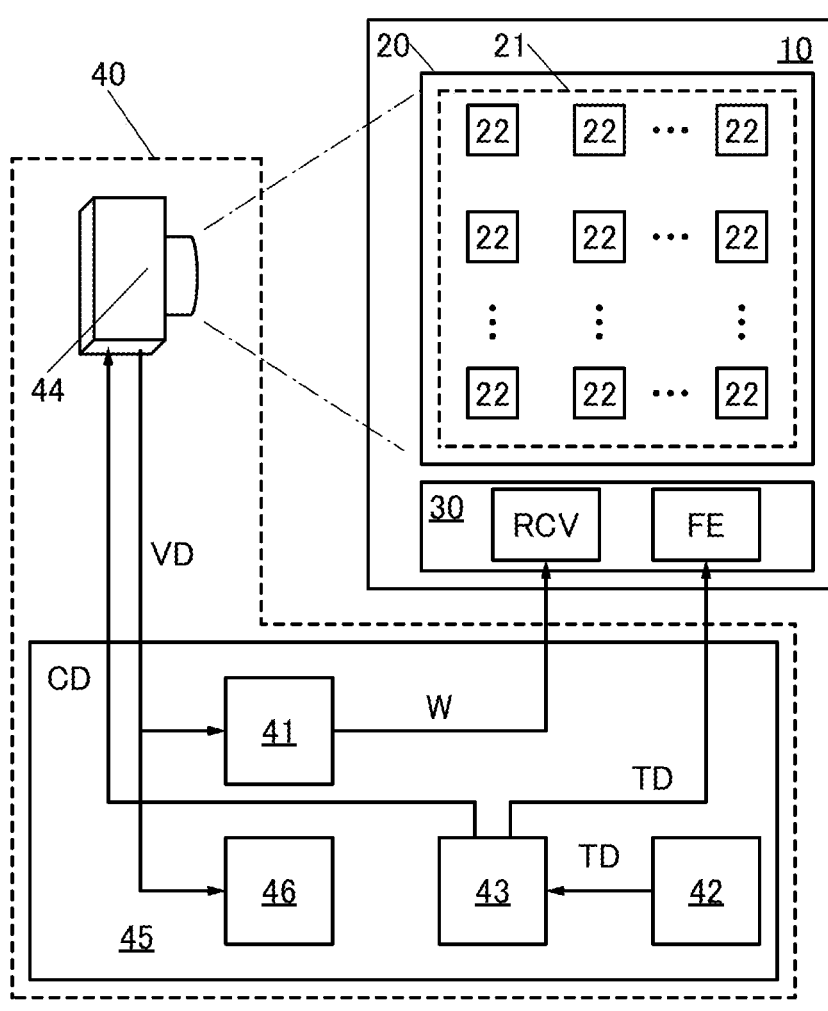
FIG. 2 is a diagram illustrating a structure example of a correction system.

FIG. 2 illustrates a structure example of the correction system 40. FIG. 2 illustrates the correction system 40 and the display apparatus 10. Although FIG. 2 illustrates only part of the display panel 20 and part of the signal generation portion 30 as the display apparatus 10 for simplicity, FIG. 1 can be referred to for the structure of the display apparatus 10.

The correction system 40 includes a processing device 45 and an imaging device 44.

The correction system 40 can capture images of all pixels by the imaging device 44 in a state where the data TD is output to the display apparatus 10 and an image based on the data TD is displayed on the display panel 20, and can generate the correction data W based on imaging data of all the pixels.

The imaging device 44 can capture images of all the pixels 22 included in the pixel portion 21 in the display panel 20. In addition, captured image data is output to the processing device 45 as imaging data VD. For example, a camera, a 2D luminance meter, or the like can be used as the imaging device 44.

The processing device 45 includes a correction data generation portion 41, a signal generation portion 42, a timing controller 43, and a determination portion 46.

The signal generation portion 42 has a function of generating the data TD. The signal generation portion 42 can generate the data TD that is image data to be output to the display apparatus 10 based on a test pattern stored in advance. Thus, the test pattern can be displayed on the pixel portion 21 in the display apparatus 10.

The timing controller 43 has a function of adjusting timing of displaying the test pattern of the display apparatus 10 and timing of imaging by the imaging device 44. The timing controller 43 has a function of generating data CD that is a control signal for controlling timing of imaging by the imaging device 44. In addition, the timing controller 43 outputs the data TD and the data CD to the display apparatus 10 and the imaging device 44, respectively so that they are in synchronization with each other.

The correction data generation portion 41 has a function of generating the correction data W based on the imaging data VD and outputting the correction data W to the display apparatus 10.

The determination portion 46 has a function of determining whether the display quality is a fail or a pass based on the imaging data VD. Unlike the imaging data VD for correction, the imaging data VD used for determination does not necessarily include information of all the pixels, and the imaging data VD can be made optimal in accordance with a determination method.

Imaging Method

Here, an imaging method for correction is described. The imaging device 44 captures images of all the pixels included in the display panel 20. Therefore, the imaging method can be varied depending on the size of the display panel 20 or the resolution, focal length, angle of view, or the like of the imaging device 44.

Figure 3A:
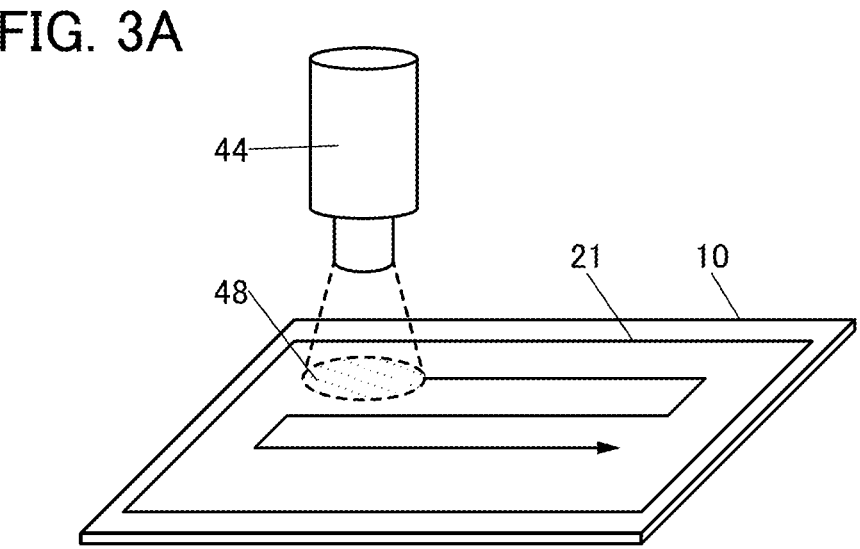
FIG. 3A to FIG. 3C are diagrams each illustrating an imaging method.

FIG. 3A illustrates an example of an imaging method when the size of the pixel portion 21 in the display apparatus 10 is larger than an imaging range 48 of the imaging device 44. As illustrated in FIG. 3A, when images are captured by scanning of the imaging device 44 or the display apparatus 10, information of the luminance of all the pixels can be acquired.

Figure 3B:
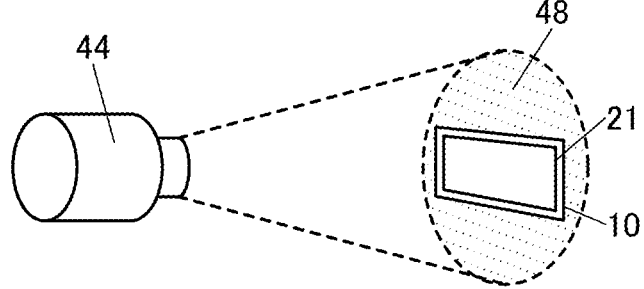

FIG. 3B illustrates an example of an imaging method when the size of the pixel portion 21 in the display apparatus 10 is within the imaging range 48 of the imaging device 44. In this case, information of the luminance of all the pixels can be acquired through imaging performed once. By making the resolution (the number of pixels) of the imaging device 44 higher than the resolution (the number of pixels) of the pixel portion 21 in the display panel 20, the luminance of all the pixels in the display panel 20 can be acquired with high accuracy.

Figure 3C:
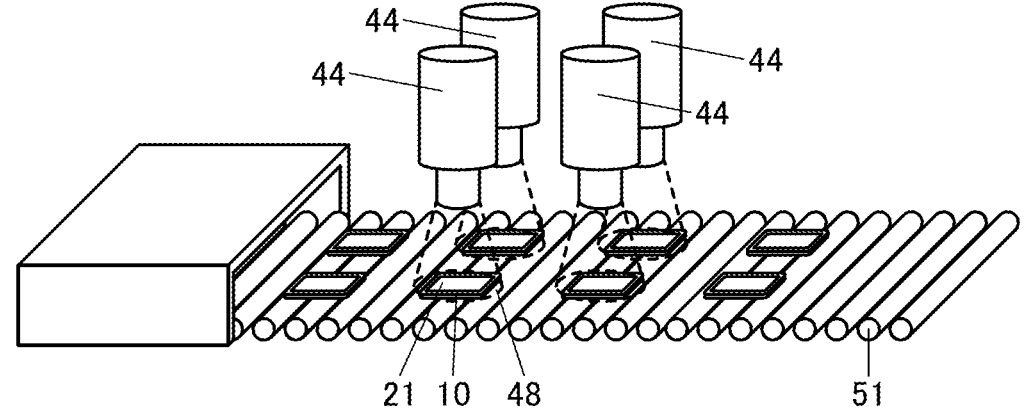

FIG. 3C illustrates an example of an imaging method when a plurality of display apparatuses 10 perform imaging at the same time. The display apparatuses 10 are moved by a transfer device 51. A plurality of fixed imaging devices 44 are placed above the transfer device 51. The display apparatus 10 is transferred by the transfer device 51 so that it passes through the imaging range 48 of any of the imaging devices 44. Accordingly, correction processings of the plurality of display apparatuses 10 can be performed at the same time, so that this imaging method is suitable for mass production of the display apparatuses 10.

Generation of Correction Data W

Examples of a method for generating correction data in the correction data generation portion 41 by using information of the luminance of the pixels are described below.

The luminance of the pixels is acquired in a state where all the pixels perform display with predetermined grayscale values. In this case, the display is preferably performed without correction because more effective correction data can be generated.

FIG. 4A shows an example of acquired luminance information. Here, as an example, a description is made on the case where data is acquired when a grayscale value T is 40 (T=40). FIG. 4A is a diagram schematically showing luminance data L(40) when the grayscale value is 40. The luminance data L(40) has information of luminance values corresponding to all the pixels 22 provided in the pixel portion 21 in the display panel 20. In FIG. 4A, luminance values that correspond to 4×4 pixels including pixels in i rows and j columns (i is an integer larger than or equal to 1 and smaller than or equal to M, and j is an integer larger than or equal to 1 and smaller than or equal to N) are shown side by side. FIG. 4A shows the luminance values of the pixels when predetermined luminance at the time of performing display with the grayscale value of 40 is set to 40. For example, the luminance value of a pixel in an i-th row and a j-th column is denoted by Li,j(40). Pixels whose luminance values are each larger than 40 mean that the pixels each light up brighter than the predetermined luminance, and pixels whose luminance values are each smaller than 40 mean that the pixels each light up darker than the predetermined luminance.

FIG. 4B shows differential data D(40) showing differential values between the luminance values of the luminance data L(40) and a predetermined luminance value of 40. For example, the differential value of the pixel in the i-th row and the j-th column is denoted by Di,j(40). Pixels whose luminance values are positive mean that the pixels each light up brighter than the predetermined luminance, and pixels whose luminance values are negative mean that the pixels each light up darker than the predetermined luminance. Note that the differential data D shown here is shown for explanation, and it is not always necessary to calculate the differential data D at the time of generating the correction data W.

The differential data D(40) given as an example in FIG. 4B shows the difference with the predetermined luminance; thus, all the pixels can perform display at the predetermined luminance when image data to be input to the display panel 20 is corrected in advance so that the difference is canceled. That is, correction data W(40) when the grayscale value T is 40 can be data whose positive/negative is inverted from the differential data D(40), as shown in FIG. 4C. In FIG. 4C, a correction value of the pixel in the i-th row and the j-th column that is included in the correction data W(40) is denoted by $W_{i,j}(\mathbf{40})$.

Here, although the correction data W(40) when the grayscale value T is 40 is given as an example, correction data W(T) can be generated by a similar method with respect to a plurality of grayscale values T.

FIG. 4D shows a schematic diagram of the correction data W. For example, in the case of 8-bit grayscales, the correction data W can be a data table including from correction data W(0) when the grayscale value T is 0 to correction data W(255) when the grayscale value T is 255. Each correction data W(T) includes M×N correction values from a correction value $W_{1,1}(T)$ of a pixel in a first row and a first column to a correction value $W_{M,N}(T)$ of a pixel in an M-th row and an N-th column.

The correction data W may be generated in such a way that the correction data W(T) is generated for all grayscale values (for example, from T=0 to T=255) or the correction data W(T) is generated for some grayscale values T and the correction data W(T) for the other grayscale values is interpolated. An interpolation method such as linear interpolation or non-linear interpolation can be used as appropriate for the interpolation.

Note that in fact, in the case of a full-color display panel, subpixels of three colors of red (R), green (G), and blue (B) are included. Thus, it is preferable to generate the correction data W for the subpixel of each color. Furthermore, in the case where subpixels of yellow (Y) and white (W) are included in addition to the subpixels of R, G, B, it is possible to generate the correction data W for the subpixels of these colors.

Next, a method for generating the correction data W when the display panel 20 includes a defective pixel that does not light up (also referred to as a dark-dot defect).

FIG. 5A is an example of the luminance data L(40) when a pixel in an i+1-th row and a j+2-th column has a dark-dot defect. Since the pixel does not light up, a luminance value $L_{i+1,j+2}(\mathbf{40})$ is 0.

The correction data generation portion 41 can determine that a pixel whose luminance value is 0 or in the vicinity thereof is a pixel having a point defect. In FIG. 5B, in order to show that a differential value $D_{i+1,j+2}(\mathbf{40})$ of the pixel corresponds to data of a pixel having a dark-dot defect, the differential value $D_{i+1,j+2}(\mathbf{40})$ of the pixel is denoted by X.

In the case where a pixel having a dark-dot defect is included, lighting up of pixels around the pixel brighter than the predetermined luminance enables compensation of luminance that should have been originally output from the pixel having a dark-dot defect and can make display closer to correct display in some cases. In particular, as the definition becomes higher to the point where pixels are not recognized visually, such a method can make display closer to correct display. Note that in the case where the definition is low, centering on the pixel having a dark-dot defect, the area of a portion that lights up bright becomes larger; therefore, attention is necessary because the defect sometimes becomes noticeable conversely.

An example is shown below in which correction values of eight pixels around the pixel having a dark-dot defect are set to be larger than original correction values. As shown in FIG. 5C, for example, when the grayscale value T is 40, the sum of luminance values of 3×3 pixels including the pixel having a dark-dot defect should be 40×9=360. Therefore, the correction values of the pixels are corrected to be higher than the original correction values by addition of revised values to the correction values corresponding to the pixels so that the sum of the luminance values of the eight pixels excluding the pixel having a dark-dot defect is 360. In that case, it is preferable to perform correction so that the correction value becomes larger as the pixel becomes closer to the pixel having a dark-dot defect. FIG. 5C is an example where the correction values of four pixels positioned on the left, right, top, and bottom of the pixel having a dark-dot defect are corrected so that the luminance value is 47 and the correction values of four closest pixels that are positioned obliquely with respect to the pixel having a dark-dot defect are corrected so that the luminance value is 43.

Note that a distance between pixels actually varies depending on the pixel arrangement or the like of the display panel 20; thus, the revised values of the correction values of the pixels around the pixel having a dark-dot defect can be set as appropriate in accordance with the structure of the display panel 20. In addition, although the method for compensating for luminance by using the eight pixels around the pixel having a dark-dot defect is described here, one embodiment of the present invention is not limited thereto, and the luminance may be compensated for by using seven or less pixels or nine or more pixels. Also in that case, it is preferable to set the revised values to larger values as the pixels become closer to the pixel having a dark-dot defect.

Furthermore, as shown in FIG. 5C, a sign representing the pixel having a dark-dot defect (here, X) can be left in the correction data W(40). That is, it can be said that the correction data W(40) has address information of the pixel having a dark-dot defect. This makes it possible to store not only information of luminance variation in the display apparatus 10 but also information of the dark-dot defect in the correction data W and to hold the information in the display apparatus 10 itself. Accordingly, for example, in the case where this correction method is used for pre-shipment inspection of a product using the display apparatus 10, results of the pre-shipment inspection are stored in the product as the correction data W, so that this correction method is effective in terms of product warranty on a user.

Note that although the correction method when having a dark-dot defect is described here, it is also possible to make a defect where light does not turn off (a bright-dot defect) less noticeable by a method opposite to the above method in some cases. In other words, revised values are set so that luminance values of pixels around a bright-dot defect become smaller.

The above is the description of generation of the correction data W.

Correction Method of Display Apparatus

A correction method of a display apparatus by using the correction system 40 illustrated in FIG. 2 is described below.

Correction Processing

Figure 6:
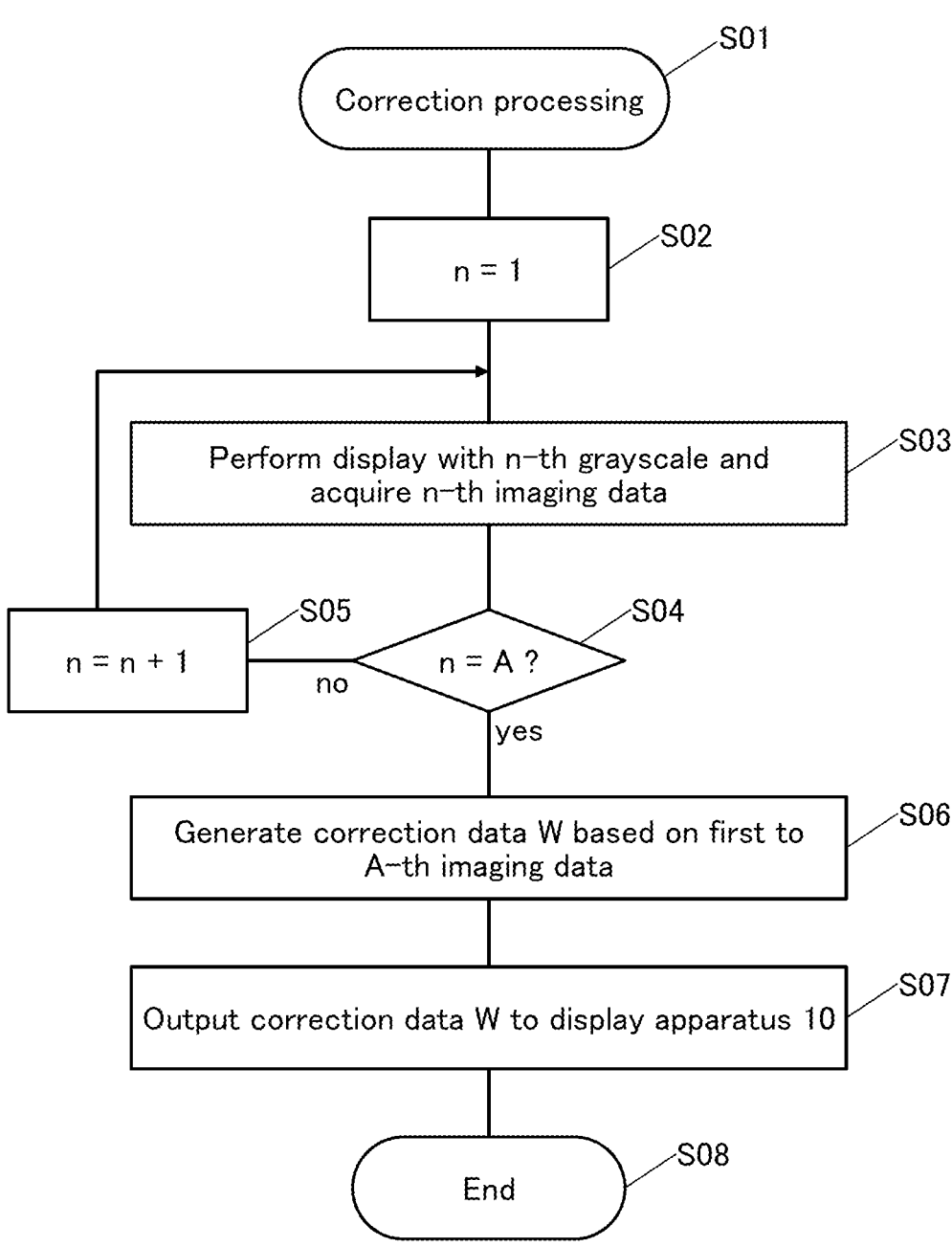
FIG. 6 is a flow chart showing correction processing.

FIG. 6 is a flow chart for correction processing described below. The flow chart shown in FIG. 6 includes Step S01 to Step S08. The correction processing shown in FIG. 6 is an example when imaging is repeatedly performed A times (A is an integer larger than or equal to 1 and smaller than or equal to the largest grayscale value of the display apparatus 10) with different grayscales and the correction data W is generated based on each imaging data.

In Step S01, correction processing starts.

In Step S02, initialization is performed. Specifically, the fact that the number of repetitions is 1 (n=1) is recorded.

In Step 03, all the pixels in the display panel 20 perform display with an n-th grayscale, imaging is performed using the imaging method, and n-th imaging data is acquired.

Specifically, the signal generation portion 42 generates the data TD that is image data with a predetermined grayscale, and the timing controller 43 outputs the data TD and the data CD to the display apparatus 10 and the imaging device 44, respectively. The imaging device 44 performs imaging multiple times as needed in order to capture images of all the pixels and outputs the imaging data VD to the correction data generation portion 41.

In Step S04, whether the number of repetitions reaches the number of predetermined times A (whether n is A) is determined. In the case where the number of repetitions reaches the number of predetermined times (in the case of yes), the step proceeds to Step S06.

In Step S04, in the case where n is smaller than A (in the case of no), the step proceeds to Step S05. In Step S05, 1 is added to the number of repetitions (i.e., n=n+1), and the step proceeds to Step S03. This operation is repeated until n reaches A, so that first to n-th imaging data with respect to first to n-th grayscales can be acquired.

In Step S06, the correction data W is generated based on the first to n-th acquired imaging data (i.e., first to A-th data). The above description can be referred to for the method for generating the correction data W.

In Step S07, the generated correction data W is output to the display apparatus 10. The display apparatus 10 stores the correction data W in the memory portion MEM through the receiving portion RCV and the interface IF.

The above is the description of the correction method (correction processing).

Determination Processing

Figure 7:
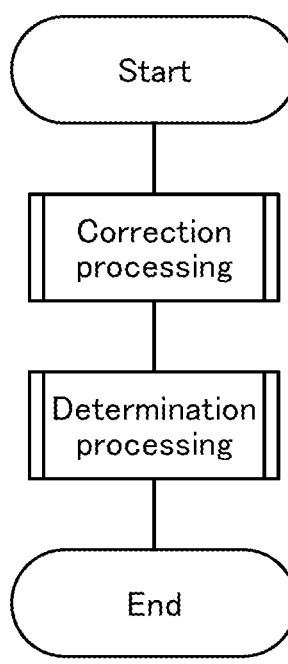
FIG. 7 is a flow chart showing a correction method.

Determination processing preferably follows the correction processing. FIG. 7 is a flow chart of a correction method in that case. Determination processing described below as an example is performed by the determination portion 46, the imaging device 44, and the like illustrated in FIG. 2, for example.

In the determination processing, the display apparatus 10 performs display in a state where image correction is performed based on the correction data W, and whether the display quality of the display apparatus 10 meets a predetermined standard is determined. Accordingly, for example, in the case where this correction method is used for product pre-shipment inspection, it is possible to prevent products whose display quality does not meet the standard even when correction is made using the correction data W from being on the market.

A variety of conventional methods can be used for the determination processing. For example, different criteria can be also used depending on products. However, determining different products under the same criteria is extremely effective in terms of quality control.

For the determination processing, it is preferable to use a method where a modulation transfer function (MTF) that has been widely used for camera performance evaluation is applied to display evaluation. MTF measurements of the display panel can be evaluated by an edge method. For example, an image of a state where a fine line is displayed on the display panel is captured by a camera or a 2D luminance system, and a line spread function (LSF) is calculated from the captured image. An MTF curve is obtained by Fourier transformation of the obtained LSF.

Figure 8:
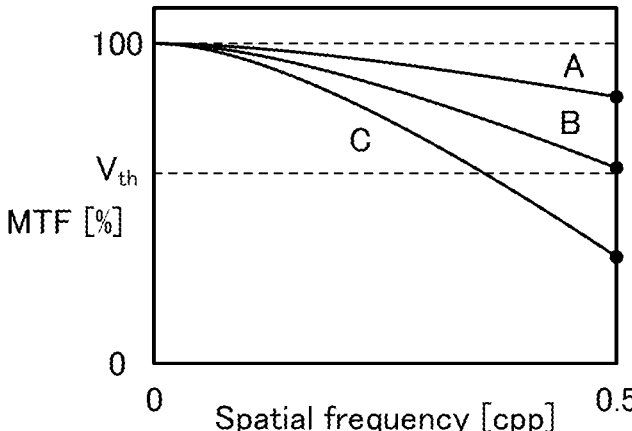
FIG. 8 is a diagram showing MTF examples.

FIG. 8 shows an example of MTF measurement results. Three MTF curves of a display panel A, a display panel B, and a display panel C are shown in descending order of the display quality. In FIG. 8, the vertical axis represents the value of MTF (%). The horizontal axis represents spatial frequency by cpp (cycles per pixels). The spatial frequency is in the range of larger than 0 and smaller than 0.5. A state where the spatial frequency is 0.5 represents, for example, a state where white and black lines are displayed with one pixel pitch, which corresponds to a state where the finest pattern is displayed.

As the value of MTF (hereinafter also referred to as an MTF value) becomes larger, an image can be expressed faithfully, that is, the display panel has high display quality.

Examples of the determination method include determining whether the MTF value when the spatial frequency is 0.5 exceeds a predetermined threshold value ($V_{th}$). By using an MTF value when the finest pattern is displayed as a display quality index, the MTF value can be a simple effective criterion.

In the example shown in FIG. 8, the MTF value of each of the display panel A and the display panel B when the spatial frequency is 0.5 exceeds the threshold value, and thus each of the display panel A and the display panel B can be determined to be a good item. In contrast, the MTF value of the display panel C when the spatial frequency is 0.5 does not reach the threshold value, and thus the display panel C can be determined to be a defective item.

Figure 9:
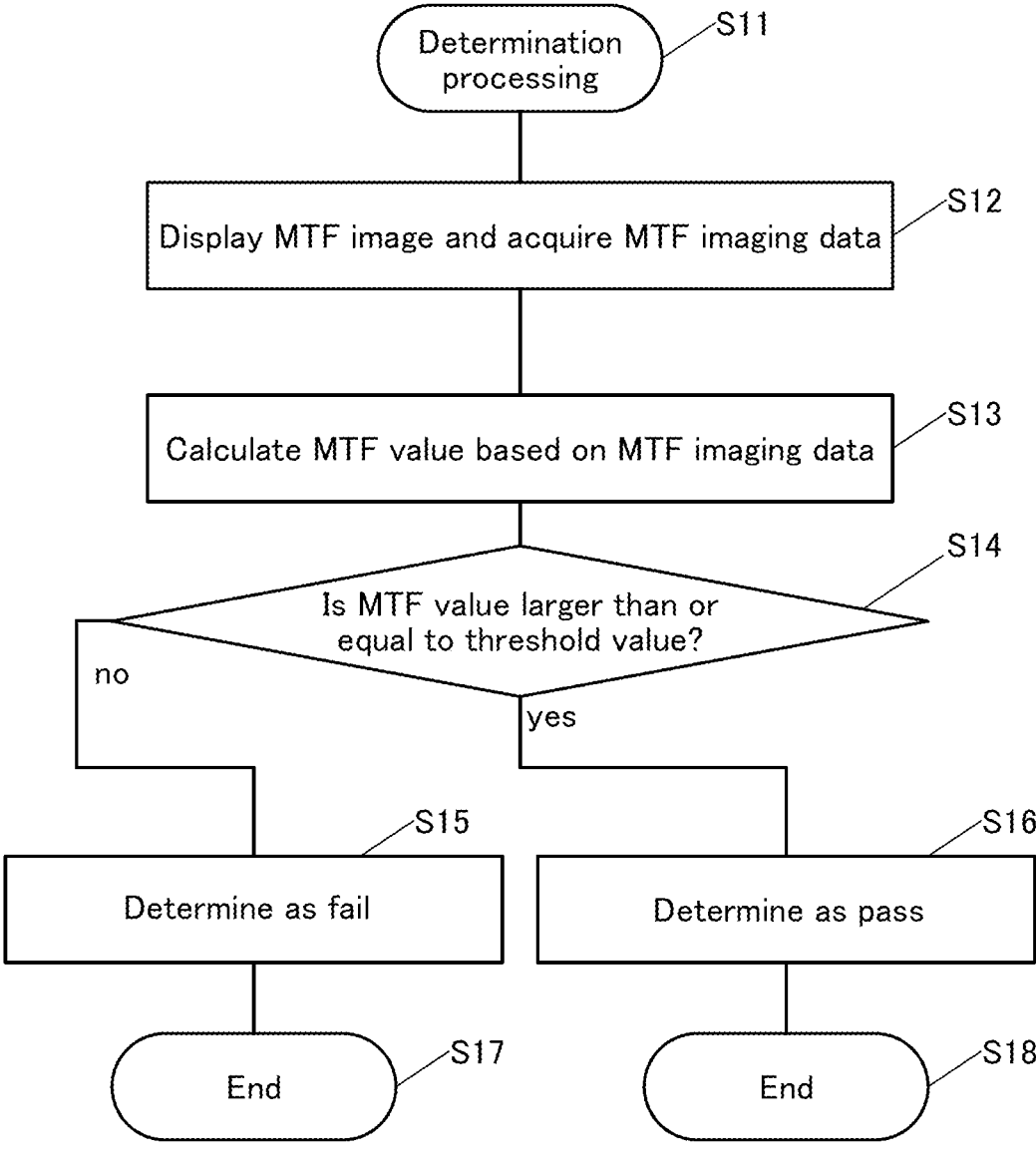
FIG. 9 is a flow chart showing determination processing.

Next, an example of determination processing using MTF is described using a flow chart shown in FIG. 9. The flow chart shown in FIG. 9 includes Step S11 to Step S18.

In Step S11, processing starts.

In Step S12, an MTF image that is a test image is displayed on the display panel 20, and MTF imaging data is acquired by the imaging device 44.

As the MTF image (the test image), an image of a white line with one pixel width or a variety of chart images can be used. It is possible to use any image as the MTF image as long as its MTF can be calculated, and a variety of pattern images can be used.

Alternatively, measurement using not only a still image but also a moving image as the MTF image may be performed. When the MTF value is measured using a moving image, the degree or the like of an afterimage can be evaluated, for example.

The MTF imaging data is preferably acquired in multiple positions of the pixel portion 21 in the display panel 20. This enables accurate determination of a good item even in the case where a display apparatus has low display quality locally.

In Step S13, the MTF value is calculated based on the MTF imaging data. In the case where MTF values are obtained in multiple positions, the MTF values can be each calculated and the smallest value among them can be used as the MTF value.

In Step S14, whether the MTF value is larger than or equal to the threshold value is determined.

In the case where the MTF value is larger than or equal to the threshold value in Step S14 (in the case of yes), the step proceeds to Step S16, and the display apparatus 10 is determined to be a pass (a good item). After that, the processing ends in Step S18.

In the case where the MTF value is smaller than the threshold value in Step S14 (in the case of no), the step proceeds to Step S15, and the display apparatus 10 is determined to be a fail (a defective item). After that, the processing ends in Step S17.

The above is the description of the determination processing.

With the correction system and correction method of the display apparatus according to one embodiment of the present invention, correction values with respect to all grayscales can be set for all the pixels included in the display apparatus; therefore, display quality can be significantly improved even when the display apparatus has luminance unevenness caused by transistor or display element characteristics. In addition, when determination processing using MTF follows correction processing, it is possible to effectively prevent products that are determined to be defective items even after correction is made from being on the market by a simple method.

At least part of this embodiment can be implemented in appropriate combination with the other embodiments described in this specification.

Embodiment 2

In this embodiment, structure examples of a display apparatus that can employ the correction method or correction system according to one embodiment of the present invention will be described. A display apparatus described below as an example can be employed for the display panel 20 or the like in Embodiment 1.

One embodiment of the present invention is a display apparatus including a light-emitting element (also referred to as a light-emitting device). The display apparatus includes two or more light-emitting elements of different emission colors. The light-emitting elements each include a pair of electrodes and an EL layer therebetween. The light-emitting elements are preferably organic EL elements (organic electroluminescent elements). The two or more light-emitting elements of different emission colors include EL layers containing different light-emitting materials. For example, when three kinds of light-emitting elements that emit red (R), green (G), and blue (B) light are included, a full-color display apparatus can be achieved.

In the case of manufacturing a display apparatus including a plurality of light-emitting elements of different emission colors, layers (light-emitting layers) containing at least light-emitting materials each need to be formed in an island shape. In the case of separately forming some or all of EL layers, a method for forming an island-shaped organic film by an evaporation method using a shadow mask such as a metal mask is known. However, this method causes a deviation from the designed shape and position of the island-shaped organic film due to various influences such as the accuracy of the metal mask, the positional deviation between the metal mask and a substrate, a warp of the metal mask, and expansion of the outline of a deposited film due to vapor scattering, for example; accordingly, it is difficult to achieve the high definition and high aperture ratio of the display apparatus. In addition, the outline of the layer might blur during evaporation, so that the thickness of an end portion might be reduced. That is, the thickness of an island-shaped light-emitting layer might vary from place to place. In addition, in the case of manufacturing a display apparatus with a large size, high resolution, or high definition, a manufacturing yield might be reduced because of low dimensional accuracy of the metal mask and deformation due to heat or the like. Thus, a measure has been taken for a pseudo increase in definition (also referred to as pixel density) by employing a unique pixel arrangement such as a PenTile arrangement.

Note that in this specification and the like, the term "island shape" refers to a state where two or more layers formed using the same material in the same step are physically separated from each other. For example, the term "island-shaped light-emitting layer" refers to a state where the light-emitting layer and its adjacent light-emitting layer are physically separated from each other.

In one embodiment of the present invention, fine patterning of EL layers is performed by photolithography without using a shadow mask such as a fine metal mask (an FMM). Accordingly, it is possible to achieve a display apparatus with high definition and a high aperture ratio, which has been difficult to achieve. Moreover, since the EL layers can be formed separately, it is possible to achieve a display apparatus that performs extremely clear display with high contrast and high display quality. Note that, fine patterning of the EL layers may be performed using both a metal mask and photolithography, for example.

In addition, some or all of the EL layers can be physically divided from each other. This can inhibit leakage current flowing between adjacent light-emitting elements through a layer (also referred to as a common layer) shared by the light-emitting elements. Thus, it is possible to prevent crosstalk due to unintended light emission, so that a display apparatus with extremely high contrast can be achieved. In particular, a display apparatus having high current efficiency at low luminance can be achieved.

Note that in one embodiment of the present invention, the display apparatus can be also obtained by combining a light-emitting element that emits white light with a color filter. In that case, light-emitting elements having the same structure can be employed as light-emitting elements provided in pixels (subpixels) that emit light of different colors, which allows all the layers to be common layers. In addition, some or all of the EL layers are divided from each other by photolithography. Thus, leakage current through the common layer is suppressed; accordingly, a high-contrast display apparatus can be achieved. In particular, when an element has a tandem structure in which a plurality of light-emitting layers are stacked with a highly conductive intermediate layer therebetween, leakage current through the intermediate layer can be effectively prevented, so that a display apparatus with high luminance, high definition, and high contrast can be achieved.

Furthermore, an insulating layer covering at least a side surface of the island-shaped light-emitting layer is preferably provided. The insulating layer may cover part of a top surface of an island-shaped EL layer. For the insulating layer, a material having a barrier property against water and oxygen is preferably used. For example, an inorganic insulating film that is less likely to diffuse water or oxygen can be used. This can inhibit degradation of the EL layer and can achieve a highly reliable display apparatus.

Moreover, between two adjacent light-emitting elements, there is a region (a concave portion) where none of the EL layers of the light-emitting elements is provided. In the case where a common electrode or a common electrode and a common layer are formed to cover the concave portion, a phenomenon where the common electrode is divided by a step at an end portion of the EL layer (such a phenomenon is also referred to as disconnection) might occur, which might cause insulation of the common electrode over the EL layer. In view of this, a local gap between the two adjacent light-emitting elements is preferably filled with a resin layer (also referred to as local filling planarization, or LFP) functioning as a planarization film. The resin layer has a function of a planarization film. This structure can inhibit disconnection of the common layer or the common electrode and can achieve a highly reliable display apparatus.

More specific structure examples of the display apparatus according to one embodiment of the present invention will be described below with reference to drawings.

Structure Example 1

Figure 10A:
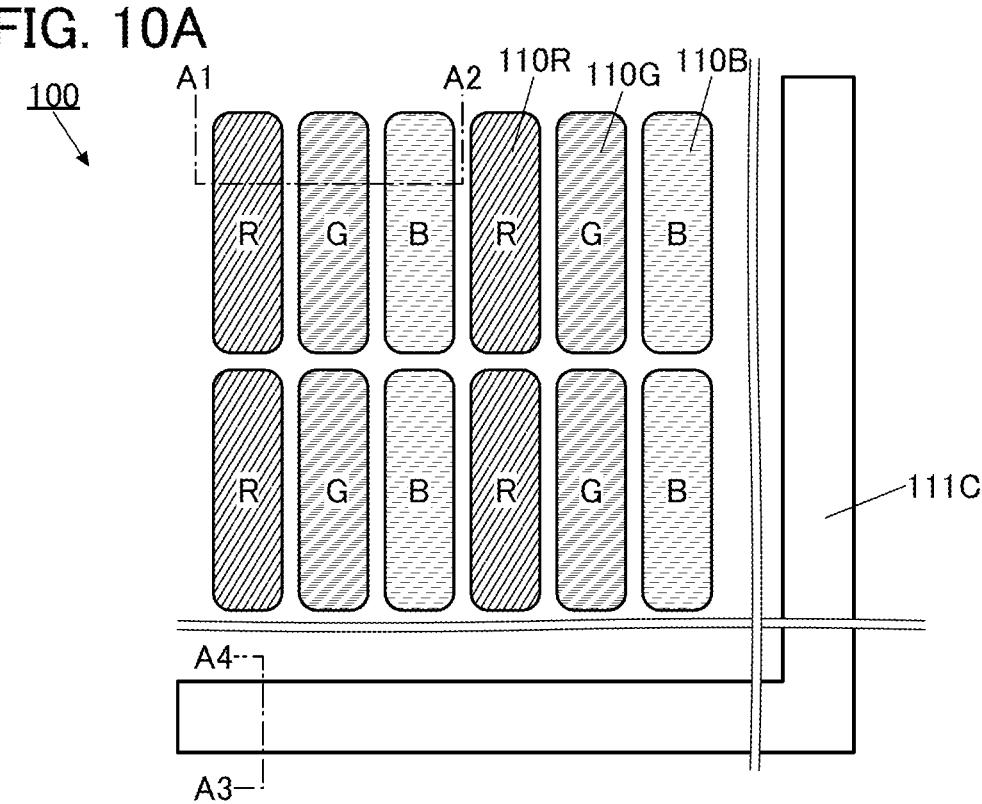
FIG. 10A to FIG. 10C are diagrams illustrating a structure example of a display apparatus.

FIG. 10A illustrates a schematic top view of a display apparatus 100 according to one embodiment of the present invention. The display apparatus 100 includes, over a substrate 101, a plurality of light-emitting elements 110R exhibiting red, a plurality of light-emitting elements 110G exhibiting green, and a plurality of light-emitting elements 110B exhibiting blue. In FIG. 10A, light-emitting regions of the light-emitting elements are denoted by R, G, and B to easily differentiate the light-emitting elements.

The light-emitting elements 110R, the light-emitting elements 110G, and the light-emitting elements 110B are each arranged in a matrix. FIG. 10A illustrates what is called a stripe arrangement, in which the light-emitting elements of the same color are arranged in one direction. Note that an arrangement method of the light-emitting elements is not limited thereto; an arrangement method such as an S-stripe arrangement, a delta arrangement, a Bayer arrangement, or a zigzag arrangement may be employed, or a PenTile arrangement, a diamond arrangement, or the like can be also used.

As each of the light-emitting elements 110R, the light-emitting elements 110G, and the light-emitting elements 110B, an OLED (Organic Light Emitting Diode) or a QLED (Quantum-dot Light Emitting Diode) is preferably used, for example. As a light-emitting substance contained in the EL element, a substance that emits fluorescent light (a fluorescent material), a substance that emits phosphorescent light (a phosphorescent material), and a substance that exhibits thermally activated delayed fluorescence (a thermally activated delayed fluorescent (TADF) material) can be given, for example. As the light-emitting substance contained in the EL element, not only an organic compound but also an inorganic compound (a quantum dot material or the like) can be used.

FIG. 10A also illustrates a connection electrode 111C that is electrically connected to a common electrode 113. The connection electrode 111C is supplied with a potential (e.g., an anode potential or a cathode potential) that is to be supplied to the common electrode 113. The connection electrode 111C is provided outside a display region where the light-emitting elements 110R and the like are arranged.

The connection electrode 111C can be provided along the outer periphery of the display region. For example, the connection electrode 111C may be provided along one side of the outer periphery of the display region, or the connection electrode 111C may be provided across two or more sides of the outer periphery of the display region. That is, in the case where the display region has a rectangular top surface shape, the top surface shape of the connection electrode 111C can be a band shape (a rectangle), an L shape, a U shape (a square bracket shape), a quadrangular shape, or the like.

Figure 10B:
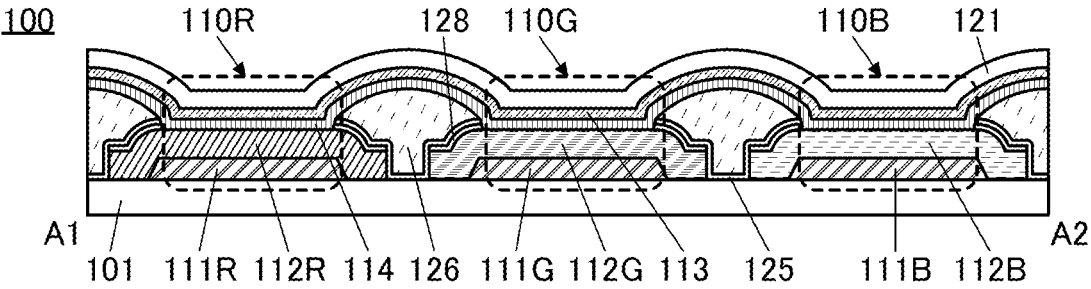
Figure 10C:
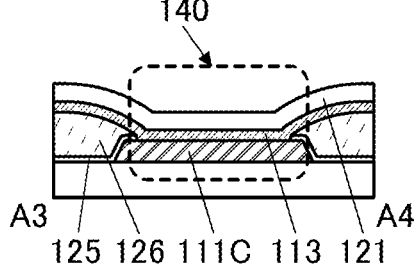

FIG. 10B and FIG. 10C are schematic cross-sectional views corresponding to the dashed-dotted line A1-A2 and the dashed-dotted line A3-A4 in FIG. 10A. FIG. 10B illustrates a schematic cross-sectional view of the light-emitting element 110R, the light-emitting element 110G, and the light-emitting element 110B, and FIG. 10C illustrates a schematic cross-sectional view of a connection portion 140 where the connection electrode 111C and the common electrode 113 are connected to each other.

The light-emitting element 110R includes a pixel electrode 111R, an organic layer 112R, a common layer 114, and the common electrode 113. The light-emitting element 110G includes a pixel electrode 111G, an organic layer 112G, the common layer 114, and the common electrode 113. The light-emitting element 110B includes a pixel electrode 111B, an organic layer 112B, the common layer 114, and the common electrode 113. The common layer 114 and the common electrode 113 are provided to be shared by the light-emitting element 110R, the light-emitting element 110G, and the light-emitting element 110B.

The organic layer 112R included in the light-emitting element 110R contains at least a light-emitting organic compound that emits red light. The organic layer 112G included in the light-emitting element 110G contains at least a light-emitting organic compound that emits green light. The organic layer 112B included in the light-emitting element 110B contains at least a light-emitting organic compound that emits blue light. Each of the organic layer 112R, the organic layer 112G, and the organic layer 112B can be also referred to as an EL layer and includes at least a layer containing a light-emitting organic compound (a light-emitting layer).

Hereinafter, the term "light-emitting element 110" is sometimes used to describe matters common to the light-emitting element 110R, the light-emitting element 110G, and the light-emitting element 110B. Similarly, in the description of matters common to components that are distinguished from each other using alphabets, such as the organic layer 112R, the organic layer 112G, and the organic layer 112B, reference numerals without alphabets are sometimes used.

The organic layer 112 and the common layer 114 can each independently include one or more of an electron-injection layer, an electron-transport layer, a hole-injection layer, and a hole-transport layer. For example, it is possible to employ a structure in which the organic layer 112 includes a stacked-layer structure of a hole-injection layer, a hole-transport layer, a light-emitting layer, and an electron-transport layer from the pixel electrode 111 side and the common layer 114 includes an electron-injection layer.

The pixel electrode 111R, the pixel electrode 111G, and the pixel electrode 111B are provided for the respective light-emitting elements. In addition, the common electrode 113 and the common layer 114 are each provided as a continuous layer shared by the light-emitting elements. A conductive film having a property of transmitting visible light is used for either the pixel electrodes or the common electrode 113, and a conductive film having a reflective property is used for the other. When the pixel electrodes have light-transmitting properties and the common electrode 113 has a reflective property, a bottom-emission display apparatus can be obtained. In contrast, when the pixel electrodes have reflective properties and the common electrode 113 has a light-transmitting property, a top-emission display apparatus can be obtained. Note that when both the pixel electrodes and the common electrode 113 have light-transmitting properties, a dual-emission display apparatus can be also obtained.

A protective layer 121 is provided over the common electrode 113 to cover the light-emitting element 110R, the light-emitting element 110G, and the light-emitting element 110B. The protective layer 121 has a function of preventing diffusion of impurities such as water into each light-emitting element from the above.

An end portion of the pixel electrode 111 preferably has a tapered shape. In the case where the end portion of the pixel electrode has a tapered shape, a portion of the organic layer 112 that is provided along a side surface of the pixel electrode also has a tapered shape. When the side surface of the pixel electrode has a tapered shape, coverage with the EL layer provided along the side surface of the pixel electrode can be improved. Furthermore, when the side surface of the pixel electrode has a tapered shape, a material (for example, also referred to as dust or particles) in a manufacturing step is easily removed by processing such as cleaning, which is preferable.

Note that in this specification and the like, a tapered shape indicates a shape in which at least part of a side surface of a structure is inclined to a substrate surface. For example, a tapered shape preferably includes a region where an angle formed between the inclined side surface and the substrate surface (such an angle is also referred to as a taper angle) is less than 90°.

The organic layer 112 is processed into an island shape by a photolithography method. Thus, an angle formed between a top surface and a side surface of an end portion of the organic layer 112 is approximately 90°. In contrast, an organic film formed using an FMM (Fine Metal Mask) or the like has a thickness that tends to gradually decrease with decreasing the distance from an end portion, and has a top surface forming a slope in an area extending in the range of greater than or equal to 1 μm and less than or equal to 10 μm from the end portion, for example. Thus, such an organic film has a shape whose top surface and side surface are difficult to distinguish from each other.

An insulating layer 125, a resin layer 126, and a layer 128 are included between two adjacent light-emitting elements.

Between two adjacent light-emitting elements, side surfaces of the organic layers 112 are provided to face each other with the resin layer 126 therebetween. The resin layer 126 is positioned between the two adjacent light-emitting elements and is provided to fill end portions of the organic layers 112 and a region between the two organic layers 112. The resin layer 126 has a top surface with a smooth convex shape. The common layer 114 and the common electrode 113 are provided to cover the top surface of the resin layer 126.

The resin layer 126 functions as a planarization film that fills a step positioned between two adjacent light-emitting elements. Providing the resin layer 126 can prevent a phenomenon in which the common electrode 113 is divided by a step at an end portion of the organic layer 112 (such a phenomenon is also referred to as disconnection) from occurring and the common electrode over the organic layer 112 from being insulated. The resin layer 126 can be also referred to as LFP (Local Filling Planarization).

An insulating layer containing an organic material can be suitably used as the resin layer 126. For the resin layer 126, an acrylic resin, a polyimide resin, an epoxy resin, an imide resin, a polyamide resin, a polyimide-amide resin, a silicone resin, a siloxane resin, a benzocyclobutene-based resin, a phenol resin, a precursor of these resins, or the like can be used, for example. For the resin layer 126, an organic material such as polyvinyl alcohol (PVA), polyvinylbutyral, polyvinylpyrrolidone, polyethylene glycol, polyglycerin, pullulan, water-soluble cellulose, or an alcohol-soluble polyamide resin may be used.

Alternatively, a photosensitive resin can be used for the resin layer 126. A photoresist may be used for the photosensitive resin. As the photosensitive resin, a positive photosensitive material or a negative photosensitive material can be used.

The resin layer 126 may contain a material absorbing visible light. For example, the resin layer 126 itself may be made of a material absorbing visible light, or the resin layer 126 may contain a pigment absorbing visible light. For example, for the resin layer 126, it is possible to use a resin that can be used as a color filter transmitting red, blue, or green light and absorbing other light, a resin that contains carbon black as a pigment and functions as a black matrix, or the like.

The insulating layer 125 is provided in contact with the side surfaces of the organic layers 112. In addition, the insulating layer 125 is provided to cover an upper end portion of the organic layer 112. Furthermore, part of the insulating layer 125 is provided in contact with a top surface of the substrate 101.

The insulating layer 125 is positioned between the resin layer 126 and the organic layer 112 and functions as a protective film for preventing contact between the resin layer 126 and the organic layer 112. When the organic layer 112 and the resin layer 126 are in contact with each other, the organic layer 112 might be dissolved by an organic solvent or the like used at the time of forming the resin layer 126. Therefore, the insulating layer 125 is provided between the organic layer 112 and the resin layer 126 as described in this embodiment to protect the side surfaces of the organic layer 112.

An insulating layer containing an organic material can be used for the insulating layer 125. For the insulating layer 125, an inorganic insulating film such as an oxide insulating film, a nitride insulating film, an oxynitride insulating film, or a nitride oxide insulating film can be used, for example. The insulating layer 125 may have either a single-layer structure or a stacked-layer structure. Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, when a metal oxide film such as an aluminum oxide film or a hafnium oxide film or an inorganic insulating film such as a silicon oxide film that is formed by an ALD method is employed for the insulating layer 125, it is possible to form the insulating layer 125 that has a small number of pinholes and has an excellent function of protecting the EL layer.

Note that in this specification and the like, oxynitride refers to a material that contains more oxygen than nitrogen in its composition, and nitride oxide refers to a material that contains more nitrogen than oxygen in its composition. For example, in the case where silicon oxynitride is described, it refers to a material that contains more oxygen than nitrogen in its composition. In the case where silicon nitride oxide is described, it refers to a material that contains more nitrogen than oxygen in its composition.

For the formation of the insulating layer 125, a sputtering method, a CVD method, a PLD method, an ALD method, or the like can be used. The insulating layer 125 is preferably formed by an ALD method achieving good coverage.

In addition, a structure may be employed in which a reflective film (e.g., a metal film containing one or more selected from silver, palladium, copper, titanium, aluminum, and the like) is provided between the insulating layer 125 and the resin layer 126 so that light emitted from the light-emitting layer is reflected by the reflective film. This can improve light extraction efficiency.

The layer 128 is a remaining part of a protective layer (also referred to as a mask layer or a sacrificial layer) for protecting the organic layer 112 during etching of the organic layer 112. For the layer 128, a material that can be used for the insulating layer 125 can be used. It is particularly preferable to use the same material for the layer 128 and the insulating layer 125 because an apparatus or the like for processing can be used in common.

In particular, since a metal oxide film such as an aluminum oxide film or a hafnium oxide film or an inorganic insulating film such as a silicon oxide film that is formed by an ALD method has a small number of pinholes, such a film has an excellent function of protecting the EL layer and can be suitably used for the insulating layer 125 and the layer 128.

The protective layer 121 is provided to cover the common electrode 113.

The protective layer 121 can have, for example, a single-layer structure or a stacked-layer structure including at least an inorganic insulating film. Examples of the inorganic insulating film include an oxide film, an oxynitride film, a nitride oxide film, and a nitride film, such as a silicon oxide film, a silicon oxynitride film, a silicon nitride oxide film, a silicon nitride film, an aluminum oxide film, an aluminum oxynitride film, and a hafnium oxide film. Alternatively, a semiconductor material or a conductive material such as indium gallium oxide, indium zinc oxide, indium tin oxide, or indium gallium zinc oxide may be used for the protective layer 121.

For the protective layer 121, a stacked film of an inorganic insulating film and an organic insulating film can be used. For example, a structure in which an organic insulating film is sandwiched between a pair of inorganic insulating films is preferable. Furthermore, the organic insulating film preferably functions as a planarization film. This enables a top surface of the organic insulating film to be flat, which results in improved coverage with the inorganic insulating film thereover and a higher barrier property. Moreover, the top surface of the protective layer 121 is flat; therefore, when a structural object (e.g., a color filter, an electrode of a touch sensor, a lens array, or the like) is provided above the protective layer 121, the structural object can be less affected by an uneven shape caused by a lower structure.

FIG. 10C illustrates the connection portion 140 in which the connection electrode 111C and the common electrode 113 are electrically connected to each other. In the connection portion 140, an opening portion is provided in the insulating layer 125 and the resin layer 126 over the connection electrode 111C. The connection electrode 111C and the common electrode 113 are electrically connected to each other in the opening portion.

Note that although FIG. 10C illustrates the connection portion 140 in which the connection electrode 111C and the common electrode 113 are electrically connected to each other, the common electrode 113 may be provided over the connection electrode 111C with the common layer 114 therebetween. Particularly in the case where a carrier-injection layer is used as the common layer 114, for example, a material used for the common layer 114 has sufficiently low electrical resistivity and the common layer 114 can be formed to be thin. Thus, problems do not arise in many cases even when the common layer 114 is positioned in the connection portion 140. Accordingly, the common electrode 113 and the common layer 114 can be formed using the same shielding mask, so that manufacturing cost can be reduced.

The above is the description of the structure example of the display apparatus.

Pixel Layout

Pixel layout different from that in FIG. 10A will be mainly described below. There is no particular limitation on the arrangement of light-emitting elements (subpixels), and a variety of methods can be employed.

In addition, examples of a top surface shape of the subpixel include polygons such as a triangle, a tetragon (including a rectangle and a square), and a pentagon; polygons with rounded corners; an ellipse; and a circle. Here, the top surface shape of the subpixel corresponds to a top surface shape of a light-emitting region of the light-emitting element.

Figures 11A, 11B, 11C, 11D, 11E, 11F:
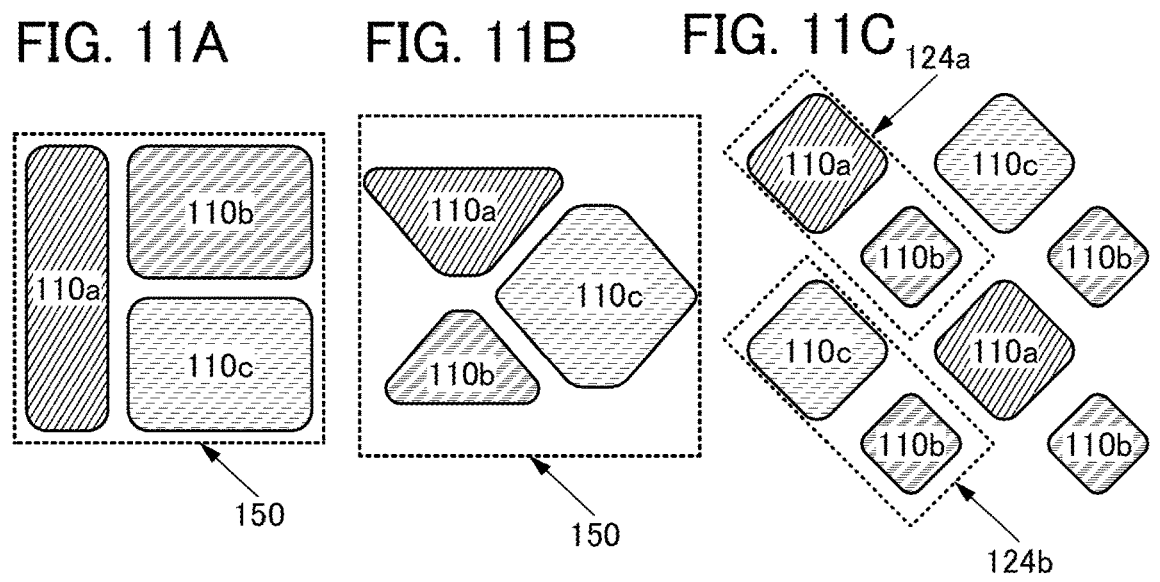
FIG. 11A to FIG. 11F are diagrams illustrating pixel structure examples.

A pixel 150 illustrated in FIG. 11A employs an S-stripe arrangement. The pixel 150 illustrated in FIG. 11A is composed of three subpixels: light-emitting elements 110a, 110b, and 110c. For example, the light-emitting element 110a may be a blue-light-emitting element, the light-emitting element 110b may be a red-light-emitting element, and the light-emitting element 110c may be a green-light-emitting element.

The pixel 150 illustrated in FIG. 11B includes the light-emitting element 110a whose top surface has a rough trapezoidal shape with rounded corners, the light-emitting element 110b whose top surface has a rough triangle shape with rounded corners, and the light-emitting element 110c whose top surface has a rough tetragonal or rough hexagonal shape with rounded corners. In addition, the light-emitting element 110a has a larger light-emitting area than the light-emitting element 110b. In this manner, the shapes and sizes of the light-emitting elements can be determined independently. For example, the size of a light-emitting element with higher reliability can be made smaller. For example, the light-emitting element 110a may be a green light-emitting element, the light-emitting element 110b may be a red light-emitting element, and the light-emitting element 110c may be a blue light-emitting element.

Pixels 124a and 124b illustrated in FIG. 11C employ a PenTile arrangement. FIG. 11C illustrates an example in which the pixels 124a each including the light-emitting element 110a and the light-emitting element 110b and the pixels 124b each including the light-emitting element 110b and the light-emitting element 110c are alternately arranged. For example, the light-emitting element 110a may be a red light-emitting element, the light-emitting element 110b may be a green light-emitting element, and the light-emitting element 110c may be a blue light-emitting element.

The pixels 124a and 124b illustrated in FIG. 11D and FIG. 11E employ a delta arrangement. The pixel 124a includes two light-emitting elements (the light-emitting elements 110a and 110b) in an upper row (a first row) and one light-emitting element (the light-emitting element 110c) in a lower row (a second row). The pixel 124b includes one light-emitting element (the light-emitting element 110c) in the upper row (the first row) and two light-emitting elements (the light-emitting elements 110a and 110b) in the lower row (the second row). For example, the light-emitting element 110a may be a red light-emitting element, the light-emitting element 110b may be a green light-emitting element, and the light-emitting element 110c may be a blue light-emitting element.

FIG. 11D illustrates an example in which the top surface of each light-emitting element has a rough tetragonal shape with rounded corners, and FIG. 11E illustrates an example in which the top surface of each light-emitting element is circular.

FIG. 11F illustrates an example in which light-emitting elements of different colors are arranged in a zigzag manner. Specifically, the positions of top sides of two light-emitting elements arranged in a column direction (e.g., the light-emitting element 110a and the light-emitting element 110b or the light-emitting element 110b and the light-emitting element 110c) are not aligned in a top view. For example, the light-emitting element 110a may be a red light-emitting element, the light-emitting element 110b may be a green light-emitting element, and the light-emitting element 110c may be a blue light-emitting element.

In a photolithography method, as a pattern to be processed becomes finer, the influence of light diffraction becomes more difficult to ignore; accordingly, fidelity in transferring a photomask pattern by light exposure is degraded, and it becomes difficult to process a resist mask into a desired shape. Thus, a pattern with rounded corners is likely to be formed even with a rectangular photomask pattern. Consequently, the top surface of a light-emitting element has a polygonal shape with rounded corners, an elliptical shape, a circular shape, or the like in some cases.

Furthermore, in a method for manufacturing a display panel according to one embodiment of the present invention, the EL layer is processed into an island shape with the use of a resist mask. A resist film formed over the EL layer needs to be cured at a temperature lower than the upper temperature limit of the EL layer. Thus, the resist film is insufficiently cured in some cases depending on the upper temperature limit of the material of the EL layer and the curing temperature of a resist material. An insufficiently cured resist film might have a shape different from a desired shape at the time of processing. As a result, a top surface of the EL layer has a polygonal shape with rounded corners, an elliptical shape, a circular shape, or the like in some cases. For example, when a resist mask with a square top surface is intended to be formed, a resist mask with a circular top surface might be formed, and the top surface of the EL layer might be circular.

Note that to obtain a desired top surface shape of the EL layer, a technique of correcting a mask pattern in advance so that a transferred pattern agrees with a design pattern (an OPC (Optical Proximity Correction) technique) may be used. Specifically, with the OPC technique, a pattern for correction is added to a corner portion or the like of a figure on a mask pattern.

The above is the description of the pixel layout.

At least part of this embodiment can be implemented in appropriate combination with the other embodiments described in this specification.

Embodiment 3

In this embodiment, structure examples of a display apparatus that can be employed for the correction method or correction system according to one embodiment of the present invention will be described.

The display apparatus of this embodiment can be used for, for example, display portions of a digital camera, a digital video camera, a digital photo frame, a cellular phone, a portable game machine, a smartphone, a wristwatch-type terminal, a tablet terminal, a portable information terminal, and an audio reproducing device, in addition to electronic devices with comparatively large screens, such as a television device, a desktop or laptop personal computer, a monitor for a computer or the like, digital signage, and a large game machine such as a pachinko machine.

Display Apparatus 400

Figure 12:
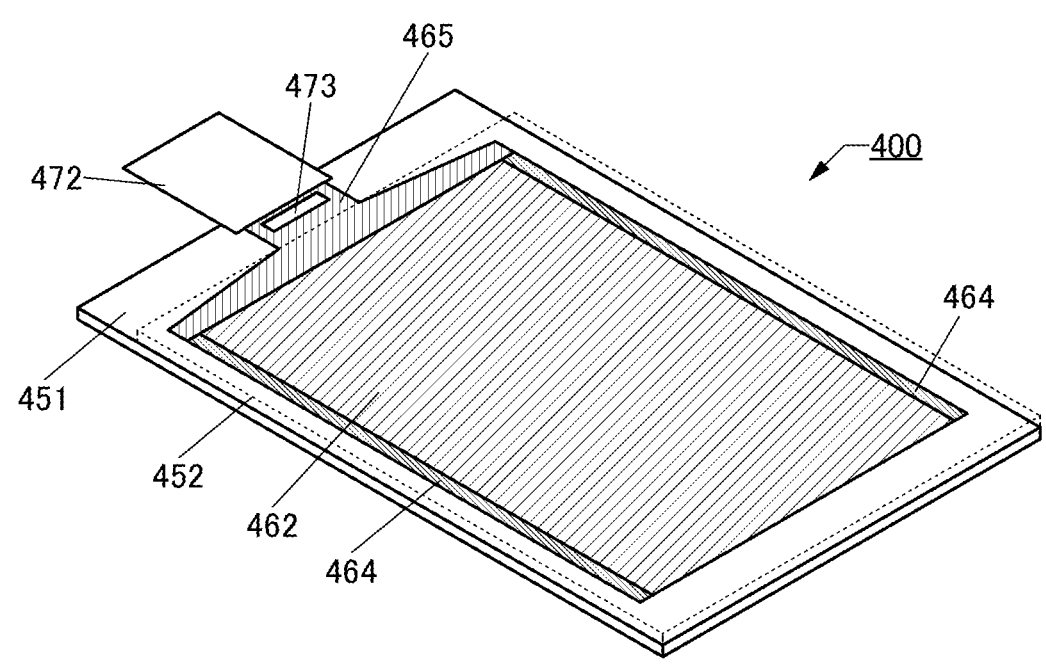
FIG. 12 is a diagram illustrating a structure example of a display apparatus.
Figures 13A, 13B:
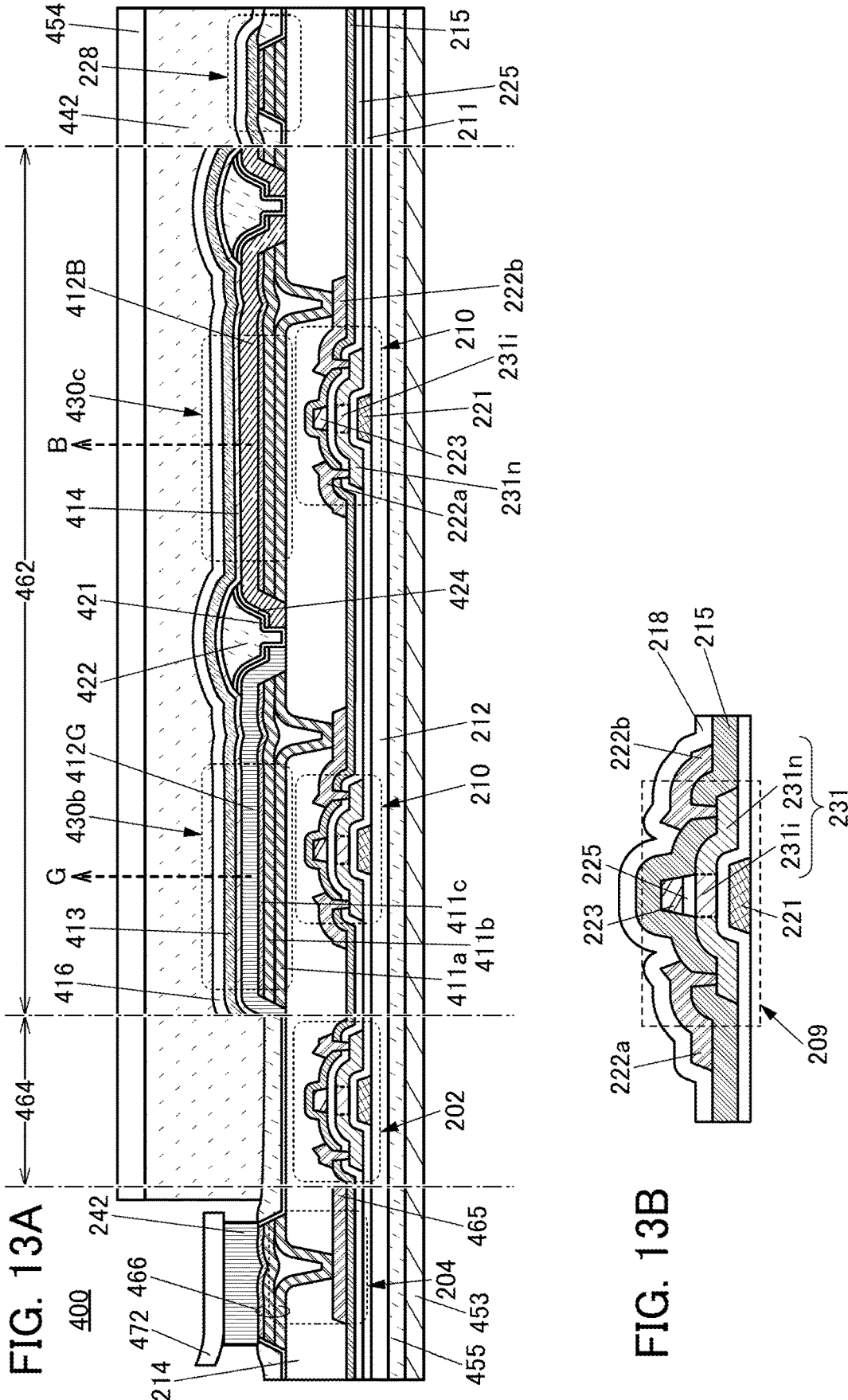
FIG. 13A and FIG. 13B are diagrams illustrating structure examples of the display apparatus.

FIG. 12 is a perspective view of a display apparatus 400, and FIG. 13A is a cross-sectional view of the display apparatus 400.

The display apparatus 400 has a structure in which a substrate 452 and a substrate 451 are attached to each other. In FIG. 12, the substrate 452 is denoted by a dashed line.

The display apparatus 400 includes a display portion 462, a circuit 464, a wiring 465, and the like. FIG. 12 illustrates an example in which an IC 473 and an FPC 472 are implemented on the display apparatus 400. Thus, the structure illustrated in FIG. 12 can be regarded as a display module including the display apparatus 400, the IC (integrated circuit), and the FPC.

As the circuit 464, a scan line driver circuit can be used, for example.

The wiring 465 has a function of supplying a signal and power to the display portion 462 and the circuit 464. The signal and power are input to the wiring 465 from the outside through the FPC 472 or input to the wiring 465 from the IC 473.

FIG. 12 illustrates an example in which the IC 473 is provided over the substrate 451 by a COG (Chip On Glass) method, a COF (Chip on Film) method, or the like. An IC including a scan line driver circuit, a signal line driver circuit, or the like can be employed as the IC 473, for example. Note that the display apparatus 400 and the display module are not necessarily provided with an IC. In addition, the IC may be implemented on the FPC by a COF method or the like.

FIG. 13A illustrates an example of a cross section of the display apparatus 400 when part of a region including the FPC 472, part of the circuit 464, part of the display portion 462, and part of a region including a connection portion are cut. FIG. 13A particularly illustrates an example of a cross section of the display portion 462 when a region including a light-emitting element 430b that emits green light and a light-emitting element 430c that emits blue light is cut.

The display apparatus 400 illustrated in FIG. 13A includes a transistor 202, transistors 210, the light-emitting element 430b, the light-emitting element 430c, and the like between a substrate 453 and a substrate 454.

The light-emitting element illustrated in Embodiment 2 can be employed as the light-emitting element 430b and the light-emitting element 430c.

Here, in the case where a pixel of the display apparatus includes three kinds of subpixels including light-emitting elements that emit light of different colors, subpixels of three colors of red (R), green (G), and blue (B), subpixels of three colors of yellow (Y), cyan (C), and magenta (M), and the like can be given as the three subpixels. In the case where the pixel includes four subpixels, subpixels of four colors of R, G, B, and white (W), subpixels of four colors of R, G, B, and Y, and the like can be given as the four subpixels.

The substrate 454 and a protective layer 416 are bonded to each other with an adhesive layer 442. The adhesive layer 442 is provided to overlap with the light-emitting element 430b and the light-emitting element 430c, and the display apparatus 400 employs a solid sealing structure.

The light-emitting element 430b and the light-emitting element 430c each include a conductive layer 411a, a conductive layer 411b, and a conductive layer 411c as a pixel electrode. The conductive layer 411b has a property of reflecting visible light and functions as a reflective electrode. The conductive layer 411c has a property of transmitting visible light and functions as an optical adjustment layer.

The conductive layer 411a is connected to a conductive layer 222b included in the transistor 210 through an opening provided in an insulating layer 214. The transistor 210 has a function of controlling driving of the light-emitting element.

An EL layer 412G or an EL layer 412B is provided to cover the pixel electrode. An insulating layer 421 is provided in contact with a side surface of the EL layer 412G and a side surface of the EL layer 412B, and a resin layer 422 is provided to fill a concave portion of the insulating layer 421. A layer 424 is provided between the EL layer 412G and the insulating layer 421 and between the EL layer 412B and the insulating layer 421. A common layer 414, a common electrode 413, and the protective layer 416 are provided to cover the EL layer 412G and the EL layer 412B.

Light emitted from the light-emitting element is emitted toward the substrate 454 side. For the substrate 454, a material having a high property of transmitting visible light is preferably used.

The transistor 202 and the transistor 210 are each formed over the substrate 453. These transistors can be manufactured using the same material in the same step.

The substrate 453 and an insulating layer 212 are attached to each other with an adhesive layer 455.

As a method for manufacturing the display apparatus 400, first, a manufacture substrate provided with the insulating layer 212, the transistors, the light-emitting elements, and the like is attached to the substrate 454 with the adhesive layer 442. Then, the substrate 453 is attached to a surface exposed by separation of the manufacture substrate, so that the components formed over the manufacture substrate are transferred to the substrate 453. The substrate 453 and the substrate 454 each preferably have flexibility. This can increase the flexibility of the display apparatus 400.

An inorganic insulating film that can be used for each of an insulating layer 211 and an insulating layer 215 can be used for the insulating layer 212.

A connection portion 204 is provided in a region of the substrate 453 where the substrate 453 and the substrate 454 do not overlap with each other. In the connection portion 204, the wiring 465 is electrically connected to the FPC 472 through a conductive layer 466 and a connection layer 242. The conductive layer 466 can be obtained by processing the same conductive film as the pixel electrode. Thus, the connection portion 204 and the FPC 472 can be electrically connected to each other through the connection layer 242.

Each of the transistor 202 and the transistor 210 includes a conductive layer 221 functioning as a gate, the insulating layer 211 functioning as a gate insulating layer, a semiconductor layer 231 including a channel formation region 231i and a pair of low-resistance regions 231n, a conductive layer 222a connected to one of the pair of low-resistance regions 231n, the conductive layer 222b connected to the other of the pair of low-resistance regions 231n, an insulating layer 225 functioning as a gate insulating layer, a conductive layer 223 functioning as a gate, and the insulating layer 215 covering the conductive layer 223. The insulating layer 211 is positioned between the conductive layer 221 and the channel formation region 231i. The insulating layer 225 is positioned between the conductive layer 223 and the channel formation region 231i.

The conductive layer 222a and the conductive layer 222b are connected to the low-resistance regions 231n through openings provided in the insulating layer 215. One of the conductive layer 222a and the conductive layer 222b functions as a source, and the other of the conductive layer 222a and the conductive layer 222b functions as a drain.

FIG. 13A illustrates an example in which the insulating layer 225 covers a top surface and side surfaces of the semiconductor layer. The conductive layer 222a and the conductive layer 222b are connected to the low-resistance regions 231n through openings provided in the insulating layer 225 and the insulating layer 215.

In contrast, in a transistor 209 illustrated in FIG. 13B, the insulating layer 225 overlaps with the channel formation region 231i of the semiconductor layer 231 and does not overlap with the low-resistance regions 231n. The structure illustrated in FIG. 13B can be manufactured by processing the insulating layer 225 with the conductive layer 223 as a mask, for example. In FIG. 13B, the insulating layer 215 is provided to cover the insulating layer 225 and the conductive layer 223, and the conductive layer 222a and the conductive layer 222b are connected to the low-resistance regions 231n through openings in the insulating layer 215. Furthermore, an insulating layer 218 covering the transistor may be provided.

There is no particular limitation on the structure of the transistors included in the display apparatus of this embodiment. For example, a planar transistor, a staggered transistor, an inverted staggered transistor, or the like can be used. In addition, either of a top-gate transistor structure and a bottom-gate transistor structure may be employed. Alternatively, gates may be provided above and below a semiconductor layer where a channel is formed.

The structure in which the semiconductor layer where a channel is formed is sandwiched between two gates is employed for the transistor 202 and the transistor 210. The two gates may be connected to each other and supplied with the same signal to drive the transistor. Alternatively, the threshold voltage of the transistor may be controlled by applying a potential for controlling the threshold voltage to one of the two gates and a potential for driving to the other of the two gates.

There is no particular limitation on the crystallinity of a semiconductor material used for the semiconductor layer of the transistor, and any of an amorphous semiconductor, a single crystal semiconductor, and a semiconductor having crystallinity other than single crystal (a microcrystalline semiconductor, a polycrystalline semiconductor, or a semiconductor partly including crystal regions) may be used. It is preferable to use a single crystal semiconductor or a semiconductor having crystallinity because degradation of transistor characteristics can be inhibited.

The semiconductor layer of the transistor preferably contains a metal oxide (also referred to as an oxide semiconductor). That is, a transistor using a metal oxide in its channel formation region (hereinafter an OS transistor) is preferably used for the display apparatus of this embodiment.

The band gap of a metal oxide used for the semiconductor layer of the transistor is preferably greater than or equal to 2 eV, further preferably greater than or equal to 2.5 eV. With the use of a metal oxide having a wide bandgap, the off-state current of the OS transistor can be reduced.

A metal oxide preferably contains at least indium or zinc, and further preferably contains indium and zinc. The metal oxide preferably contains indium, M (M is one or more kinds selected from gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example.

Alternatively, the semiconductor layer of the transistor may contain silicon. Examples of silicon include amorphous silicon and crystalline silicon (low-temperature polysilicon, single crystal silicon, or the like).

The transistor included in the circuit 464 and the transistor included in the display portion 462 may have either the same structure or different structures. A plurality of transistors included in the circuit 464 may have either the same structure or two or more kinds of structures. Similarly, a plurality of transistors included in the display portion 462 may have either the same structure or two or more kinds of structures.

A material through which impurities such as water and hydrogen do not easily diffuse is preferably used for at least one of the insulating layers covering the transistors. Thus, such an insulating layer can function as a barrier layer. Such a structure can effectively inhibit diffusion of impurities into the transistors from the outside and can increase the reliability of the display apparatus.

An inorganic insulating film is preferably used for each of the insulating layer 211, the insulating layer 212, the insulating layer 215, the insulating layer 218, and the insulating layer 225. As the inorganic insulating film, a silicon nitride film, a silicon oxynitride film, a silicon oxide film, a silicon nitride oxide film, an aluminum oxide film, an aluminum nitride film, or the like can be used, for example. Alternatively, a hafnium oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used. A stack including two or more of the above inorganic insulating films may also be used.

An organic insulating film is suitable for the insulating layer 214 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins.

A variety of optical members can be arranged on the inner or outer surface of the substrate 454. Examples of the optical members include a light-blocking layer, a polarizing plate, a retardation plate, a light diffusion layer (a diffusion film or the like), an anti-reflection layer, a microlens array, and a light-condensing film. Furthermore, an antistatic film inhibiting attachment of dust, a water repellent film suppressing attachment of stain, a hard coat film inhibiting generation of a scratch caused by the use, a shock absorbing layer, or the like may be provided on the outside of the substrate 454.

Providing the protective layer 416 that covers the light-emitting element can inhibit entry of impurities such as water into the light-emitting element, so that the reliability of the light-emitting element can be increased.

FIG. 13A illustrates a connection portion 228. In the connection portion 228, the common electrode 413 is electrically connected to a wiring. FIG. 13A illustrates an example in which the wiring has the same stacked-layer structure as the pixel electrode.

For each of the substrate 453 and the substrate 454, glass, quartz, ceramics, sapphire, a resin, a metal, an alloy, a semiconductor, or the like can be used. For the substrate on the side from which light from the light-emitting element is extracted, a material that transmits the light is used. When a flexible material is used for the substrate 453 and the substrate 454, the flexibility of the display apparatus can be increased. Furthermore, a polarizing plate may be used as the substrate 453 or the substrate 454.

For each of the substrate 453 and the substrate 454, a polyester resin such as polyethylene terephthalate (PET) or polyethylene naphthalate (PEN), a polyacrylonitrile resin, an acrylic resin, a polyimide resin, a polymethyl methacrylate resin, a polycarbonate (PC) resin, a polyether sulfone (PES) resin, a polyamide resin (nylon, aramid, or the like), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, cellulose nanofiber, or the like can be used. Glass that is thin enough to have flexibility may be used for one or both of the substrate 453 and the substrate 454.

For the adhesive layer 442, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. Alternatively, a two-liquid-mixture-type resin may be used. Alternatively, an adhesive sheet or the like may be used.

As the connection layer 242, an anisotropic conductive film (ACF), an anisotropic conductive paste (ACP), or the like can be used.

As materials that can be used for conductive layers such as a variety of wirings and electrodes that constitute the display apparatus, in addition to a gate, a source, and a drain of a transistor, a metal such as aluminum, titanium, chromium, nickel, copper, yttrium, zirconium, molybdenum, silver, tantalum, or tungsten, an alloy containing the metal as its main component, and the like can be given. A film containing these materials can be used in a single layer or as a stacked-layer structure.

In addition, as a light-transmitting conductive material, a conductive oxide such as indium oxide, indium tin oxide, indium zinc oxide, zinc oxide, or zinc oxide containing gallium, or graphene can be used. Alternatively, a metal material such as gold, silver, platinum, magnesium, nickel, tungsten, chromium, molybdenum, iron, cobalt, copper, palladium, or titanium, or an alloy material containing the metal material can be used. Alternatively, a nitride of the metal material (e.g., titanium nitride) or the like may be used. Note that in the case of using the metal material or the alloy material (or the nitride thereof), the material is made thin enough to have a light-transmitting property. Furthermore, a stacked-layer film of the above materials can be used for a conductive layer. For example, a stacked-layer film of indium tin oxide and an alloy of silver and magnesium, or the like is preferably used because conductivity can be increased. They can be also used for conductive layers such as a variety of wirings and electrodes that constitute the display apparatus, and conductive layers (conductive layers functioning as a pixel electrode or a common electrode) included in the light-emitting element.

As an insulating material that can be used for each insulating layer, for example, a resin such as an acrylic resin or an epoxy resin, and an inorganic insulating material such as silicon oxide, silicon oxynitride, silicon nitride oxide, silicon nitride, or aluminum oxide can be given.

At least part of this embodiment can be implemented in appropriate combination with the other embodiments described in this specification.

Embodiment 4

In this embodiment, other structure examples of a display apparatus that can be employed for the correction method or correction system according to one embodiment of the present invention will be described.

Display panels in this embodiment can be high-definition display panels. For example, display apparatuses according to one embodiment of the present invention can be used for display portions of information terminal devices (wearable devices) such as wristwatch-type and bracelet-type information terminal devices and display portions of wearable devices that can be worn on a head, such as VR devices like head-mounted displays and glasses-type AR devices.

Display Module

Figure 14A:
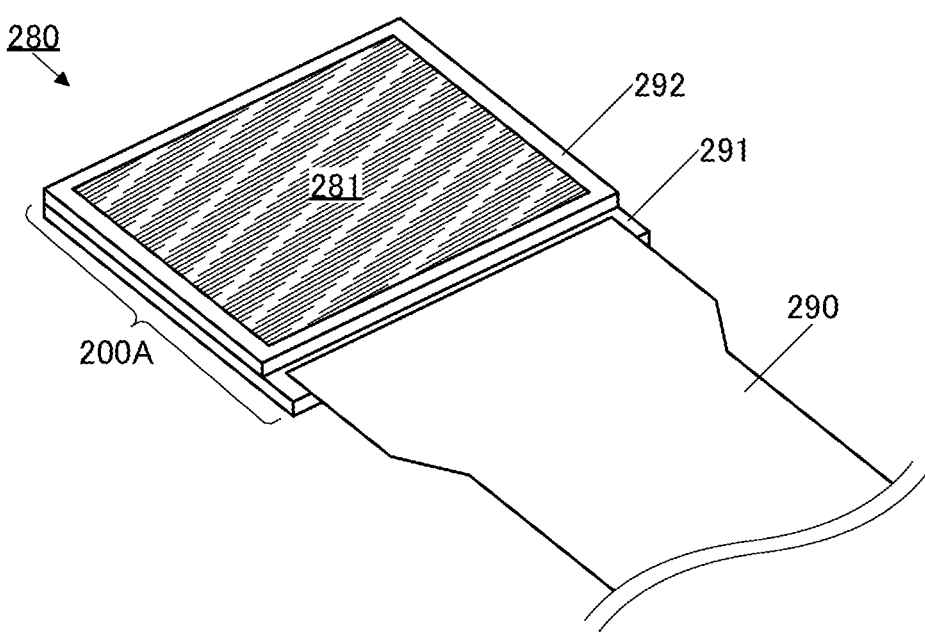
FIG. 14A and FIG. 14B are diagrams illustrating structure examples of a display apparatus.

FIG. 14A is a perspective view of a display module 280. The display module 280 includes a display apparatus 200A and an FPC 290. Note that a display panel included in the display module 280 is not limited to the display apparatus 200A and may be any of a display apparatus 200B to a display apparatus 200F described later.

The display module 280 includes a substrate 291 and a substrate 292. The display module 280 includes a display portion 281. The display portion 281 is a region where an image is displayed.

Figure 14B:
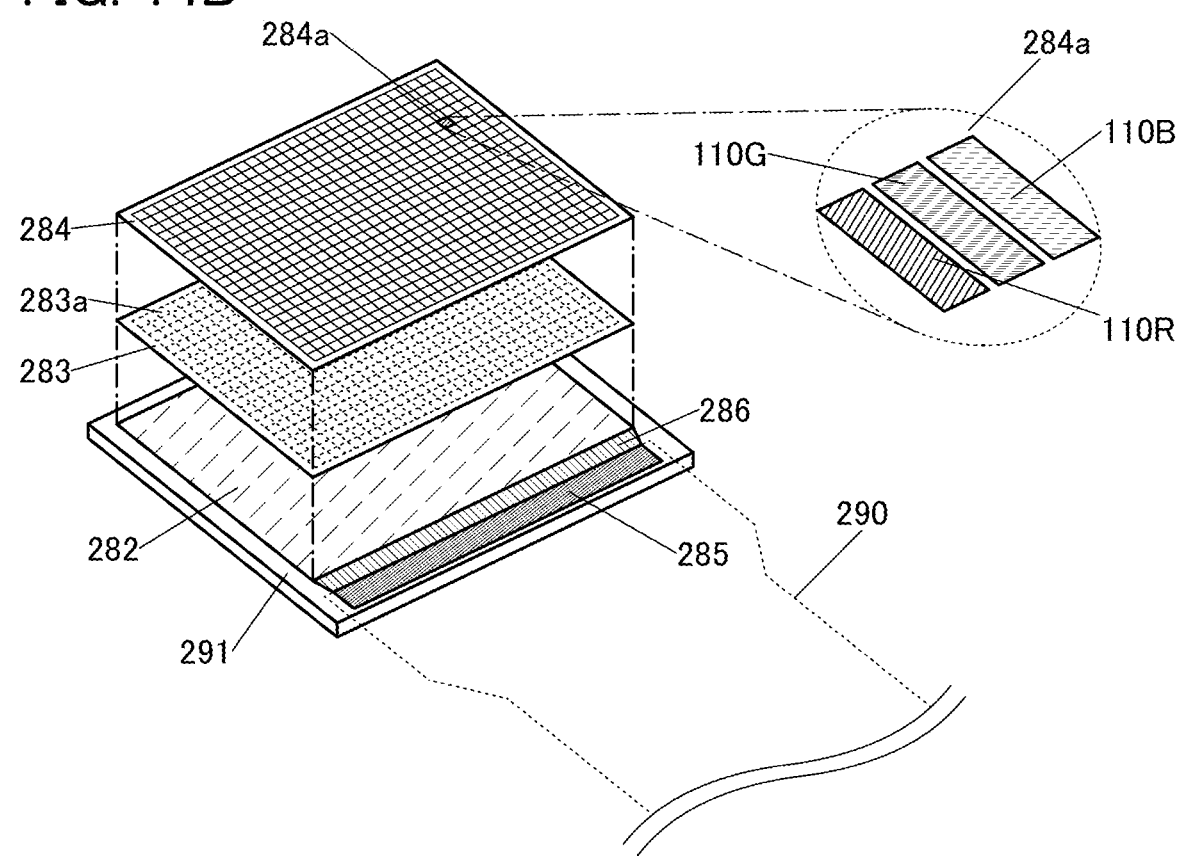

FIG. 14B is a perspective view schematically illustrating a structure on the substrate 291 side. Over the substrate 291, a circuit portion 282, a pixel circuit portion 283 over the circuit portion 282, and a pixel portion 284 over the pixel circuit portion 283 are stacked. In addition, a terminal portion 285 to be connected to the FPC 290 is provided in a portion over the substrate 291 that is not overlapped with the pixel portion 284. The terminal portion 285 and the circuit portion 282 are electrically connected to each other through a wiring portion 286 formed of a plurality of wirings.

The pixel portion 284 includes a plurality of pixels 284a arranged periodically. An enlarged view of one pixel 284a is illustrated on the right side in FIG. 14B. The pixel 284a includes the light-emitting element 110R that emits red light, the light-emitting element 110G that emits green light, and the light-emitting element 110B that emits blue light.

The pixel circuit portion 283 includes a plurality of pixel circuits 283a arranged periodically. One pixel circuit 283a is a circuit for controlling light emission of three light-emitting devices included in one pixel 284a. One pixel circuit 283a may be provided with three circuits for controlling light emission of one light-emitting device. For example, the pixel circuit 283a can include at least one selection transistor, one current control transistor (driving transistor), and a capacitor for one light-emitting device. In that case, a gate signal is input to a gate of the selection transistor, and a source signal is input to a source of the selection transistor. Thus, an active-matrix display panel is achieved.

The circuit portion 282 includes a circuit for driving the pixel circuits 283a in the pixel circuit portion 283. For example, the circuit portion 282 preferably includes one or both of a gate line driver circuit and a source line driver circuit. The circuit portion 282 may further include at least one of an arithmetic circuit, a memory circuit, a power supply circuit, and the like. In addition, a transistor provided in the circuit portion 282 may constitute part of the pixel circuit 283a. That is, the pixel circuit 283a may be constituted by a transistor included in the pixel circuit portion 283 and a transistor included in the circuit portion 282.

The FPC 290 functions as a wiring for supplying a video signal, a power supply potential, and the like to the circuit portion 282 from the outside. In addition, an IC may be mounted on the FPC 290.

The display module 280 can have a structure in which one or both of the pixel circuit portion 283 and the circuit portion 282 are provided to be stacked below the pixel portion 284; thus, the aperture ratio (effective display area ratio) of the display portion 281 can be significantly high. For example, the aperture ratio of the display portion 281 can be greater than or equal to 40% and less than 100%, preferably greater than or equal to 50% and less than or equal to 95%, further preferably greater than or equal to 60% and less than or equal to 95%. Furthermore, the pixels 284a can be arranged extremely densely and thus the display portion 281 can have extremely high definition. For example, the pixels 284a are preferably arranged in the display portion 281 with a definition higher than or equal to 2000 ppi, preferably higher than or equal to 3000 ppi, further preferably higher than or equal to 5000 ppi, still further preferably higher than or equal to 6000 ppi, and lower than or equal to 20000 ppi or lower than or equal to 30000 ppi.

Such a display module 280 has extremely high definition, and thus can be suitably used for a VR device such as a head-mounted display or a glasses-type AR device. For example, even in the case of a structure in which the display portion of the display module 280 is seen through a lens, pixels of the extremely-high-definition display portion 281 included in the display module 280 are not seen even when the display portion is enlarged by the lens, so that display providing a high sense of immersion can be performed. Without being limited thereto, the display module 280 can be also suitably used for an electronic device having a comparatively small display portion. For example, the display module 280 can be suitably used for a display portion of a wearable electronic device, such as a wristwatch.

Display Apparatus 200A

Figure 15:
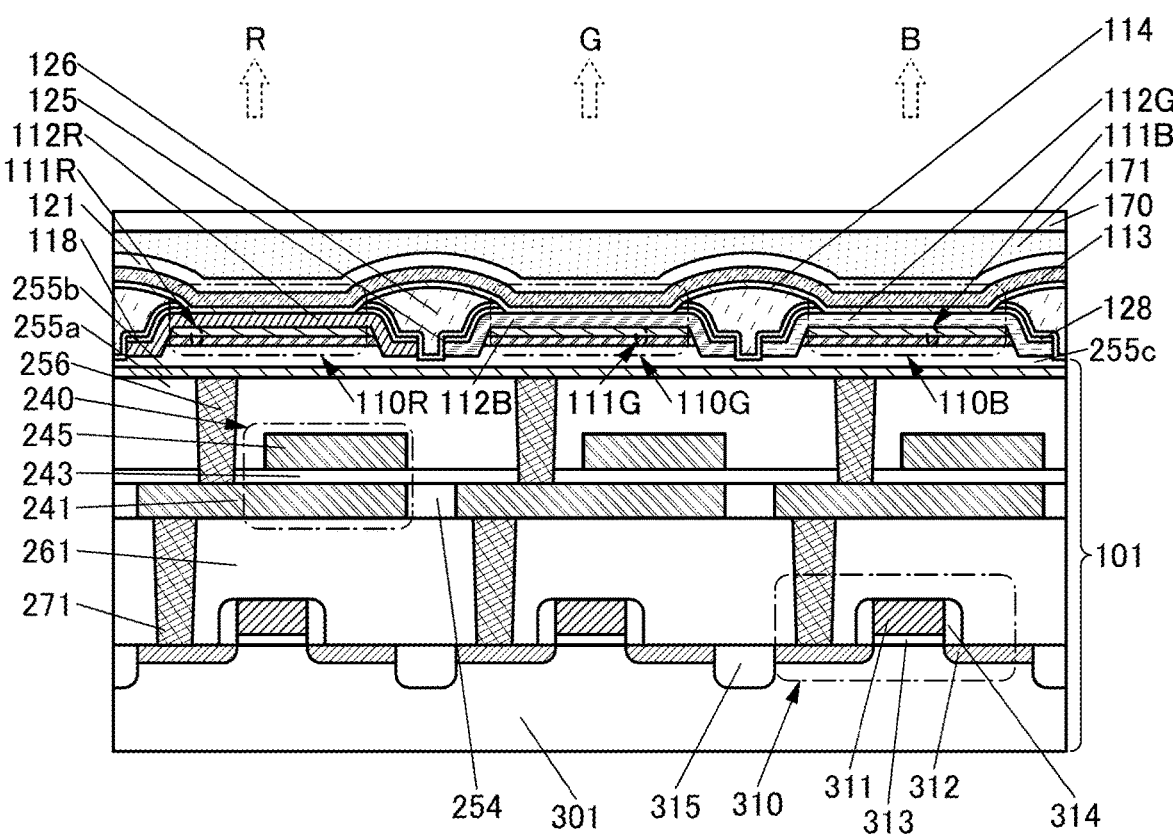
FIG. 15 is a diagram illustrating a structure example of a display apparatus.

The display apparatus 200A illustrated in FIG. 15 includes a substrate 301, the light-emitting elements 110R, 110G, and 110B, capacitors 240, and transistors 310.

The substrate 301 corresponds to the substrate 291 in FIG. 14A and FIG. 14B.

The transistor 310 is a transistor that includes a channel formation region in the substrate 301. As the substrate 301, a semiconductor substrate such as a single crystal silicon substrate can be used, for example. The transistor 310 includes part of the substrate 301, a conductive layer 311, low-resistance regions 312, an insulating layer 313, and insulating layers 314. The conductive layer 311 functions as a gate electrode. The insulating layer 313 is positioned between the substrate 301 and the conductive layer 311 and functions as a gate insulating layer. The low-resistance region 312 is a region where the substrate 301 is doped with an impurity, and functions as one of a source and a drain. The insulating layers 314 are provided to cover side surfaces of the conductive layer 311.

In addition, an element isolation layer 315 is provided between two adjacent transistors 310 to be embedded in the substrate 301.

Furthermore, an insulating layer 261 is provided to cover the transistors 310, and the capacitors 240 are provided over the insulating layer 261.

The capacitor 240 includes a conductive layer 241, a conductive layer 245, and an insulating layer 243 positioned therebetween. The conductive layer 241 functions as one electrode of the capacitor 240, the conductive layer 245 functions as the other electrode of the capacitor 240, and the insulating layer 243 functions as a dielectric of the capacitor 240.

The conductive layer 241 is provided over the insulating layer 261 and is embedded in an insulating layer 254. The conductive layer 241 is electrically connected to one of the source and the drain of the transistor 310 through a plug 271 embedded in the insulating layer 261. The insulating layer 243 is provided to cover the conductive layer 241. The conductive layer 245 is provided in a region overlapped with the conductive layer 241 with the insulating layer 243 therebetween.

An insulating layer 255a is provided to cover the capacitor 240. An insulating layer 255b is provided over the insulating layer 255a. An insulating layer 255c is provided over the insulating layer 255b.

An inorganic insulating film can be suitably used for each of the insulating layer 255a, the insulating layer 255b, and the insulating layer 255c. For example, it is preferable that a silicon oxide film be used for each of the insulating layer 255a and the insulating layer 255c and that a silicon nitride film be used for the insulating layer 255b. This enables the insulating layer 255b to function as an etching protective film. Although this embodiment shows an example in which the insulating layer 255c is partly etched and a concave portion is formed, the concave portion is not necessarily provided in the insulating layer 255c.

The light-emitting element 110R, the light-emitting element 110G, and the light-emitting element 110B are provided over the insulating layer 255c. The description in Embodiment 2 can be referred to for the structures of the light-emitting element 110R, the light-emitting element 110G, and the light-emitting element 110B.

In the display apparatus 200A, since the light-emitting devices of different colors are separately formed, a change in chromaticity between light emission at low luminance and light emission at high luminance is small. Furthermore, since the organic layers 112R, 112G, and 112B are separated from each other, crosstalk generated between adjacent subpixels can be inhibited while the display panel has high definition. It is thus possible to achieve a display apparatus that has high definition and high display quality.

In a region between adjacent light-emitting elements, the insulating layer 125, the resin layer 126, and the layer 128 are provided.

The pixel electrode 111R, the pixel electrode 111G, and the pixel electrode 111B of the light-emitting elements are each electrically connected to one of the source and the drain of the transistor 310 through a plug 256 that is embedded in the insulating layer 255a, the insulating layer 255b, and the insulating layer 255c, the conductive layer 241 that is embedded in the insulating layer 254, and the plug 271 that is embedded in the insulating layer 261. A top surface of the insulating layer 255c and a top surface of the plug 256 are level with or substantially level with each other. A variety of conductive materials can be used for the plugs.

In addition, the protective layer 121 is provided over the light-emitting elements 110R, 110G, and 110B. A substrate 170 is attached onto the protective layer 121 with an adhesive layer 171.

An insulating layer covering an end portion of a top surface of the pixel electrode 111 is not provided between two adjacent pixel electrodes 111. Thus, the distance between adjacent light-emitting elements can be extremely narrowed. Accordingly, the display apparatus can have high definition or high resolution.

Display Apparatus 200B

Figure 16:
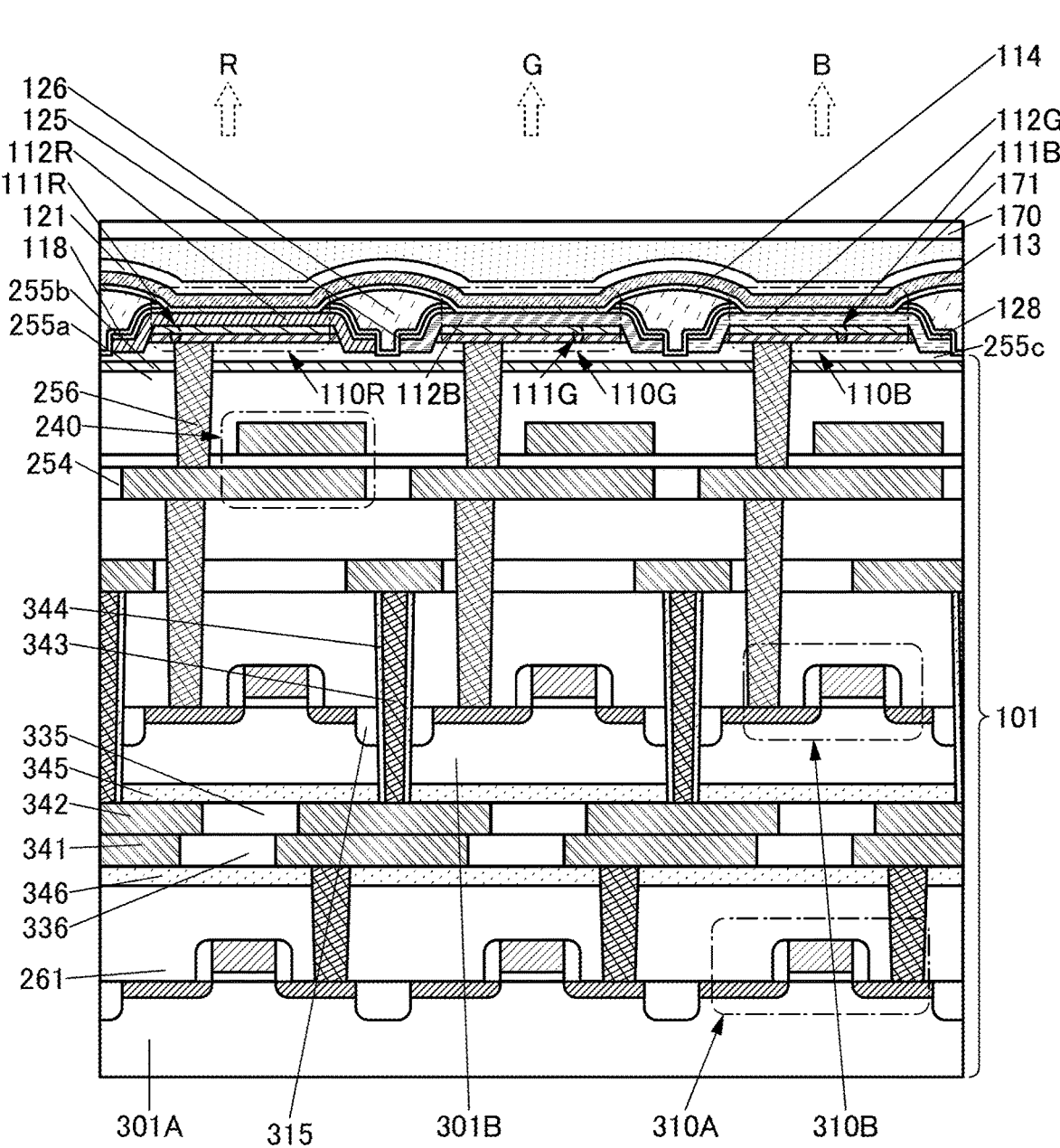
FIG. 16 is a diagram illustrating a structure example of a display apparatus.

The display apparatus 200B illustrated in FIG. 16 has a structure where transistors 310A and transistors 310B in each of which a channel is formed in a semiconductor substrate are stacked. Note that in the following description of the display panel, the description of portions similar to those of the above display panel is omitted in some cases.

The display apparatus 200B has a structure where a substrate 301B provided with the transistors 310B, the capacitors 240, and the light-emitting devices is attached to a substrate 301A provided with the transistors 310A.

Here, an insulating layer 345 is provided on a bottom surface of the substrate 301B, and an insulating layer 346 is provided over the insulating layer 261 provided over the substrate 301A. The insulating layers 345 and 346 are insulating layers functioning as protective layers and can inhibit diffusion of impurities into the substrate 301B and the substrate 301A. For the insulating layers 345 and 346, an inorganic insulating film that can be used for the protective layer 121 or an insulating layer 332 can be used.

The substrate 301B is provided with plugs 343 that penetrate the substrate 301B and the insulating layer 345. Here, insulating layers 344 each functioning as a protective layer are preferably provided to cover side surfaces of the plugs 343.

In addition, a conductive layer 342 is provided under the insulating layer 345 on the substrate 301B. The conductive layer 342 is embedded in an insulating layer 335, and bottom surfaces of the conductive layer 342 and the insulating layer 335 are planarized. Furthermore, the conductive layer 342 is electrically connected to the plug 343.

In contrast, a conductive layer 341 is provided over the insulating layer 346 over the substrate 301A. The conductive layer 341 is embedded in an insulating layer 336, and top surfaces of the conductive layer 341 and the insulating layer 336 are planarized.

The same conductive material is preferably used for the conductive layer 341 and the conductive layer 342. A metal film containing an element selected from Al, Cr, Cu, Ta, Ti, Mo, and W, a metal nitride film containing the above element as a component (a titanium nitride film, a molybdenum nitride film, or a tungsten nitride film), or the like can be used, for example. Copper is particularly preferably used for the conductive layer 341 and the conductive layer 342. Accordingly, it is possible to employ a Cu-to-Cu (copper-to-copper) direct bonding technique (a technique for achieving electrical continuity by connecting Cu (copper) pads to each other).

Display Apparatus 200C

Figure 17:
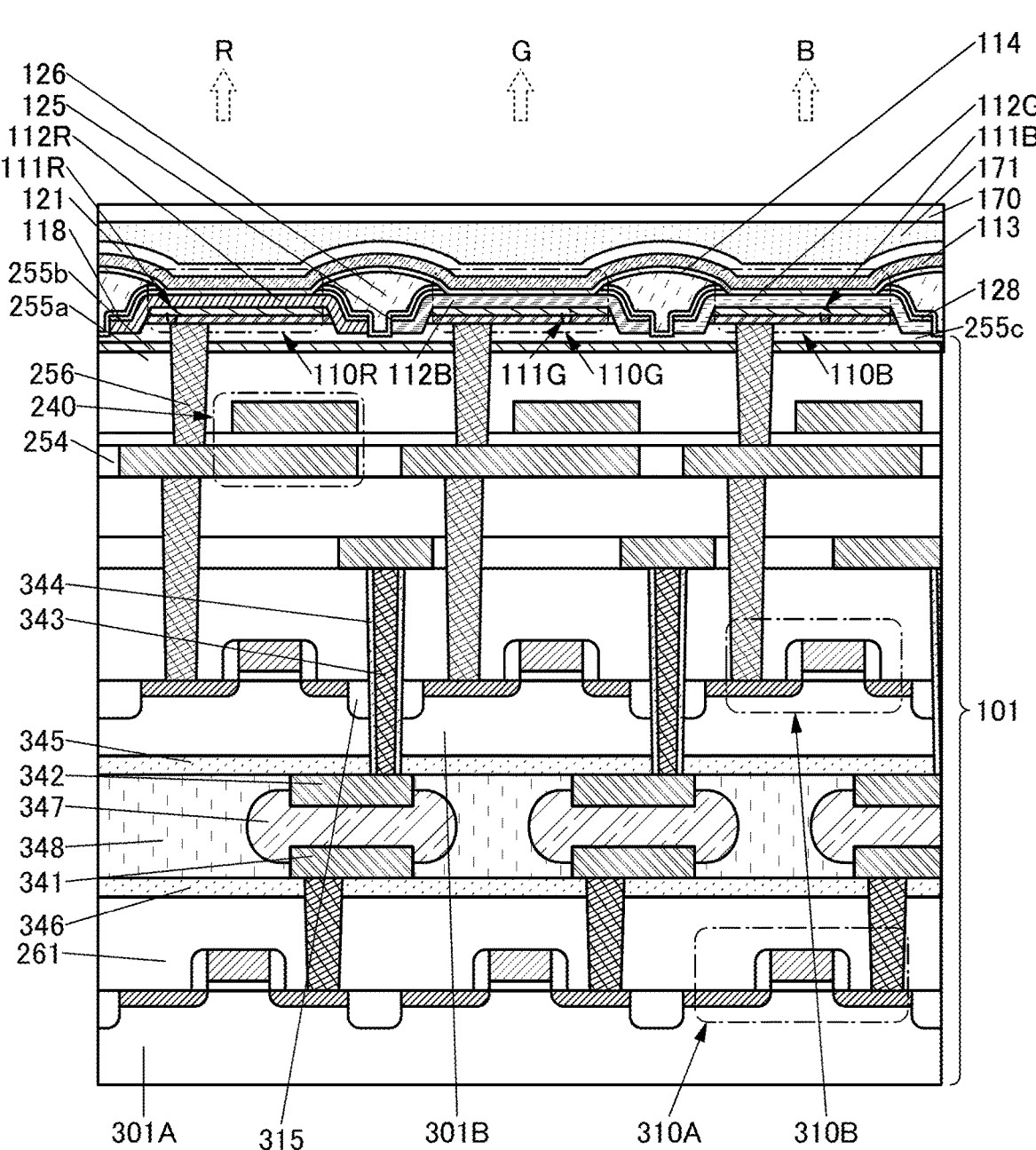
FIG. 17 is a diagram illustrating a structure example of a display apparatus.

The display apparatus 200C illustrated in FIG. 17 has a structure where the conductive layer 341 and the conductive layer 342 are bonded to each other through a bump 347.

As illustrated in FIG. 17, providing the bump 347 between the conductive layer 341 and the conductive layer 342 enables the conductive layer 341 and the conductive layer 342 to be electrically connected to each other. The bump 347 can be formed using a conductive material containing gold (Au), nickel (Ni), indium (In), tin (Sn), or the like, for example. As another example, solder is used for the bump 347 in some cases. In addition, an adhesive layer 348 may be provided between the insulating layer 345 and the insulating layer 346. Furthermore, in the case where the bump 347 is provided, a structure without the insulating layer 335 and the insulating layer 336 may be employed.

Display Apparatus 200D

Figure 18:
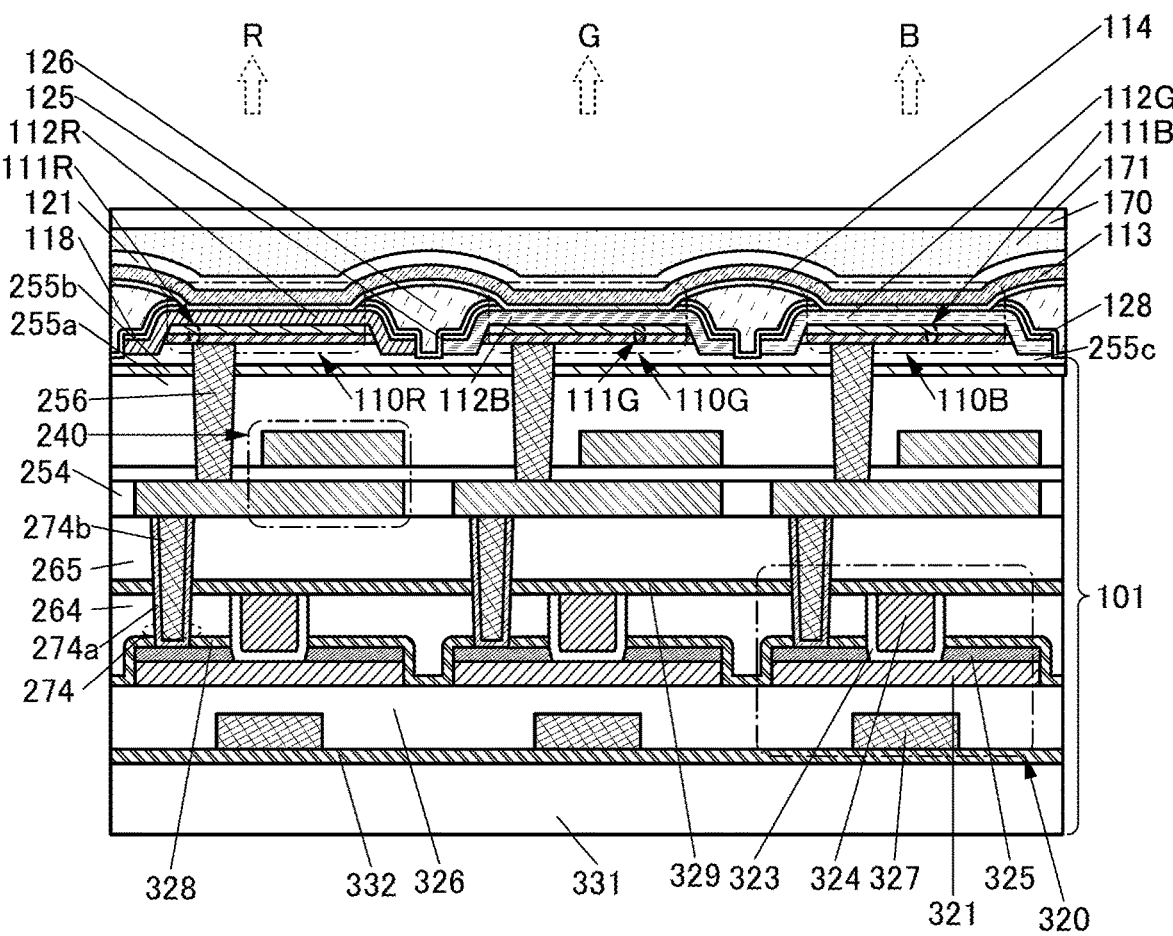
FIG. 18 is a diagram illustrating a structure example of a display apparatus.

The display apparatus 200D illustrated in FIG. 18 differs from the display apparatus 200A mainly in a transistor structure.

A transistor 320 is a transistor (an OS transistor) in which a metal oxide (also referred to as an oxide semiconductor) is employed in a semiconductor layer where a channel is formed.

The transistor 320 includes a semiconductor layer 321, an insulating layer 323, a conductive layer 324, a pair of conductive layers 325, an insulating layer 326, and a conductive layer 327.

A substrate 331 corresponds to the substrate 291 in FIG. 14A and FIG. 14B.

The insulating layer 332 is provided over the substrate 331. The insulating layer 332 functions as a barrier layer that prevents diffusion of impurities such as water or hydrogen from the substrate 331 into the transistor 320 and release of oxygen from the semiconductor layer 321 to the insulating layer 332 side. As the insulating layer 332, for example, a film in which hydrogen or oxygen is less likely to diffuse than in a silicon oxide film, such as an aluminum oxide film, a hafnium oxide film, or a silicon nitride film, can be used.

The conductive layer 327 is provided over the insulating layer 332, and the insulating layer 326 is provided to cover the conductive layer 327. The conductive layer 327 functions as a first gate electrode of the transistor 320, and part of the insulating layer 326 functions as a first gate insulating layer. An oxide insulating film such as a silicon oxide film is preferably used for at least part of the insulating layer 326 that is in contact with the semiconductor layer 321. A top surface of the insulating layer 326 is preferably planarized.

The semiconductor layer 321 is provided over the insulating layer 326. The semiconductor layer 321 preferably includes a metal oxide (also referred to as an oxide semiconductor) film exhibiting semiconductor characteristics. The pair of conductive layers 325 is provided on and in contact with the semiconductor layer 321, and functions as a source electrode and a drain electrode.

An insulating layer 328 is provided to cover top surfaces and side surfaces of the pair of conductive layers 325, side surfaces of the semiconductor layer 321, and the like, and an insulating layer 264 is provided over the insulating layer 328. The insulating layer 328 functions as a barrier layer that prevents diffusion of impurities such as water or hydrogen from the insulating layer 264 or the like into the semiconductor layer 321 and release of oxygen from the semiconductor layer 321. For the insulating layer 328, an insulating film similar to the insulating layer 332 can be used.

An opening reaching the semiconductor layer 321 is provided in the insulating layer 328 and the insulating layer 264. The conductive layer 324 and the insulating layer 323 that is in contact with a top surface of the semiconductor layer 321 are embedded in the opening. The conductive layer 324 functions as a second gate electrode, and the insulating layer 323 functions as a second gate insulating layer.

A top surface of the conductive layer 324, a top surface of the insulating layer 323, and a top surface of the insulating layer 264 are subjected to planarization treatment so that they are level with or substantially level with each other, and an insulating layer 329 and an insulating layer 265 are provided to cover these layers.

The insulating layer 264 and the insulating layer 265 each function as an interlayer insulating layer. The insulating layer 329 functions as a barrier layer that prevents diffusion of impurities such as water or hydrogen from the insulating layer 265 or the like to the transistor 320. For the insulating layer 329, an insulating film similar to the insulating layer 328 and the insulating layer 332 can be used.

A plug 274 electrically connected to one of the pair of conductive layers 325 is provided to be embedded in the insulating layer 265, the insulating layer 329, and the insulating layer 264. Here, the plug 274 preferably includes a conductive layer 274a that covers side surfaces of openings in the insulating layer 265, the insulating layer 329, the insulating layer 264, and the insulating layer 328 and part of a top surface of the conductive layer 325, and a conductive layer 274b in contact with a top surface of the conductive layer 274a. In that case, a conductive material in which hydrogen and oxygen are less likely to diffuse is preferably used for the conductive layer 274a.

Display Apparatus 200E

Figure 19:
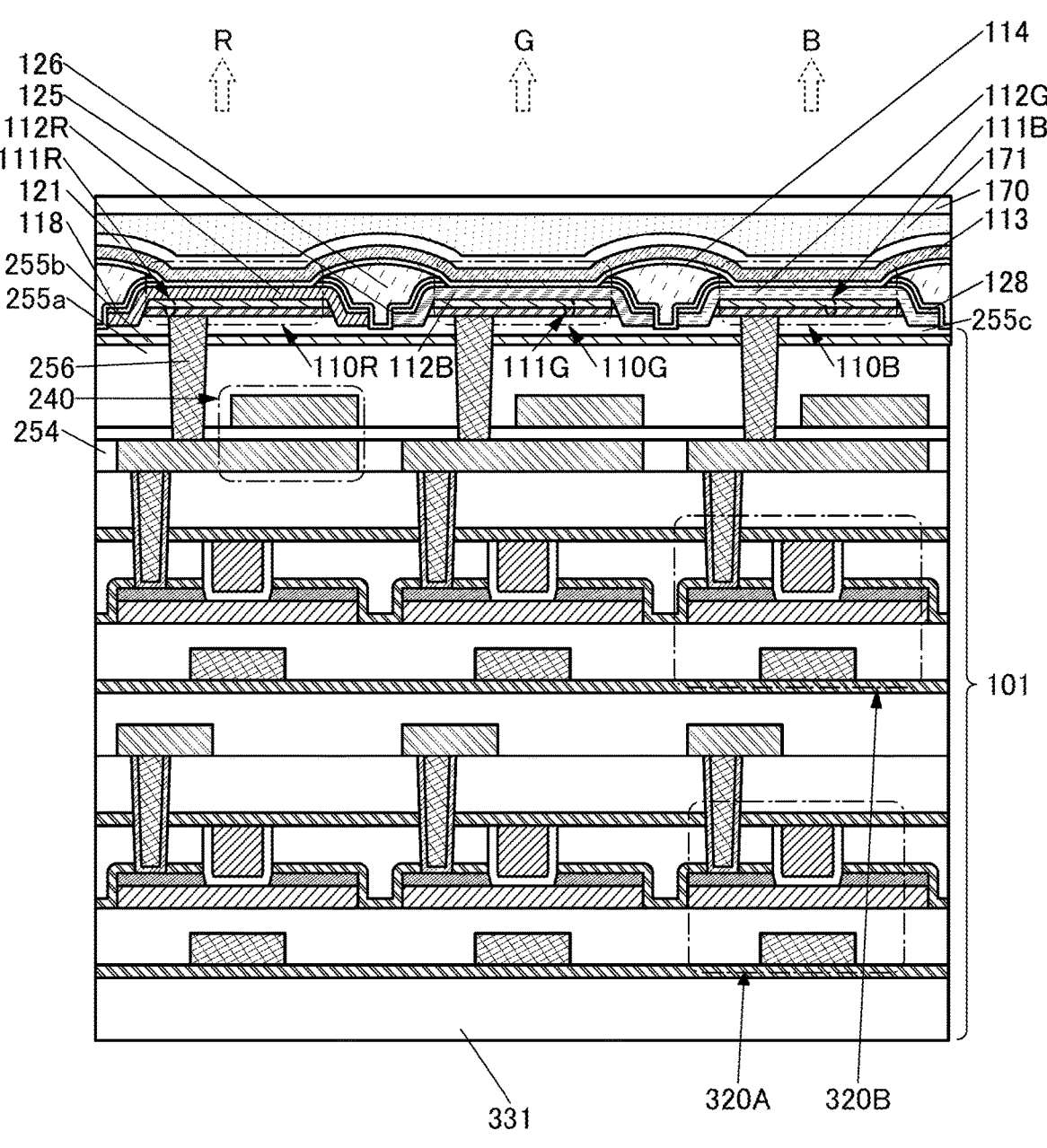
FIG. 19 is a diagram illustrating a structure example of a display apparatus.

The display apparatus 200E illustrated in FIG. 19 has a structure in which a transistor 320A and a transistor 320B each including an oxide semiconductor in a semiconductor where a channel is formed are stacked.

The description of the display apparatus 200D can be referred to for the transistor 320A, the transistor 320B, and other peripheral structures.

Note that although the structure in which two transistors including an oxide semiconductor are stacked is described here, the present invention is not limited thereto. For example, a structure may be employed in which three or more transistors are stacked.

Display Apparatus 200F

Figure 20:
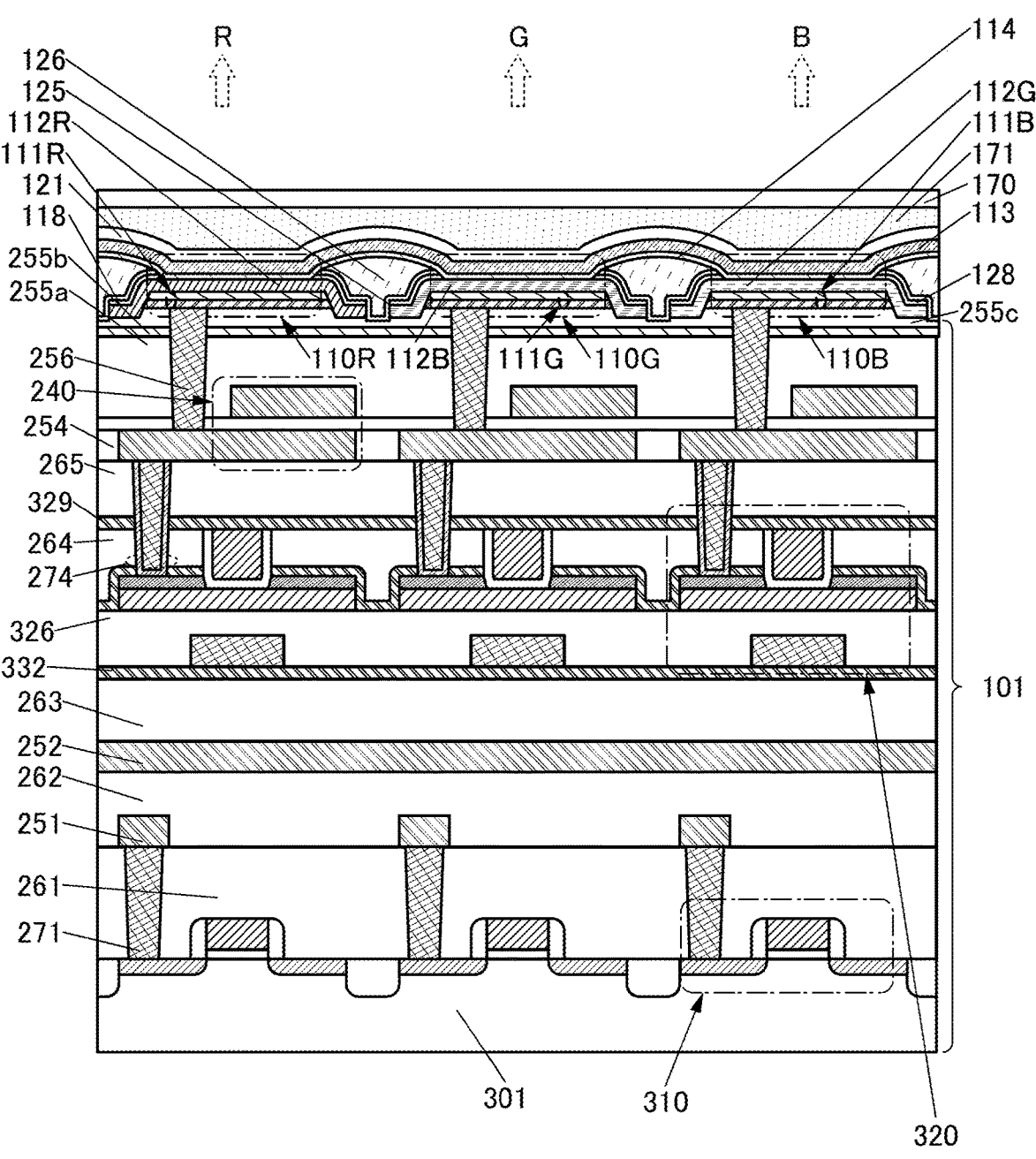
FIG. 20 is a diagram illustrating a structure example of a display apparatus.

The display apparatus 200F illustrated in FIG. 20 has a structure in which the transistor 310 whose channel is formed in the substrate 301 and the transistor 320 including a metal oxide in the semiconductor layer where the channel is formed are stacked.

The insulating layer 261 is provided to cover the transistor 310, and a conductive layer 251 is provided over the insulating layer 261. In addition, an insulating layer 262 is provided to cover the conductive layer 251, and a conductive layer 252 is provided over the insulating layer 262. The conductive layer 251 and the conductive layer 252 each function as a wiring. Furthermore, an insulating layer 263 and the insulating layer 332 are provided to cover the conductive layer 252, and the transistor 320 is provided over the insulating layer 332. Moreover, the insulating layer 265 is provided to cover the transistor 320, and the capacitor 240 is provided over the insulating layer 265. The capacitor 240 and the transistor 320 are electrically connected to each other through the plug 274.

The transistor 320 can be used as a transistor included in a pixel circuit. In addition, the transistor 310 can be used as a transistor included in a pixel circuit or a transistor included in a driver circuit (a gate line driver circuit or a source line driver circuit) for driving the pixel circuit. Furthermore, the transistor 310 and the transistor 320 can be used as transistors included in a variety of circuits such as an arithmetic circuit or a memory circuit.

With such a structure, not only the pixel circuit but also the driver circuit and the like can be formed directly under the light-emitting devices; thus, the display panel can be downsized as compared with the case where the driver circuit is provided around a display region.

At least part of this embodiment can be implemented in appropriate combination with the other embodiments described in this specification.

Embodiment 5

In this embodiment, a light-emitting element (also referred to as a light-emitting device) that can be used in the display apparatus according to one embodiment of the present invention will be described.

In this specification and the like, a device manufactured using a metal mask or an FMM (a fine metal mask or a high-definition metal mask) is sometimes referred to as a device having an MM (metal mask) structure. In addition, in this specification and the like, a device manufactured without using a metal mask or an FMM is sometimes referred to as a device having an MML (metal maskless) structure.

Note that in this specification and the like, a structure where light-emitting layers in light-emitting devices of different colors (here, blue (B), green (G), and red (R)) are separately formed or separately patterned is sometimes referred to as an SBS (Side By Side) structure. In addition, in this specification and the like, a light-emitting device capable of emitting white light is sometimes referred to as a white-light-emitting device. Note that a combination of white-light-emitting devices with coloring layers (e.g., color filters) enables a full-color display apparatus.

Light-Emitting Device

Structures of light-emitting devices can be classified roughly into a single structure and a tandem structure. A light-emitting device having a single structure includes one light-emitting unit between a pair of electrodes. The light-emitting unit includes one or more light-emitting layers. To obtain white light emission with a single structure, two or more light-emitting layers are selected so that a white color can be produced by light emission of the light-emitting layers. For example, in the case of two colors, when the emission color of a first light-emitting layer and the emission color of a second light-emitting layer have a relationship of complementary colors, it is possible to obtain a structure where the light-emitting device emits white light as a whole. Furthermore, in the case where white light emission is obtained using three or more light-emitting layers, the light-emitting device is configured to be able to emit white light as a whole by combining the emission colors of the three or more light-emitting layers.

A light-emitting device having a tandem structure includes a plurality of light-emitting units between a pair of electrodes, and each light-emitting unit includes one or more light-emitting layers. When light-emitting layers that emit light of the same color are used in each light-emitting unit, luminance per predetermined current can be increased, and the light-emitting device can have higher reliability than that with a single structure. To obtain white light emission with a tandem structure, the structure is made so that light from light-emitting layers of the plurality of light-emitting units can be combined to be white light. Note that a combination of emission colors for obtaining white light emission is similar to that in the case of a single structure. Note that in the device having a tandem structure, it is suitable to provide an intermediate layer such as a charge-generation layer between a plurality of light-emitting units.

When a white light-emitting device and a light-emitting device having an SBS structure are compared with each other, the light-emitting device having the SBS structure can have lower power consumption than the white light-emitting device. Meanwhile, the white-light-emitting device can achieve lower manufacturing cost and a higher manufacturing yield because the manufacturing process of the white-light-emitting device is simpler than that of the light-emitting device having the SBS structure.

Structure Example of Light-Emitting Device

Figures 21A, 21B, 21C, 21D, 21E, 21F:
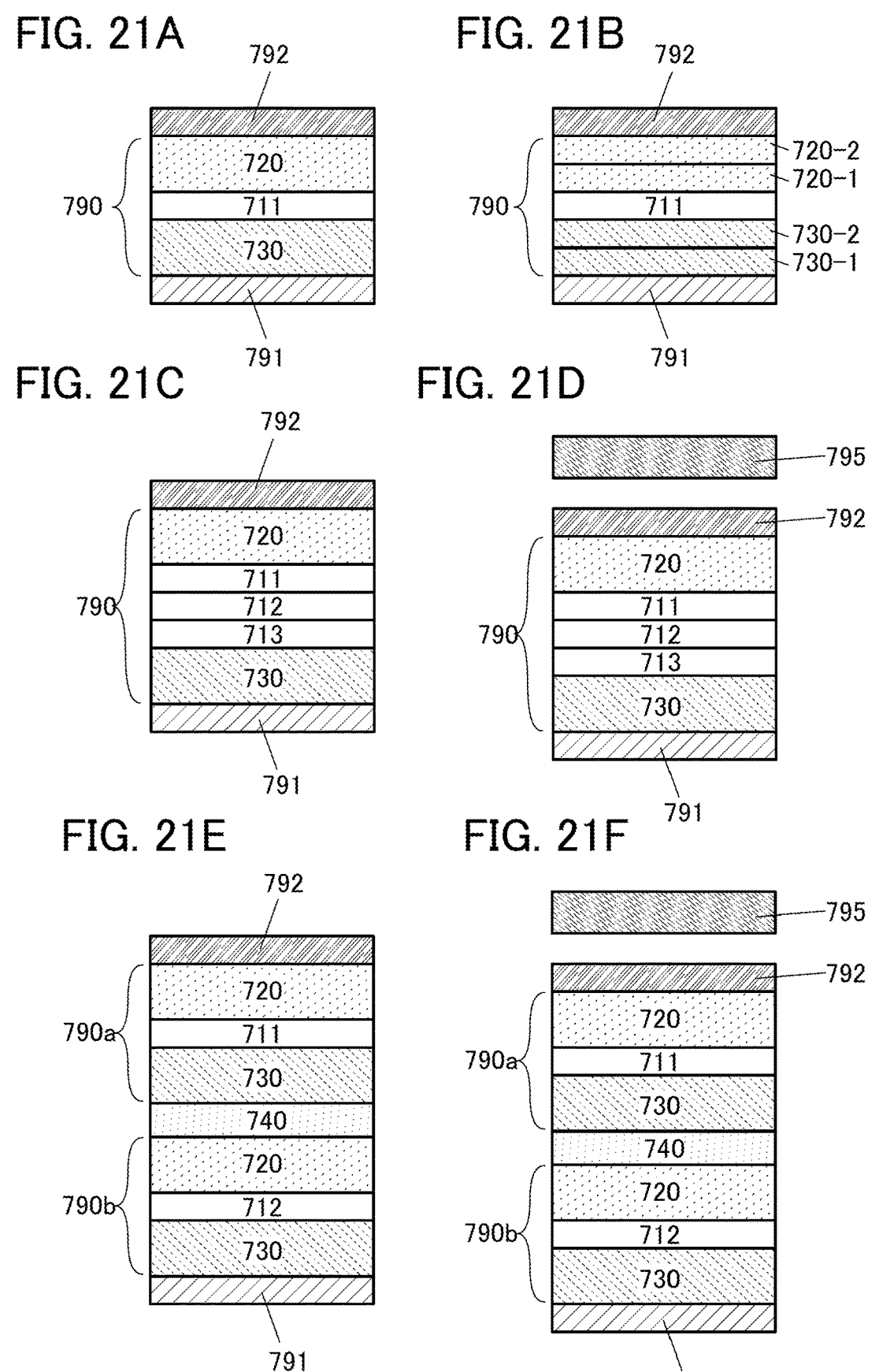
FIG. 21A to FIG. 21F are diagrams illustrating structure examples of light-emitting devices.

As illustrated in FIG. 21A, the light-emitting device includes an EL layer 790 between a pair of electrodes (a lower electrode 791 and an upper electrode 792). The EL layer 790 can be formed of a plurality of layers such as a layer 720, a light-emitting layer 711, and a layer 730. The layer 720 can include, for example, a layer containing a substance with a high electron-injection property (an electron-injection layer), a layer containing a substance with a high electron-transport property (an electron-transport layer), and the like. The light-emitting layer 711 contains a light-emitting compound, for example. The layer 730 can include a layer containing a substance having a high hole-injection property (a hole-injection layer) and a layer containing a substance having a high hole-transport property (a hole-transport layer), for example.

The structure including the layer 720, the light-emitting layer 711, and the layer 730 that are provided between a pair of electrodes can function as a single light-emitting unit, and the structure in FIG. 21A is referred to as a single structure in this specification.

Specifically, a light-emitting device illustrated in FIG. 21B includes, over the lower electrode 791, a layer 730-1, a layer 730-2, the light-emitting layer 711, a layer 720-1, a layer 720-2, and the upper electrode 792. For example, the lower electrode 791 functions as an anode, and the upper electrode 792 functions as a cathode. In that case, the layer 730-1 functions as a hole-injection layer, the layer 730-2 functions as a hole-transport layer, the layer 720-1 functions as an electron-transport layer, and the layer 720-2 functions as an electron-injection layer. In contrast, when the lower electrode 791 functions as a cathode and the upper electrode 792 functions as an anode, the layer 730-1 functions as an electron-injection layer, the layer 730-2 functions as an electron-transport layer, the layer 720-1 functions as a hole-transport layer, and the layer 720-2 functions as a hole-injection layer. With such a layer structure, carriers can be efficiently injected to the light-emitting layer 711, and the efficiency of recombination of carriers in the light-emitting layer 711 can be increased.

Note that the structures in which a plurality of light-emitting layers (light-emitting layers 711, 712, and 713) are provided between the layer 720 and the layer 730 as illustrated in FIG. 21C and FIG. 21D are also variations of the single structure.

A structure in which a plurality of light-emitting units (an EL layer 790a and an EL layer 790b) are connected in series with an intermediate layer (a charge-generation layer) 740 therebetween as illustrated in FIG. 21E and FIG. 21F is referred to as a tandem structure in this specification. The tandem structure may be referred to as a stack structure. Note that the tandem structure enables a light-emitting device capable of high luminance light emission.

In FIG. 21C, light-emitting materials that emit light of the same color or the same light-emitting material may be used for the light-emitting layer 711, the light-emitting layer 712, and the light-emitting layer 713. The stacked light-emitting layers can increase emission luminance.

Alternatively, different light-emitting materials may be used for the light-emitting layer 711, the light-emitting layer 712, and the light-emitting layer 713. White light emission can be obtained when the light-emitting layer 711, the light-emitting layer 712, and the light-emitting layer 713 emit light having a relationship of complementary colors. FIG. 21D illustrates an example in which a coloring layer 795 functioning as a color filter is provided. When white light passes through a color filter, light of a desired color can be obtained.

In addition, in FIG. 21E, light-emitting materials that emit light of the same color may be used for the light-emitting layer 711 and the light-emitting layer 712. Alternatively, light-emitting materials that emit light of different colors may be used for the light-emitting layer 711 and the light-emitting layer 712. White light emission can be obtained when the light-emitting layer 711 and the light-emitting layer 712 emit light having a relationship of complementary colors. FIG. 21F illustrates an example in which the coloring layer 795 is further provided.

Note that also in FIG. 21C, FIG. 21D, FIG. 21E, and FIG. 21F, the layer 720 and the layer 730 may each have a stacked-layer structure of two or more layers as illustrated in FIG. 21B.

In addition, in FIG. 21D, light-emitting materials that emit light of the same color may be used for the light-emitting layer 711, the light-emitting layer 712, and the light-emitting layer 713. Similarly, in FIG. 21F, light-emitting materials that emit light of the same color may be used for the light-emitting layer 711 and the light-emitting layer 712. In that case, when a color conversion layer is employed instead of the coloring layer 795, light of a desired color that is different from the color of the light-emitting material can be obtained. For example, a blue light-emitting material is used for each light-emitting layer and blue light passes through the color conversion layer, so that light with a wavelength longer than that of blue light (e.g., red light, green light, or the like) can be obtained. For the color conversion layer, a fluorescent material, a phosphorescent material, quantum dots, or the like can be used.

The emission color of the light-emitting device can be red, green, blue, cyan, magenta, yellow, white, or the like depending on the material that constitutes the EL layer 790. In addition, when the light-emitting device has a microcavity structure, color purity can be further increased.

In the light-emitting device that emits white light, a light-emitting layer may contain two or more kinds of light-emitting substances, or two or more light-emitting layers containing different light-emitting substances may be stacked. In such a case, the light-emitting substances are preferably selected such that the light-emitting substances emit light having a relationship of complementary colors.

Light-Emitting Device

A specific structure example of the light-emitting device is described here.

The light-emitting device includes at least the light-emitting layer. In addition, the light-emitting device may further include, as a layer other than the light-emitting layer, a layer containing a substance with a high hole-injection property, a substance with a high hole-transport property, a hole-blocking material, a substance with a high electron-transport property, an electron-blocking material, a substance with a high electron-injection property, an electron-blocking material, a substance with a bipolar property (a substance with a high electron-transport property and a high hole-transport property), or the like.

Either a low molecular compound or a high molecular compound can be used in the light-emitting device, and an inorganic compound may also be included. Each layer included in the light-emitting device can be formed by a method such as an evaporation method (including a vacuum evaporation method), a transfer method, a printing method, an inkjet method, or a coating method.

For example, the light-emitting device can include one or more of a hole-injection layer, a hole-transport layer, a hole-blocking layer, an electron-blocking layer, an electron-transport layer, and an electron-injection layer in addition to the light-emitting layer.

The hole-injection layer is a layer injecting holes from an anode to a hole-transport layer and containing a material with a high hole-injection property. Examples of a material with a high hole-injection property include an aromatic amine compound, and a composite material containing a hole-transport material and an acceptor material (an electron-accepting material).

The hole-transport layer is a layer transporting holes, which are injected from the anode by the hole-injection layer, to the light-emitting layer. The hole-transport layer is a layer containing a hole-transport material. The hole-transport material preferably has a hole mobility of higher than or equal to $1 \times 10^{-6}$ cm$^2$/Vs. Note that other substances can be also used as long as the substances have a hole-transport property higher than an electron-transport property. As the hole-transport material, a material with a high hole-transport property, such as a π-electron rich heteroaromatic compound (e.g., a carbazole derivative, a thiophene derivative, or a furan derivative) or an aromatic amine (a compound having an aromatic amine skeleton) is preferable.

The electron-transport layer is a layer transporting electrons, which are injected from the cathode by the electron-injection layer, to the light-emitting layer. The electron-transport layer contains an electron-transport material. The electron-transport material preferably has an electron mobility of higher than or equal to $1 \times 10^{-6}$ cm$^2$/Vs. Note that other substances can be also used as long as the substances have an electron-transport property higher than a hole-transport property. As the electron-transport material, it is possible to use a material with a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound including a nitrogen-containing heteroaromatic compound.

The electron-injection layer is a layer injecting electrons from the cathode to the electron-transport layer and containing a material with a high electron-injection property. As the material with a high electron-injection property, an alkali metal, an alkaline earth metal, or a compound thereof can be used. As the material with a high electron-injection property, a composite material containing an electron-transport material and a donor material (an electron-donating material) can be also used.

For the electron-injection layer, for example, an alkali metal, an alkaline earth metal, or a compound thereof, such as lithium, cesium, ytterbium, lithium fluoride (LiF), cesium fluoride (CsF), calcium fluoride (CaF$_2$), 8-(quinolinolato) lithium (abbreviation: Liq), 2-(2-pyridyl)phenolatolithium (abbreviation: LiPP), 2-(2-pyridyl)-3-pyridinolato lithium (abbreviation: LiPPy), 4-phenyl-2-(2-pyridyl)phenolato-lithium (abbreviation: LiPPP), lithium oxide (LiO$_x$), or cesium carbonate can be used. In addition, the electron-injection layer may have a stacked-layer structure of two or more layers. In the stacked-layer structure, for example, lithium fluoride can be used for a first layer and ytterbium can be provided for a second layer.

Alternatively, as the above electron-injection layer, an electron-transport material may be used. For example, a compound having an unshared electron pair and having an electron deficient heteroaromatic ring can be used as the electron-transport material. Specifically, a compound having at least one of a pyridine ring, a diazine ring (a pyrimidine ring, a pyrazine ring, or a pyridazine ring), and a triazine ring can be used.

Note that the lowest unoccupied molecular orbital (LUMO) level of the organic compound having an unshared electron pair is preferably greater than or equal to −3.6 eV and less than or equal to −2.3 eV. In addition, in general, the highest occupied molecular orbital (HOMO) level and the LUMO level of an organic compound can be estimated by CV (cyclic voltammetry), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), diquinoxalino[2,3-a:2',3'-c]phenazine (abbreviation: HATNA), 2,4,6-tris[3'-(pyridin-3-yl)biphenyl-3-yl]-1,3,5-triazine (abbreviation: TmPPPyTz), or the like can be used for the organic compound having an unshared electron pair. Note that NBPhen has a higher glass transition temperature (Tg) than BPhen and thus has high heat resistance.

The light-emitting layer is a layer containing a light-emitting substance. The light-emitting layer can contain one or more kinds of light-emitting substances. As the light-emitting substance, a substance that exhibits an emission color of blue, violet, bluish violet, green, yellowish green, yellow, orange, red, or the like is used as appropriate. Alternatively, a substance that emits near-infrared light can be used as the light-emitting substance.

Examples of the light-emitting substance include a fluorescent material, a phosphorescent material, a TADF material, and a quantum dot material.

Examples of a fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of a phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer may contain one or more kinds of organic compounds (a host material, an assist material, and the like) in addition to the light-emitting substance (a guest material). As one or more kinds of organic compounds, one or both of a hole-transport material and an electron-transport material can be used. Alternatively, as one or more kinds of organic compounds, a bipolar material or a TADF material may be used.

The light-emitting layer preferably includes a phosphorescent material and a combination of a hole-transport material and an electron-transport material that easily forms an exciplex, for example. Such a structure makes it possible to efficiently obtain light emission using ExTET (Exciplex-Triplet Energy Transfer), which is energy transfer from an exciplex to a light-emitting substance (a phosphorescent material). When a combination of materials is selected to form an exciplex that exhibits light emission whose wavelength is to overlap with the wavelength of the lowest-energy-side absorption band of the light-emitting substance, energy can be transferred smoothly and light emission can be obtained efficiently. With this structure, the high efficiency, low-voltage driving, and long lifetime of the light-emitting device can be achieved at the same time.

At least part of the structure examples, the drawings corresponding thereto, and the like described in this embodiment can be combined with the other structure examples, the other drawings, and the like as appropriate.

At least part of this embodiment can be implemented in appropriate combination with the other embodiments described in this specification.

Embodiment 6

In this embodiment, a light-receiving device that can be used in the display apparatus according to one embodiment of the present invention and a display apparatus having a function of receiving and emitting light will be described.

For example, a pn-type or pin-type photodiode can be used as the light-receiving device. The light-receiving device functions as a photoelectric conversion device (also referred to as a photoelectric conversion element) that detects light entering the light-receiving device and generates charge. The amount of charge generated from the light-receiving device depends on the amount of light entering the light-receiving device.

It is particularly preferable to use an organic photodiode including a layer containing an organic compound, as the light-receiving device. An organic photodiode, which is easily made thin, lightweight, and large in area and has a high degree of freedom for shape and design, can be employed in a variety of display apparatuses.

Light-Receiving Device

Figure 22A:
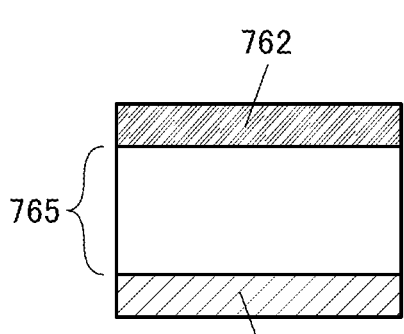
FIG. 22A and FIG. 22B are diagrams illustrating structure examples of light-receiving devices.

As illustrated in FIG. 22A, the light-receiving device includes a layer 765 between a pair of electrodes (a lower electrode 761 and an upper electrode 762). The layer 765 includes at least one active layer, and may further include another layer.

Figure 22B:
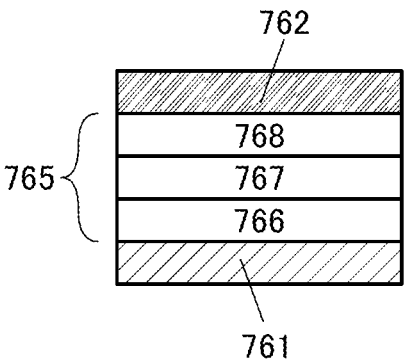

In addition, FIG. 22B is a modification example of the layer 765 included in the light-receiving device illustrated in FIG. 22A. Specifically, the light-receiving device illustrated in FIG. 22B includes a layer 766 over the lower electrode 761, an active layer 767 over the layer 766, a layer 768 over the active layer 767, and the upper electrode 762 over the layer 768.

The active layer 767 functions as a photoelectric conversion layer.

In the case where the lower electrode 761 is an anode and the upper electrode 762 is a cathode, the layer 766 includes one or both of a hole-transport layer and an electron-blocking layer. In addition, the layer 768 includes one or both of an electron-transport layer and a hole-blocking layer. In the case where the lower electrode 761 is a cathode and the upper electrode 762 is an anode, the structures of the layer 766 and the layer 768 are interchanged.

Here, the display apparatus according to one embodiment of the present invention includes a layer shared by the light-receiving device and the light-emitting device (the layer can be also regarded as a continuous layer shared by the light-receiving device and the light-emitting device) in some cases. The function of such a layer in the light-emitting device is different from its function in the light-receiving device in some cases. In this specification, the name of a component is based on its function in the light-emitting device in some cases. For example, a hole-injection layer functions as a hole-injection layer in the light-emitting device and functions as a hole-transport layer in the light-receiving device. Similarly, an electron-injection layer functions as an electron-injection layer in the light-emitting device and functions as an electron-transport layer in the light-receiving device. In addition, a layer shared by the light-receiving device and the light-emitting device might have the same function in the light-emitting device and the light-receiving device. For example, the hole-transport layer functions as a hole-transport layer in both the light-emitting device and the light-receiving device, and the electron-transport layer functions as an electron-transport layer in both the light-emitting device and the light-receiving device.

Next, materials that can be used for the light-receiving device are described.

Either a low molecular compound or a high molecular compound can be used in the light-receiving device, and an inorganic compound may be contained. Each layer included in the light-receiving device can be formed by an evaporation method (including a vacuum evaporation method), a transfer method, a printing method, an inkjet method, a coating method, or the like.

The active layer included in the light-receiving device contains a semiconductor. Examples of the semiconductor include an inorganic semiconductor such as silicon and an organic semiconductor including an organic compound. This embodiment describes an example in which an organic semiconductor is used as the semiconductor contained in the active layer. The use of an organic semiconductor is preferable because the light-emitting layer and the active layer can be formed by the same method (e.g., a vacuum evaporation method) and thus a manufacturing apparatus can be used in common.

Examples of an n-type semiconductor material contained in the active layer include electron-accepting organic semiconductor materials such as fullerene (e.g., $C_{60}$, $C_{70}$, or the like) and fullerene derivatives. Examples of fullerene derivatives include [6,6]-Phenyl-$C_{71}$-butyric acid methyl ester (abbreviation: PC70BM), [6,6]-Phenyl-$C_{61}$-butyric acid methyl ester (abbreviation: PC60BM), and 1',1",4',4"-Tetrahydro-di[1,4]methanonaphthaleno[1,2:2',3',56,60:2", 3"][5,6]fullerene-$C_{60}$ (abbreviation: ICBA).

Other examples of the n-type semiconductor material include perylenetetracarboxylic acid derivatives such as N,N-dimethyl-3,4,9,10-perylenetetracarboxylic diimide (abbreviation: Me-PTCDI) and 2,2'-(5,5'-(thieno[3,2-b]thiophene-2,5-diyl)bis(thiophene-5,2-diyl)bis(methan-1-yl-1-ylidene)dim alononitrile (abbreviation: FT2TDMN).

Other examples of the n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer include electron-donating organic semiconductor materials such as copper (II) phthalocyanine (CuPc), tetraphenyldibenzoperiflanthene (DBP), zinc phthalocyanine (ZnPc), tin phthalocyanine (SnPc), quinacridone, and rubrene.

Other examples of the p-type semiconductor material include a carbazole derivative, a thiophene derivative, a furan derivative, and a compound having an aromatic amine skeleton. Furthermore, other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a rubrene derivative, a tetracene derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can increase a carrier-transport property.

In addition, for the active layer, a high molecular compound such as Poly[[4,8-bis[5-(2-ethylhexyl)-2-thienyl]benzo[1,2-b:4,5-b']dithiophene-2,6-diyl]-2,5-thiophenediyl[5,7-bis(2-ethylhexyl)-4,8-dioxo-4H,8H-benzo[1,2-c:4,5-c']dithiophene-1,3-diyl]] polyer (abbreviation: PBDB-T) or a PBDB-T derivative, which functions as a donor, can be used. For example, a method in which an acceptor material is dispersed to PBDB-T or a PBDB-T derivative can be used.

For example, the active layer is preferably formed by co-evaporation of an n-type semiconductor and a p-type semiconductor. Alternatively, the active layer may be formed by stacking an n-type semiconductor and a p-type semiconductor.

In addition, three or more kinds of materials may be mixed for the active layer. For example, a third material may be mixed with an n-type semiconductor material and a p-type semiconductor material in order to extend a wavelength range. In that case, the third material may be either a low molecular compound or a high molecular compound.

As a layer other than the active layer, the light-receiving device may further include a layer containing a substance with a high hole-transport property, a substance with a high electron-transport property, a substance with a bipolar property (a substance with a high electron-transport property and a high hole-transport property), or the like. Furthermore, without limitation to the above, a layer containing a substance with a high hole-injection property, a hole-blocking material, a material with a high electron-injection property, an electron-blocking material, or the like may be further included. A material that can be used for the light-emitting device can be used for layers other than the active layer included in the light-receiving device.

As the hole-transport material or the electron-blocking material, a high molecular compound such as poly(3,4-ethylenedioxythiophene)/poly(styrenesulfonic acid) (PEDOT/PSS), or an inorganic compound such as a molybdenum oxide or copper iodide (CuI) can be used, for example. In addition, as the electron-transport material or the hole-blocking material, an inorganic compound such as zinc oxide (ZnO) or an organic compound such as polyethylenimine ethoxylate (PEIE) can be used. The light-receiving device may include a mixed film of PEIE and ZnO, for example.

Display Apparatus Having Light Detection Function

In the display apparatus according to one embodiment of the present invention, the light-emitting devices are arranged in a matrix in a display portion, and an image can be displayed on the display portion. Furthermore, the light-receiving devices are arranged in a matrix in the display portion, and the display portion has one or both of an imaging function and a sensing function in addition to an image displaying function. The display portion can be used as an image sensor or a touch sensor. That is, by detecting light with the display portion, an image can be captured or the approach or contact of a target (a finger, a hand, a pen, or the like) can be detected.

Furthermore, in the display apparatus according to one embodiment of the present invention, the light-emitting device can be used as a light source of the sensor. In the display apparatus according to one embodiment of the present invention, when an object reflects (or scatters) light emitted from the light-emitting device included in the display portion, the light-receiving device can detect reflected light (or scattered light); thus, imaging or touch detection is possible even in a dark place.

Accordingly, neither a light-receiving portion nor a light source does not need to be provided separately from the display apparatus, and thus the number of components of an electronic device can be reduced. For example, it is not necessary to separately provide a biometric authentication device provided in the electronic device or a capacitive touch panel for scrolling or the like. Thus, with the use of the display apparatus according to one embodiment of the present invention, the electronic device can be provided with reduced manufacturing cost.

Specifically, the display apparatus according to one embodiment of the present invention includes a light-emitting device and a light-receiving device in a pixel. In the display apparatus according to one embodiment of the present invention, an organic EL device is used as the light-emitting device, and an organic photodiode is used as the light-receiving device. The organic EL device and the organic photodiode can be formed over the same substrate. Thus, the organic photodiode can be incorporated in the display apparatus using the organic EL device.

In the display apparatus including the light-emitting device and the light-receiving device in the pixel, the pixel has a light-receiving function, which enables detection of the touch or approach of an object while an image is displayed. For example, all the subpixels included in the display apparatus can display an image; alternatively, some subpixels can emit light as a light source and the other subpixels can display an image.

In the case where the light-receiving device is used as an image sensor, the display apparatus can capture an image with the use of the light-receiving device. For example, the display apparatus of this embodiment can be used as a scanner.

For example, imaging for personal authentication with the use of a fingerprint, a palm print, an iris, the shape of a blood vessel (including the shape of a vein and the shape of an artery), a face, or the like is possible by using the image sensor.

For example, an image of the periphery of an eye, the surface of the eye, or the inside (fundus or the like) of the eye of a user of a wearable device can be captured with the use of the image sensor. Therefore, the wearable device can have a function of detecting any one or more selected from a blink, movement of an iris, and movement of an eyelid of the user.

In addition, the light-receiving device can be used in a touch sensor (also referred to as a direct touch sensor), a near touch sensor (also referred to as a hover sensor, a hover touch sensor, a contactless sensor, or a touchless sensor), or the like.

Here, a touch sensor or a near touch sensor can detect the approach or touch of an object (a finger, a hand, a pen, or the like).

The touch sensor can detect an object when the display apparatus and the object come in direct contact with each other. In addition, the near touch sensor can detect an object even when the object is not in contact with the display apparatus. For example, the display apparatus is preferably capable of detecting an object when the distance between the display apparatus and the object is greater than or equal to 0.1 mm and less than or equal to 300 mm, preferably greater than or equal to 3 mm and less than or equal to 50 mm. This structure enables the display apparatus to be operated without direct contact of the object, that is, enables the display apparatus to be operated in a contactless (touchless) manner. With the above structure, the display apparatus can have a reduced risk of being dirty or damaged, or can be operated without the object directly touching a dirt (e.g., dust or a virus) attached to the display apparatus.

In addition, the refresh rate of the display apparatus according to one embodiment of the present invention can be variable. For example, the refresh rate is adjusted (adjusted in the range from 1 Hz to 240 Hz, for example) in accordance with contents displayed on the display apparatus, so that power consumption can be reduced. Furthermore, the drive frequency of the touch sensor or the near touch sensor may be changed in accordance with the refresh rate. In the case where the refresh rate of the display apparatus is 120 Hz, for example, a structure can be employed in which the drive frequency of the touch sensor or the near touch sensor is a frequency higher than 120 Hz (typically 240 Hz). This structure can achieve low power consumption and can increase the response speed of the touch sensor or the near touch sensor.

Figure 22C:
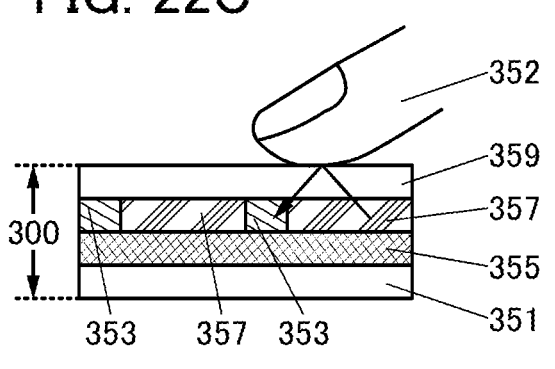
FIG. 22C to FIG. 22E are diagrams illustrating structure examples of a display apparatus.
Figure 22D:
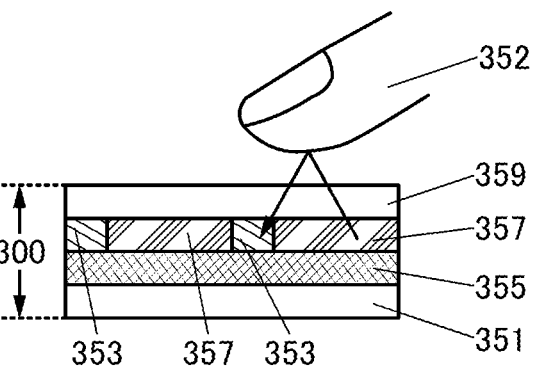
Figure 22E:
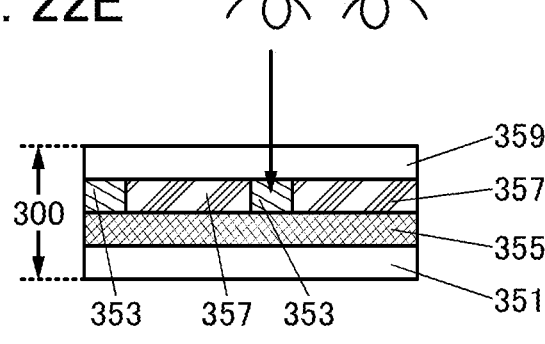

A display apparatus 300 illustrated in FIG. 22C to FIG. 22E includes layers 353 each including a light-receiving device, a functional layer 355, and layers 357 each including a light-emitting device, between a substrate 351 and a substrate 359.

The functional layer 355 includes a circuit for driving a light-receiving device and a circuit for driving a light-emitting device. One or more of a switch, a transistor, a capacitor, a resistor, a wiring, a terminal, and the like can be provided in the functional layer 355. Note that in the case where the light-emitting device and the light-receiving device are driven by a passive-matrix method, a structure provided with neither a switch nor a transistor may be employed.

For example, when light emitted from the light-emitting device in the layer 357 including the light-emitting device is reflected by a finger 352 touching the display apparatus 300 as illustrated in FIG. 22C, the light-receiving device in the layer 353 including the light-receiving device detects the reflected light. Thus, the touch of the finger 352 on the display apparatus 300 can be detected.

Alternatively, as illustrated in FIG. 22D and FIG. 22E, the display apparatus may have a function of detecting an object that is close to (i.e., not touching) the display apparatus or capturing an image of such an object.

At least part of this embodiment can be implemented in appropriate combination with the other embodiments described in this specification.

Embodiment 7

In this embodiment, electronic devices according to one embodiment of the present invention will be described using FIG. 23 to FIG. 25.

Electronic devices in this embodiment each include the display panel (display apparatus) according to one embodiment of the present invention in a display portion. The display panel according to one embodiment of the present invention can easily achieve higher definition and higher resolution and can achieve high display quality. Thus, the display apparatus according to one embodiment of the present invention can be used for display portions of a variety of electronic devices.

Examples of the electronic devices include a digital camera, a digital video camera, a digital photo frame, a cellular phone, a portable game machine, a portable information terminal, and an audio reproducing device, in addition to electronic devices with comparatively large screens, such as a television device, a desktop or laptop personal computer, a monitor for a computer or the like, digital signage, and a large game machine such as a pachinko machine.

In particular, the display panel according to one embodiment of the present invention can have higher definition, and thus can be suitably used for an electronic device having a comparatively small display portion. Examples of such an electronic device include wristwatch-type and bracelet-type information terminal devices (wearable devices) and a wearable device that can be worn on a head, such as a device for VR such as a head-mounted display, a glasses-type device for AR, or a device for MR.

The resolution of the display panel according to one embodiment of the present invention is preferably as high as HD (pixel count: 1280×720), FHD (pixel count: 1920×1080), WQHD (pixel count: 2560×1440), WQXGA (pixel count: 2560×1600), 4K (pixel count: 3840×2160), or 8K (pixel count: 7680×4320). In particular, the resolution of 4K, 8K, or higher is preferable. In addition, the pixel density (definition) of the display panel according to one embodiment of the present invention is preferably higher than or equal to 100 ppi, further preferably higher than or equal to 300 ppi, still further preferably higher than or equal to 500 ppi, still further preferably higher than or equal to 1000 ppi, still further preferably higher than or equal to 2000 ppi, still further preferably higher than or equal to 3000 ppi, still further preferably higher than or equal to 5000 ppi, yet further preferably higher than or equal to 7000 ppi. With the use of such a display panel with one or both of high resolution and high definition, an electronic device for personal use such as portable use or home use can have higher realistic sensation, sense of depth, and the like. Furthermore, there is no particular limitation on the screen ratio (aspect ratio) of the display panel according to one embodiment of the present invention. For example, the display panel is compatible with a variety of screen ratios such as 1:1 (a square), 4:3, 16:9, and 16:10.

The electronic device in this embodiment may include a sensor (a sensor having a function of sensing, detecting, or measuring force, displacement, a position, speed, acceleration, angular velocity, rotational frequency, distance, light, liquid, magnetism, temperature, a chemical substance, sound, time, hardness, an electric field, current, voltage, power, radiation, flow rate, humidity, a gradient, oscillation, odor, or infrared rays).

The electronic device in this embodiment can have a variety of functions. For example, the electronic device in this embodiment can have a function of displaying a variety of information (a still image, a moving image, a text image, and the like) on the display portion, a touch panel function, a function of displaying a calendar, date, time, and the like, a function of executing a variety of software (programs), a wireless communication function, and a function of reading out a program or data stored in a storage medium.

Examples of wearable devices that can be worn on a head are described using FIG. 23A to FIG. 23D. These wearable devices have one or both of a function of displaying AR contents and a function of displaying VR contents. Note that the wearable devices may have a function of displaying SR or MR contents, in addition to AR and VR contents. The electronic device having a function of displaying contents of at least one of AR, VR, SR, MR, and the like enables the user to reach a higher level of immersion.

Figure 23A:
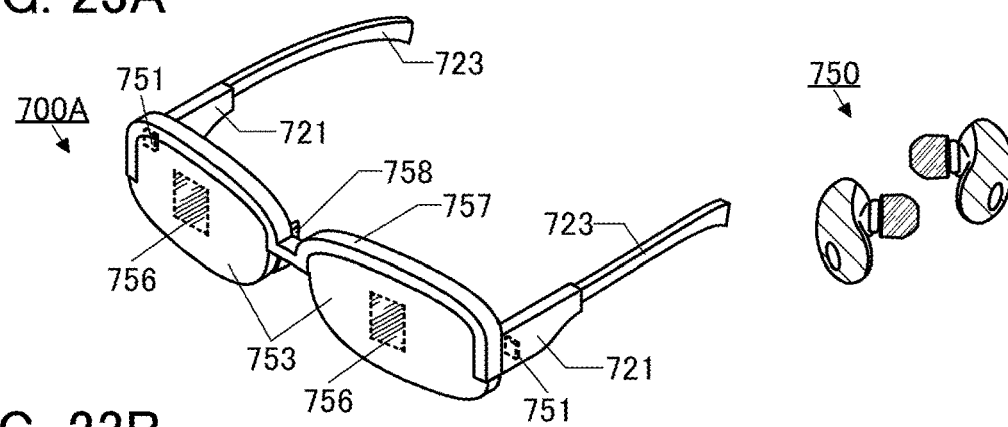
FIG. 23A to FIG. 23D are diagrams illustrating structure examples of electronic devices.
Figure 23B:
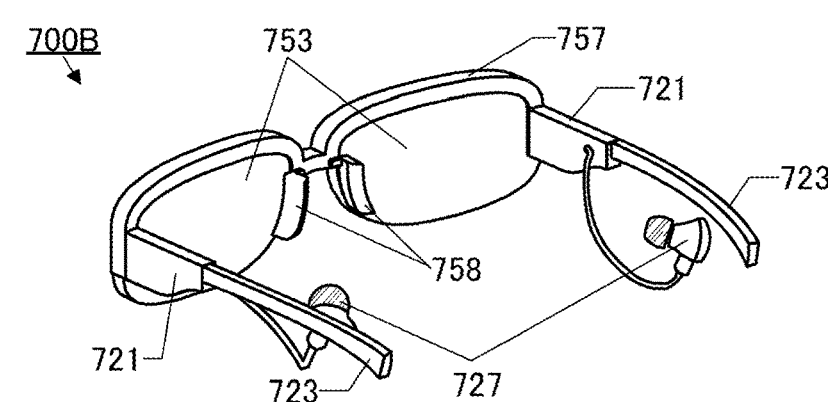

An electronic device 700A illustrated in FIG. 23A an electronic device 700B illustrated in FIG. 23B each include a pair of display panels 751, a pair of housings 721, a communication portion (not illustrated), a pair of wearing portions 723, a control portion (not illustrated), an imaging portion (not illustrated), a pair of optical members 753, a frame 757, and a pair of nose pads 758.

The display panel according to one embodiment of the present invention can be employed for the display panel 751. Thus, the electronic device can perform display with extremely high definition.

The electronic device 700A and the electronic device 700B can each project images displayed on the display panels 751 onto display regions 756 of the optical members 753. Since the optical members 753 have a light-transmitting property, the user can see images displayed on the display regions that are superimposed on transmission images seen through the optical members 753. Thus, the electronic device 700A and the electronic device 700B are electronic devices capable of AR display.

In each of the electronic device 700A and the electronic device 700B, a camera capable of capturing images of the front side may be provided as the imaging portion. Furthermore, when each of the electronic device 700A and the electronic device 700B is provided with an acceleration sensor such as a gyroscope sensor, the orientation of a user's head can be sensed and an image corresponding to the orientation can be displayed on the display region 756.

The communication portion includes a wireless communication device, and a video signal and the like can be supplied by the wireless communication device. Note that instead of the wireless communication device or in addition to the wireless communication device, a connector to which a cable supplied with a video signal and a power potential can be connected may be provided.

In addition, each of the electronic device 700A and the electronic device 700B is provided with a battery so that charging can be performed wirelessly and/or by wire.

A touch sensor module may be provided in the housing 721. The touch sensor module has a function of detecting a touch on an outer surface of the housing 721. A tap operation, a slide operation, or the like by the user can be detected with the touch sensor module, so that a variety of processings can be executed. For example, processing such as a pause or a restart of a moving image can be executed by a tap operation, and processing such as fast forward or fast rewind can be executed by a slide operation. In addition, the touch sensor module is provided in each of the two housings 721, so that the range of the operation can be increased.

A variety of touch sensors can be employed for the touch sensor module. For example, touch sensors of a variety of types such as a capacitive type, a resistive film type, an infrared type, an electromagnetic induction type, a surface acoustic wave type, and an optical type can be employed. In particular, a capacitive sensor or an optical sensor is preferably employed for the touch sensor module.

In the case of using an optical touch sensor, a photoelectric conversion device (also referred to as a photoelectric conversion element) can be used as a light-receiving device. One or both of an inorganic semiconductor and an organic semiconductor can be used for an active layer of the photoelectric conversion device.

Figure 23C:
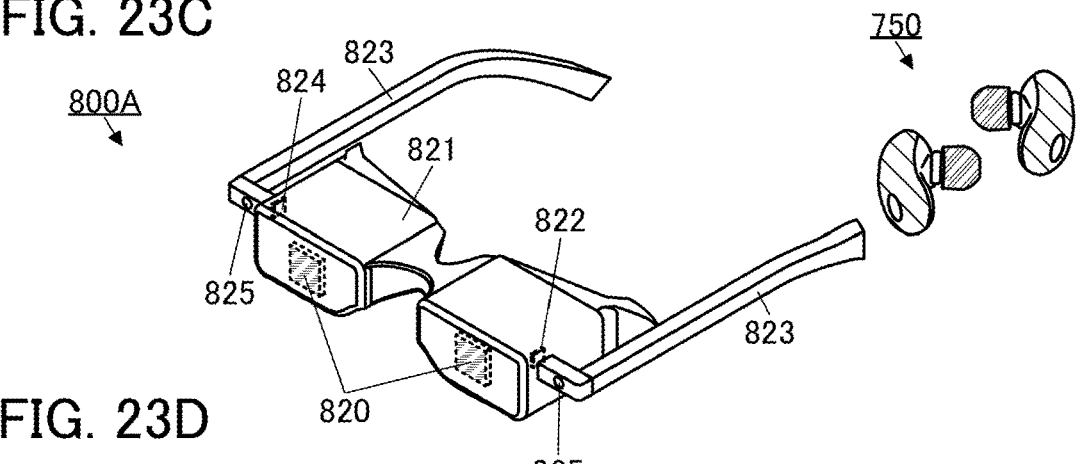
Figure 23D:
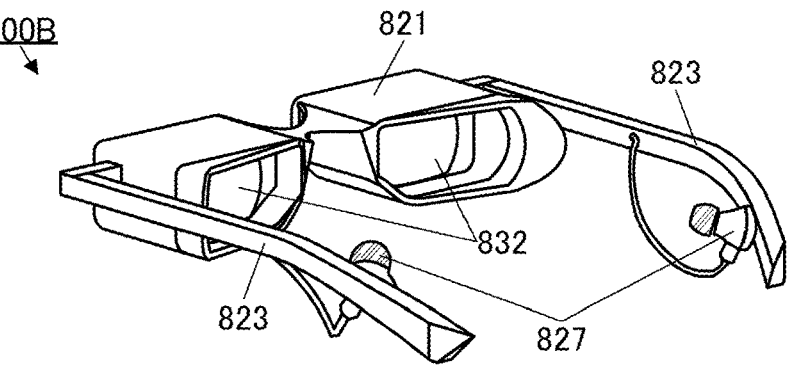

An electronic device 800A illustrated in FIG. 23C and an electronic device 800B illustrated in FIG. 23D each include a pair of display portions 820, a housing 821, a communication portion 822, a pair of wearing portions 823, a control portion 824, a pair of imaging portions 825, and a pair of lenses 832.

The display panel according to one embodiment of the present invention can be employed in the display portion 820. Thus, the electronic device can perform display with extremely high definition. This enables the user to feel a high sense of immersion.

The display portions 820 are positioned inside the housing 821 to be seen through the lenses 832. Furthermore, when the pair of display portions 820 display different images, 3D display using parallax can be also performed.

Each of the electronic device 800A and the electronic device 800B can be regarded as an electronic device for VR. The user who wears the electronic device 800A or the electronic device 800B can see images displayed on the display portions 820 through the lenses 832.

The electronic device 800A and the electronic device 800B each preferably include a mechanism for adjusting the lateral positions of the lenses 832 and the display portions 820 so that the lenses 832 and the display portions 820 are positioned optimally in accordance with the positions of the user's eyes. In addition, a mechanism for adjusting focus by changing the distance between the lens 832 and the display portion 820 is preferably included.

The electronic device 800A or the electronic device 800B can be worn on the user's head with the wearing portions 823. Note that FIG. 23C and the like illustrate examples where the wearing portion 823 has a shape like a temple of glasses (also referred to as a joint or the like); however, one embodiment of the present invention is not limited thereto. The wearing portion 823 can have any shape with which the user can wear and can have a shape of a helmet or a band, for example.

The imaging portion 825 has a function of obtaining external information. Data obtained by the imaging portion 825 can be output to the display portion 820. An image sensor can be used for the imaging portion 825. Moreover, a plurality of cameras may be provided to support a plurality of fields of view, such as a telescope field of view and a wide field of view.

Note that although an example where the imaging portion 825 is included is shown here, a range sensor that is capable of measuring the distance between the user and an object (hereinafter such a sensor is also referred to as a sensing portion) is provided. In other words, the imaging portion 825 is one embodiment of the sensing portion. For the sensing portion, an image sensor or a distance image sensor such as LIDAR (Light Detection and Ranging) can be used, for example. By using images obtained by a camera and images obtained by the distance image sensor, more information can be obtained and a gesture operation with higher accuracy is possible.

The electronic device 800A may include a vibration mechanism that functions as bone-conduction earphones. For example, any one or more of the display portion 820, the housing 821, and the wearing portion 823 can include the vibration mechanism. Thus, without additionally requiring an audio device such as headphones, earphones, or a speaker, the user can enjoy a video and sound only by wearing the electronic device 800A.

The electronic device 800A and the electronic device 800B may each include an input terminal. To the input terminal, a cable for supplying a video signal from a video output device or the like, power for charging a battery provided in the electronic device, and the like can be connected.

An electronic device according to one embodiment of the present invention may have a function of performing wireless communication with earphones 750. The earphones 750 include a communication portion (not illustrated) and have a wireless communication function. The earphones 750 can receive information (e.g., audio data) from the electronic device with the wireless communication function. For example, the electronic device 700A illustrated in FIG. 23A has a function of transmitting information to the earphones 750 with the wireless communication function. As another example, the electronic device 800A illustrated in FIG. 23C has a function of transmitting information to the earphones 750 with the wireless communication function.

Alternatively, the electronic device may include an earphone portion. The electronic device 700B illustrated in FIG. 23B includes earphone portions 727. For example, a structure in which the earphone portions 727 and the control portion are connected to each other by wire can be employed. Part of a wiring that connects the earphone portions 727 and the control portion may be positioned inside the housing 721 or the wearing portion 723.

Similarly, the electronic device 800B illustrated in FIG. 23D includes earphone portions 827. For example, a structure in which the earphone portions 827 and the control portion 824 are connected to each other by wire can be employed. Part of a wiring that connects the earphone portions 827 and the control portion 824 may be positioned inside the housing 821 or the wearing portion 823. Alternatively, the earphone portions 827 and the wearing portions 823 may include magnets. This is preferable because the earphone portions 827 can be fixed to the wearing portions 823 with magnetic force and thus can be easily housed.

Note that the electronic device may include an audio output terminal to which earphones, headphones, or the like can be connected. Alternatively, the electronic device may include one or both of an audio input terminal and an audio input mechanism. As the audio input mechanism, a sound collecting device such as a microphone can be used, for example. The electronic device may have a function of what is called a headset by including the audio input mechanism.

As described above, both the glasses-type device (the electronic device 700A, the electronic device 700B, or the like) and the goggles-type device (the electronic device

800A, the electronic device 800B, or the like) are suitable for the electronic device according to one embodiment of the present invention.

An electronic device 6500 illustrated in FIG. 24A is a portable information terminal that can be used as a smartphone.

The electronic device 6500 includes a housing 6501, a display portion 6502, a power button 6503, buttons 6504, a speaker 6505, a microphone 6506, a camera 6507, a light source 6508, and the like. The display portion 6502 has a touch panel function.

The display panel according to one embodiment of the present invention can be employed for the display portion 6502.

FIG. 24B is a schematic cross-sectional view including an end portion of the housing 6501 on the microphone 6506 side.

A protection member 6510 having a light-transmitting property is provided on a display surface side of the housing 6501, and a display panel 6511, an optical member 6512, a touch sensor panel 6513, a printed circuit board 6517, a battery 6518, and the like are provided in a space surrounded by the housing 6501 and the protection member 6510.

The display panel 6511, the optical member 6512, and the touch sensor panel 6513 are fixed to the protection member 6510 with an adhesive layer (not illustrated).

Part of the display panel 6511 is folded back in a region outside the display portion 6502, and an FPC 6515 is connected to the part that is folded back. An IC 6516 is mounted on the FPC 6515. The FPC 6515 is connected to a terminal provided on the printed circuit board 6517.

A flexible display according to one embodiment of the present invention can be employed for the display panel 6511. Thus, an extremely lightweight electronic device can be achieved. In addition, since the display panel 6511 is extremely thin, the battery 6518 with high capacity can be mounted while the thickness of the electronic device is reduced. Moreover, part of the display panel 6511 is folded back so that a connection portion with the FPC 6515 is provided on the back side of a pixel portion, so that an electronic device with a narrow bezel can be achieved.

FIG. 24C illustrates an example of a television device. In a television device 7100, a display portion 7000 is incorporated in a housing 7101. Here, a structure in which the housing 7101 is supported by a stand 7103 is illustrated.

Operations of the television device 7100 illustrated in FIG. 24C can be performed with an operation switch provided in the housing 7101 and a separate remote control 7111. Alternatively, the display portion 7000 may include a touch sensor, and the television device 7100 may be operated by touch on the display portion 7000 with a finger or the like. The remote control 7111 may include a display portion for displaying information output from the remote control 7111. With operation keys or a touch panel provided in the remote control 7111, channels and sound volume can be operated and a video displayed on the display portion 7000 can be operated.

Note that the television device 7100 includes a receiver, a modem, and the like. A general television broadcast can be received with the receiver. In addition, when the television device is connected to a communication network with or without wires via the modem, one-way (from a transmitter to a receiver) or two-way (between a transmitter and a receiver or between receivers, for example) data communication can be performed.

FIG. 24D illustrates an example of a laptop personal computer. A laptop personal computer 7200 includes a housing 7211, a keyboard 7212, a pointing device 7213, an external connection port 7214, and the like. The display portion 7000 is incorporated in the housing 7211.

FIG. 24E and FIG. 24F illustrate examples of digital signage.

Digital signage 7300 illustrated in FIG. 24E includes a housing 7301, the display portion 7000, a speaker 7303, and the like. Furthermore, the digital signage 7300 can include an LED lamp, an operation key (including a power switch or an operation switch), a connection terminal, a variety of sensors, a microphone, and the like.

FIG. 24F is digital signage 7400 attached to a cylindrical pillar 7401. The digital signage 7400 includes the display portion 7000 provided along a curved surface of the pillar 7401.

The larger display portion 7000 can increase the amount of information that can be provided at a time. In addition, the larger display portion 7000 attracts more attention, so that advertising effects can be increased, for example.

The use of a touch panel in the display portion 7000 is preferable because in addition to display of an image or a moving image on the display portion 7000, an intuitive operation by the user is possible. Moreover, in the case where the display panel according to one embodiment of the present invention is used for providing information such as route information or traffic information, usability can be increased by an intuitive operation.

In addition, as illustrated in FIG. 24E and FIG. 24F, it is preferable that the digital signage 7300 or the digital signage 7400 can work with an information terminal device 7311 or an information terminal device 7411 such as a user's smartphone through wireless communication. For example, information of an advertisement displayed on the display portion 7000 can be displayed on a screen of the information terminal device 7311 or the information terminal device 7411. Furthermore, by the operation of the information terminal device 7311 or the information terminal device 7411, display on the display portion 7000 can be switched.

It is also possible to make the digital signage 7300 or the digital signage 7400 execute a game with the use of the screen of the information terminal device 7311 or the information terminal device 7411 as an operation means (a controller). Thus, an unspecified number of users can join in and enjoy the game concurrently.

The display panel according to one embodiment of the present invention can be employed for the display portion 7000 illustrated in each of FIG. 24C to FIG. 24F.

Electronic devices illustrated in FIG. 25A to FIG. 25G include a housing 9000, a display portion 9001, a speaker 9003, an operation key 9005 (including a power switch or an operation switch), a connection terminal 9006, a sensor 9007 (a sensor having a function of sensing, detecting, or measuring force, displacement, a position, speed, acceleration, angular velocity, rotational frequency, a distance, light, liquid, magnetism, temperature, a chemical substance, sound, time, hardness, an electric field, current, voltage, power, radiation, flow rate, humidity, a gradient, oscillation, an odor, or infrared rays), a microphone 9008, and the like.

The electronic devices illustrated in FIG. 25A to FIG. 25G have a variety of functions. For example, the electronic devices can have a function of displaying a variety of information (a still image, a moving image, a text image, and the like) on the display portion, a touch panel function, a function of displaying a calendar, date, time, and the like, a function of controlling processing with the use of a variety of software (programs), a wireless communication function, and a function of reading out and processing a program or data stored in a storage medium. Note that the functions of the electronic devices are not limited thereto, and the electronic devices can have a variety of functions. The electronic devices may include a plurality of display portions. In addition, the electronic devices may each be provided with a camera or the like and have a function of taking a still image or a moving image and storing the taken image in a storage medium (an external storage medium or a storage medium incorporated in the camera), a function of displaying the taken image on the display portion, or the like.

The electronic devices illustrated in FIG. 25A to FIG. 25G are described in detail below.

FIG. 25A is a perspective view illustrating a portable information terminal 9101. For example, the portable information terminal 9101 can be used as a smartphone. Note that the portable information terminal 9101 may be provided with the speaker 9003, the connection terminal 9006, the sensor 9007, or the like. In addition, the portable information terminal 9101 can display characters and image information on its plurality of surfaces. FIG. 25A illustrates an example in which three icons 9050 are displayed. Furthermore, information 9051 indicated by dashed rectangles can be displayed on another surface of the display portion 9001. Examples of the information 9051 include notification of incoming e-mails, SNS, calls, and the like; the titles and senders of e-mails, SNS, and the like; dates; time; remaining battery; and radio field intensity. Alternatively, the icon 9050 or the like may be displayed at the position where the information 9051 is displayed.

FIG. 25B is a perspective view illustrating a portable information terminal 9102. The portable information terminal 9102 has a function of displaying information on three or more surfaces of the display portion 9001. Here, an example in which information 9052, information 9053, and information 9054 are displayed on different surfaces is shown. For example, the user can check the information 9053 in a position that can be observed from above the portable information terminal 9102, with the portable information terminal 9102 put in a breast pocket of his/her clothes. The user can see display without taking out the portable information terminal 9102 from the pocket and determine whether to answer a call, for example.

FIG. 25C is a perspective view illustrating a tablet terminal 9103. The tablet terminal 9103 is capable of executing a variety of applications such as mobile phone calls, e-mailing, viewing and editing texts, music reproduction, Internet communication, and a computer game, for example. The tablet terminal 9103 includes the display portion 9001, a camera 9002, the microphone 9008, and the speaker 9003 on a front surface of the housing 9000; the operation keys 9005 as buttons for operations on a left side surface of the housing 9000; and the connection terminal 9006 on a bottom surface.

FIG. 25D is a perspective view illustrating a wristwatch-type portable information terminal 9200. For example, the portable information terminal 9200 can be used as a Smartwatch (registered trademark). In addition, a display surface of the display portion 9001 is provided and curved, and display can be performed along the curved display surface. Furthermore, mutual communication between the portable information terminal 9200 and, for example, a headset capable of wireless communication enables hands-free calling. Moreover, with the connection terminal 9006, the portable information terminal 9200 can perform mutual data transmission with another information terminal and charging. Note that a charging operation may be performed by wireless power feeding.

FIG. 25E to FIG. 25G are perspective views illustrating a foldable portable information terminal 9201. In addition, FIG. 25E is a perspective view of an opened state of the portable information terminal 9201, FIG. 25G is a perspective view of a folded state thereof, and FIG. 25F is a perspective view of a state in the middle of change from one of FIG. 25E and FIG. 25G to the other. The portable information terminal 9201 is highly portable in the folded state and is highly browsable in the opened state because of a seamless large display region. The display portion 9001 of the portable information terminal 9201 is supported by three housings 9000 joined together by hinges 9055. For example, the display portion 9001 can be bent with a radius of curvature greater than or equal to 0.1 mm and less than or equal to 150 mm. At least part of this embodiment can be implemented in appropriate combination with the other embodiments described in this specification.

EXAMPLE

In this example, MTF measurement results of the display apparatus according to one embodiment of the present invention will be described.

MTF measurements were performed on three kinds of display panels. One of the display panels is the display apparatus (Sample) having the SBS structure using a photolithography method described as an example in Embodiment 2.

The display panel includes, over a single crystal silicon substrate, a pixel circuit that includes a transistor including an oxide semiconductor, a wiring, and the like, a pixel electrode over the pixel circuit, and light-emitting elements that respectively include a red EL layer, a green EL layer, and a blue EL layer each processed into an island shape by a photolithography method. An insulating layer containing aluminum oxide that is in contact with side surfaces of the EL layer and a resin layer containing acrylic over the insulating layer are included between the light-emitting elements. An electron-injection layer and a common electrode are provided to cover the resin layer.

The display panel used in this example is a top-emission OLED display. A display portion has a diagonal size of 1.50 inches and a definition of 3207 ppi.

In addition, here, similar evaluations were performed on two kinds of display panels using a white OLED and a color filter (Comparative Example 1 (Ref.1) and Comparative Example 2 (Ref.2)) for comparison. Note that the definition in each of Comparative Example 1 and Comparative Example 2 is approximately the same as that of the display panel manufactured in this example (denoted as Example).

A display MTF measurement system (DT-8031-MV) manufactured by ASTRODESIGN, Inc. was used for the MTF measurements.

Figure 26A:
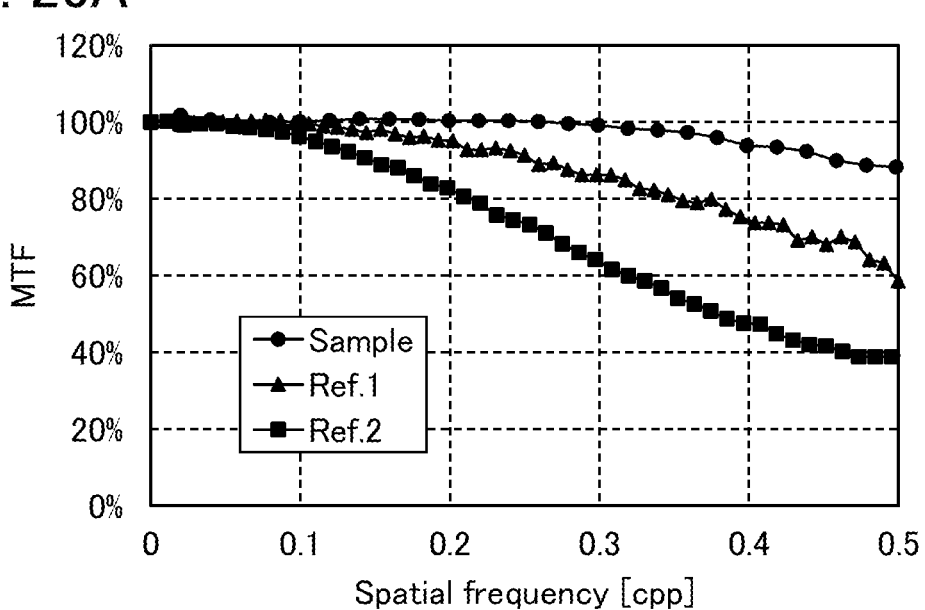
FIG. 26A and FIG. 26B show MTF measurement results.

FIG. 26A shows MTF measurement results in Example (Sample), Comparative Example 1 (Ref.1), and Comparative Example 2 (Ref.2). In FIG. 26A, the horizontal axis represents spatial frequency [cpp], and the vertical axis represents MTF [%]. In addition, FIG. 26B shows MTF values when the spatial frequency in each display panel is 0.5 cpp.

Figure 26B:
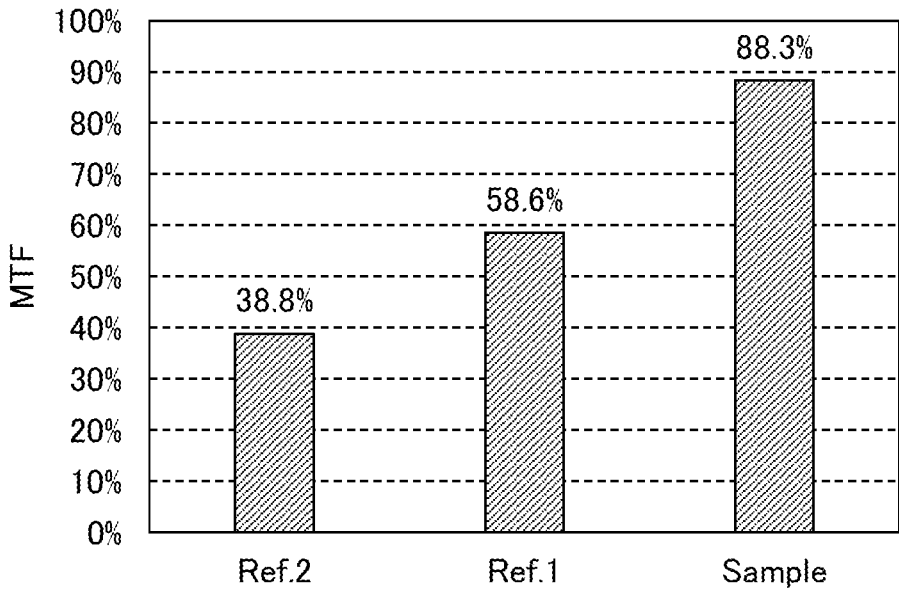

As shown in FIG. 26A and FIG. 26B, it has been confirmed that the display panel in this example exhibits a higher MTF with respect to any spatial frequencies than the two comparative examples. In other words, it has been confirmed that the display panel in this example is capable of displaying a clear image with very little blur with respect to an input image and exhibits high display quality.

REFERENCE NUMERALS

10: display apparatus, 20: display panel, 21: pixel portion, 22: pixel, 23: driver circuit, 24: driver circuit, 30: signal generation portion, 40: correction system, 41: correction data generation portion, 42: signal generation portion, 43: timing controller, 44: imaging device, 45: processing device, 46: determination portion, 48: imaging range, 51: transfer device, 100: display apparatus, 101: substrate, 110: light-emitting element, 110*a*: light-emitting element, 110*b*: light-emitting element, 110B: light-emitting element, 110*c*: light-emitting element, 110G: light-emitting element, 110R: light-emitting element, 111: pixel electrode, 111B: pixel electrode, 111C: connection electrode, 111G: pixel electrode, 111R: pixel electrode, 112: organic layer, 112B: organic layer, 112G: organic layer, 112R: organic layer, 113: common electrode, 114: common layer, 121: protective layer, 124*a*: pixel, 124*b*: pixel, 125: insulating layer, 126: resin layer, 128: layer, 140: connection portion, 150: pixel, 170: substrate, and 171: adhesive layer.

This application is based on Japanese Patent Application Serial No. 2021-119777 filed on Jul. 20, 2021, the entire contents are hereby incorporated herein by reference.

The invention claimed is:

1. A correction method of a display apparatus, wherein the display apparatus comprises a display panel, a correction circuit, and a memory, the correction method comprising:
   acquiring first imaging data including all pixels in the display apparatus in a state where an image with a first grayscale is displayed on the display apparatus;
   acquiring second imaging data including all the pixels in the display apparatus in a state where an image with a second grayscale is displayed on the display apparatus;
   generating correction data based on the first imaging data and the second imaging data;
   acquiring third imaging data in a state where a test image is displayed on the display apparatus;
   calculating an MTF (modulation transfer function) value based on the third imaging data; and
   making a determination based on the MTF value; and
   outputting the correction data to the memory of the display apparatus,
   wherein the correction circuit is configured to correct image data based on the correction data stored in the memory to generate corrected image data and outputting the corrected image data to the display panel, and
   wherein the test image is an image of a white line.

2. The correction method of a display apparatus, according to claim 1,
   wherein the display apparatus includes N×M pixels, each of N and M being a natural number, and
   wherein the correction data has N×M correction values corresponding to the N×M pixels.

3. The correction method of a display apparatus, according to claim 1, wherein the correction data has address information of the pixel having a point defect among the pixels included in the display panel.

4. The correction method of a display apparatus, according to claim 1, wherein each of the first imaging data and the second imaging data is acquired by scanning and imaging of the display panel.

5. The correction method of a display apparatus, according to claim 1, wherein each of the first imaging data and the second imaging data is acquired by imaging of an entire display panel.

* * * * *